United States Patent
Sachs et al.

(10) Patent No.: US 8,019,346 B2
(45) Date of Patent: Sep. 13, 2011

(54) MEANS AND METHODS FOR IMPROVING THE HANDOVER CHARACTERISTICS OF INTEGRATED RADIO ACCESS NETWORKS

(75) Inventors: Joachim Sachs, Aachen (DE); Ian Herwono, Stowmarket (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 742 days.

(21) Appl. No.: 12/088,782

(22) PCT Filed: Sep. 30, 2005

(86) PCT No.: PCT/IB2005/053223
§ 371 (c)(1),
(2), (4) Date: Mar. 31, 2008

(87) PCT Pub. No.: WO2007/036764
PCT Pub. Date: Apr. 5, 2007

(65) Prior Publication Data
US 2008/0205345 A1   Aug. 28, 2008

(51) Int. Cl.
*H04W 36/00* (2009.01)
(52) U.S. Cl. .................. 455/439; 455/436; 370/331
(58) Field of Classification Search ................... None
See application file for complete search history.

(56) References Cited

U.S. PATENT DOCUMENTS

| | | | |
|---|---|---|---|
| 6,925,074 B1 * | 8/2005 | Vikberg et al. | 370/338 |
| 7,565,144 B2 * | 7/2009 | Saifullah et al. | 455/436 |
| 2005/0239453 A1 * | 10/2005 | Vikberg et al. | 455/426.1 |
| 2006/0268900 A1 * | 11/2006 | Larsson et al. | 370/401 |
| 2007/0264996 A1 * | 11/2007 | Vikberg | 455/426.1 |
| 2008/0003988 A1 * | 1/2008 | Richardson | 455/414.3 |
| 2008/0137625 A1 * | 6/2008 | Hori et al. | 370/338 |
| 2010/0003983 A1 * | 1/2010 | Gallagher et al. | 455/436 |
| 2010/0115045 A1 * | 5/2010 | Lin | 709/206 |

FOREIGN PATENT DOCUMENTS

JP   2004-096169 A   3/2005

OTHER PUBLICATIONS

Vulic N. et al: "Architectural Options for the WLAN Integration at the UMTS Radio Access Level" Vehicular Technology Conference, 2004, IEEE US vol. 5, pp. 3009-3013.
Kuwabara, M. Digital Mobile Communication. Science News Ltd, Published Sep. 1992.

* cited by examiner

Primary Examiner — Ajit Patel

(57) ABSTRACT

The invention provides a method for assisting handover of a user terminal's, UT's, communication session in an integrated multi RAT network, said method to be carried out by an RNC1 being installed in said network, said method comprising the following steps:— receiving a "Handover Candidate" message comprising a message type identifier information element identifying said message as being a "Handover Candidate" message and which message identifies said session and which message further identifies a candidate RNC of said network, wherein said candidate RNC constitutes an RNC handover candidate for said session,— establishing the identity of said RNC by investigating said message,— associating said communication session with said candidate RNC identified in the previous step. The invention provides an RNC1, RNC2, and software, realising the method according to the invention.

38 Claims, 18 Drawing Sheets

MEANS AND METHODS FOR IMPROVING THE HANDOVER CHARACTERISTICS OF INTEGRATED RADIO ACCESS NETWORKS

TECHNICAL FIELD

The invention relates generally to radio access network integration and more specifically to methods and means for assisting handover in such integrated networks.

BACKGROUND

The integration of different radio access networks, such as the integration of e.g. UTRANs (Universal Terrestrial Radio Access Network) and WLANs (Wireless Local Area Network), is currently of great interest for providing more flexible radio networks regarding e.g. coverage, capacity and services and thus for creating new/enhanced business opportunities.

FIG. 1 illustrates the basic architecture of a cellular radio network in form of a conventional UTRAN, connected to the Internet 180 and to a conventional WLAN. The UTRAN comprises a base station node B, 150, connected to a radio network controller, RNC, 130. The UTRAN is connected to the Internet, 180, through a SGSN (Serving GPRS Support Node) 120 and a GGSN (Gateway GPRS Support Node), 110, in a conventional manner. The WLAN in FIG. 1 is a conventional WLAN according to the IEEE 802 standard and normally comprises at least one radio Access Point, AP, 165, normally connected to an Access Point Controller, APC, 162. Now, the WLAN's APC is hereafter referred to as an M-L2S (Multicast-enabled Layer 2 Switch). Since the Ethernet (IEEE 802.3) protocol is used for most of the WLANs layer 2 protocols to communicate with fixed network infrastructure, an M-L2S is identical with an Ethernet switch. A dual mode UT (User Terminal) 140, having both UTRAN and WLAN capability, can establish a UTRAN radio connection through its first data port 141 with Base station Node B 150 and a WLAN radio connection through its second data port 142 with the AP 165 of the WLAN. The UTRAN and WLAN are in a conventional manner interconnected through the SGSN 120 or, as illustrated in FIG. 1, through the GGSN 110. In a conventional manner, the WLAN, i.e. APC, 162, may be directly connected to the GGSN, 110, as illustrated in FIG. 1, or be connected via an AR (Access Router) and/or an IP-network (not shown in FIG. 1).

A data communication session can be established between the UT 140 and a communicating party, such as a host/server or peer, connected to the Internet 180. The data communication session may e.g. in a conventional manner be realized by a PDP (Packet Data Protocol) context session between the UT, 140, and the GGSN, 110, over the UTRAN path, in accordance with the 3GPP standard for packet radio data services.

In case of a handover of a PDP context session from the UTRAN routing path to the WLAN routing path, a lot of signalling is needed and high delays are expected since the user data, i.e. downlink PDP packets, that have been sent to and cached in the corresponding UTRAN node. i.e. the RNC 130, but not yet transmitted to the user terminal UT, 140, must be forwarded back across the core network, i.e back to the GGSN, 110, to be routed further to the UT 140 via the APC 162 and AP, 165.

Another problem is that the cellular radio access network, i.e the RNC 130, in the network architecture illustrated in FIG. 1 has no access to the WLAN's RRM-(radio resource management) information, and the WLAN has no access to the cellular radio network's RRM information, hindering an efficient multi radio resource management of the entire integrated UTRAN-WLAN-network, which in turn decreases the capacity of the entire integrated UTRAN-WLAN-network.

More specifically, for the WLAN in FIG. 1, in case the WLAN requires authentication of the UT 140 before a data session can be set up over the WLAN path, the establishment of a security association between the UT 140 and AP 165, e.g. by applying a conventional standard EAP (Extensible Authentication Protocol) authentication in accordance with the IEEE 802.11i security specification, may pose a crucial issue regarding the caused interruption time, i.e. it may cause unacceptable packet delay/loss for real time applications such as voice and/or video, in case of a communication/data session handover e.g. from the UTRAN path to the WLAN path in FIG. 1.

There is a need to find methods and means allowing an efficient, flexible and versatile handover of communication sessions in integrated radio access networks comprising different types of radio access networks which exploit different technology standards regarding e.g. session management, mobility management, radio resource management, security management etc, such as an integrated network comprising a cellular radio networks, e.g. according to the UTRAN 3GPP standard, and a wireless data networks, e.g. according to the WLAN IEEE 802 standard, as illustrated in FIG. 1. General problems regarding efficient handover schemes for radio access networks relate e.g. to data loss minimization, interference suppression, packet delay minimization and to minimize network signaling.

More specifically, there is a need to find means and methods allowing efficient handover in integrated radio access networks for handovers involving different RNCs, such as when a communication session is routed over from one RNC to another.

SUMMARY OF THE INVENTION

The present invention seeks to mitigate/solve above problems.

It is an object of the present invention to improve the handover characteristics of integrated radio access networks comprising at least two radio access networks exploiting different routing protocols in respect of each other, such as an integrated radio access network comprising an IEEE 802 WLAN and a 3GPP UTRAN.

It is an object of the present invention to minimize data loss and/or to decrease the interference and/or the packet delay/loss and/or the network signaling, during a handover of a communication session in such a radio access network.

It is a further object of the present invention to mitigate the packet delay problems caused by an authentication procedure during handover of a user terminal's communication session from a first radio access network node to a second radio access network node in such an integrated radio access network, which is particularly important for real time applications such as voice/video.

It is still a further object of the present invention to increase the capacity, and thus the revenue potential, of radio access networks comprising at least two radio access networks exploiting different routing protocols in respect of each other, such as an integrated radio access network comprising an IEEE 802 WLAN and a 3GPP UTRAN.

It is a specific object of the invention to find means and methods allowing efficient session handover in such integrated radio access networks in case the handover involves several RNCs, e.g. when a communication session is handed over from one RNC to another.

According to a first aspect, the invention achieves this by providing a method for assisting handover of a user terminal's, UT's, communication session in an integrated multi RAT network, said method to be carried out by an RNC1 being installed in said network and which RNC1 is being arranged to route said session through a first radio access network path via a first port according to a first radio network routing protocol by binding a session identifier identifying said session to a radio bearer defined according to said first routing protocol, said RNC1 being further arranged to route said session through an alternative radio access network path via a second port by binding said session identifier to an alternative bearer identifier being defined according to an alternative access network protocol, wherein the method comprises the following steps:

receiving a "Handover Candidate" message comprising a message type identifier information element identifying said message as being a "Handover Candidate" message and which message identifies said session and which message further identifies a candidate RNC of said network, wherein said candidate RNC constitutes an RNC handover candidate for said session, establishing the identity of said RNC by investigating said message, associating said communication session with said candidate RNC identified in the previous step.

In one embodiment, said "Handover Candidate" message comprises:

a user terminal identifier, UT ID, identifying said UT,
an access point identifier, AP2 ID, of a radio access point, AP2, or a Node B identifier, Node B 1D of a Node B, the Beacon signal of which is being detected by said UT, wherein said AP2 ID is defined according to said alternative radio access network protocol, or a mobile IP address, MIP, or a secure MIP address, MIPSec, of UT along with an IP address of an access router, AR, being associated with the candidate RNC, and wherein the step of establishing the identity of said candidate RNC comprises the step of:

checking stored information linking said AP2 ID/Node B ID/IP address of AR to the identity of said candidate RNC, and wherein the step of associating said communication session with said candidate RNC comprises the step of:

updating a routing table for said session, which session is being identified by said UT ID being linked to said session identifier, by storing an identifier identifying said candidate RNC in said routing table.

In one embodiment, said "Handover Candidate" message comprises the network address of said candidate RNC as source address of said message, thereby identifying the candidate RNC, and wherein said "landover Candidate" message is received over an inter RNC interface connecting said RNC1 with said candidate RNC.

In one embodiment, said "Handover Candidate" message comprises a network address of said candidate RNC identifying the candidate RNC, and wherein the UT ID is the alternative network address of said UT and wherein the AP2 ID is the alternative network address of said AP2, said method further comprising the step of:

receiving said "Handover Candidate" message over the first radio access network path or over the alternative radio access network path.

In one embodiment, the first network routing protocol is a 3GPP protocol and the alternative access network protocol is an IEEE 802 standard protocol, or a mobile IP protocol, MIP, or a Secure mobile 11P protocol, MIPSec, and wherein:

said "Handover Candidate" message is a RRC message complying with the 3GPP standard in case said "Handover Candidate" message is received over the first radio access network path, and wherein, said "Handover Candidate" message is a UDP/IP message complying with the IAPP protocol or LWAP protocol in case said "Handover Candidate" message is received over the alternative radio access network path.

In one embodiment, the method further comprises the steps of:

routing said session through said alternative radio access network path via said second port, and, signaling control plane data, and/or RRM information, associated with said session to/from said UT through said first radio access network path by means of said first radio network routing protocol, or signaling control plane data, and/or RRM information, associated with said session to/from said UT through said alternative radio access network path by means of said alternative access network routing protocol.

In one embodiment, the method comprises the step of:

revoking a radio traffic channel allocation being carried out by means of said first radio network protocol, said allocation associated with said session.

In one embodiment, the method further comprises the steps of:

routing said session through said alternative radio access network path via said second port, and, signaling control plane data, and/or RRM-information, associated with said session to/from said UT through said alternative radio access network path.

In one embodiment, the method further comprises the steps of:

revoking a radio traffic channel allocation carried out by means of said first radio network protocol, said allocation being associated with said session, revoking a channel allocation controlling the receiving state/mode of the UT, e.g. being a dedicated control channel (DCCH) allocation revokation, being carried out by means of said first radio network protocol, said channel allocation being associated with said session and e.g. being a control channel (DCCH) allocation, thereby setting said UT into an idle mode state as defined by said first radio network routing protocol.

In one embodiment, the method further comprises the steps of:

establishing that said candidate RNC is not RNC 1,
deciding to route said communication session through said candidate RNC, setting up an inter RNC tunnel bearer over an inter RNC interface connecting the RNC1 with said candidate RNC.

In one embodiment, the method further comprises the steps of:

forming a "Radio Link Setup Request" message comprising:

a message type identifier identifying said message as being a "Radio Link Setup Request" message,
a Radio Link Setup Request information element;
the alternative network address of the UT,
a tunnel port number of said inter RNC tunnel bearer, and;

sending said Radio link Setup Request message to said candidate RNC over the inter RNC interface connecting the RNC1 with the candidate RNC.

In one embodiment, said Radio Link Setup Request information element further comprises a session handover type identifier and/or an identifier identifying the control signalling associated with the session and/or an identifier identifying the session, said identifier/s specifying one of the following types of handover:
(1) a session handover and control plane handover from the WLAN path associated with AP1 to the UTRAN path associated with the Node B of RNC2, or,
(2) a control plane signaling handover from a radio access Node B associated with the RNC1 to a candidate radio access Node B associated with the candidate RNC, wherein only control plane signaling, and/or RRM information, associated with the session and signaled through said Node B is to be handed over to said candidate Node B, and wherein said signaling is carried out by means of said first radio network routing protocol, or,
(3) a user plane handover of said session from a radio access point, AP1, associated with the RNC1, to a candidate radio access point, AP2, associated with the candidate RNC, wherein the session is currently being routed through the RNC1 and through said access point AP1, and is to be routed through the candidate RNC and through said candidate access point AP2, and wherein the routing of the session through said access points, AP1 and AP2 is carried out by means of said alternative access network routing protocol, or,
(4) a user plane and control plane handover of said session from a radio access point, AP1, associated with the RNC1, to a candidate radio access point, AP2, associated with the candidate RNC, wherein control plane data, and/or RRM information, associated with the session along with the session itself are currently being routed through the RNC1 and through said access point AP 17 and are to be routed through the candidate RNC and through said candidate access point AP2, and wherein the routing through said access points, AP1 and AP2 is carried out by means of said alternative access network routing protocol.

In one embodiment, said Radio Link Setup Request message further comprises:
an information element specifying a requested QoS level for the requested radio links.

In one embodiment, the method further comprises the steps of:
stripping off protocol headers from incoming downlink IP session user data packets thereby transforming them into their original transmission format,
adding LLC headers to the original transmission format downlink IP session user data packets transforming them into LLC format according to said alternative access network protocol with an LLC network source address of the RNC 1,
binding said session identifier to a tunnel identifier identifying the inter RNC tunnel bearer, thereby tunneling said LLC session packets to the candidate RNC.

In one embodiment, the method further comprises the steps of:
stripping off protocol headers from incoming downlink IP session user data thereby transforming them into their original transmission format,
binding said session identifier to a tunnel identifier identifying the inter RNC tunnel bearer, thereby tunneling said original transmission format session user data to the candidate RNC.

In one embodiment, the UT ID of the "Handover Candidate" message is a mobile IP address, MIP, or a secure MIP address, MIPSec, of UT, and the "Handover Candidate" message comprises an IP address of an access router, AR, being associated with the candidate RNC, the method further comprising the steps of:
identifying the session by means of the MIP/MIPSec address of the UT being linked with the session,
updating the routing table of the session with the IP address of AR,
stripping off tunneling protocol headers from incoming downlink IP session user data packets thereby transforming them into their original transmission format,
encapsulating the original transmission format 1P session packets by means of UDP/IP or TCP/IP with the IP address of AR as destination address,
encapsulating the thus obtained UDP/IP or TCP/IP session packets with UDP/IP forming tunneling packets, wherein the UDP port number of the tunneling packets identifies an inter RNC tunnel to the candidate RNC, established as described above, and
binding said session identifier to the UDP inter RNC tunnel port number, thereby tunneling the encapsulated downlink session packets to the candidate RNC, and routing the packets through AR2 instead of AR.

In one embodiment, the RNC1 routes the communication session to the candidate RNC over the inter RNC tunnel, said method further comprising the step of:
routing the session through the alternative radio access network path via the second port in parallel with routing the session over the inter RNC tunnel to the candidate RNC.

In one embodiment, the method further comprises the steps of:
receiving a "Handover Confirmation" message from the UT which message comprises:
a message type identifier identifying said message as being a "Handover Confirmation" message,
a disassociation information element and the network address of a radio access point, AP1, with which AP1 the UT is no longer associated, and,
a handover confirmation information element along with the network address of a radio access point, AP2, with which the UT is currently associated, wherein the network addresses of said AP1 and AP2 are defined according to said alternative access network protocol, and wherein the method further comprises the step of:
blocking the routing of the session through the alternative radio access network path via the second port as a response on receiving said "I-landover Confirmation" message.

In one embodiment, the method further comprises the steps of:
deciding to route the session through said candidate RNC,
establishing that the session can not be routed in serial through the RNC1 and the candidate RNC,
identifying a Data Packet Support Node being connected to both the RNC1 and the candidate RNC, and through which Data Packet Support Node the session is currently routed,
forming an "RNC Relocation Required" message comprising:
a message type identifier information element identifying said message as being an "RNC Relocation Required" message,
an identifier identifying the candidate RNC,
the network address of the UT as defined by the alternative access network protocol, a tunnel identifier of the tunnel between the RNC and the Data Packet Support Node through which the session is currently being tunneled, and sending said "Session Relocation Required" message to said Data Packet Support Node, thereby requesting a Serving RNC relocation from said RNC1 to said candidate RNC, for the session.

In one embodiment, the step of deciding to route the session through said candidate RNC comprises the following steps:

receiving a "Handover Confirmation" message from the UT which message comprises:

a message type identifier information element identifying said message as being a "Handover Confirmation" message, a disassociation information element and the network address of the radio access point, AP1, with which AP1 the UT is no longer associated, and, a handover confirmation information element along with the network address of a radio access point, AP2, with which the UT is currently associated, wherein the network addresses of said AP1 and AP2 are defined according to said alternative access network protocol, and wherein the method further comprises the step of:

revoking the alternative bearer identifier being defined according to the alternative access network protocol thereby revoking the radio channel allocation associated with the transmission of the session through the alternative radio access network path, thereby blocking the routing of the session through the alternative radio access network path as a response on receiving said "Handover Confirmation" message.

In one embodiment, the step of deciding to route the session through said candidate RNC further comprises the following steps:

collecting RRM information concerning at least the radio access points AP1 and AP2 whose beacon signals are currently being detected by UT, wherein said RRM information is being signaled over the first radio access network path or over the alternative radio access network path, taking a preliminary handover decision based on said collected RRM information, and sending a "Physical Channel Reconfiguration" message to the UT comprising a handover instruction identifier and the alternative network address of AP2, which message instructs the UT to route the session through AP2 instead of AP1.

In one embodiment, the step of collecting RRM information concerning at least the radio access points AP1 and AP2 whose beacon signals are currently being detected by UT further comprises the step of:

receiving a radio resource control, RRC, measurement report message over the first radio access network path or over the inter RNC interface, which message complies with a 3GPP RRC standard format and comprises an "Additional Measured Results" information element indicating the AP2 as target access point, or, receiving a RRC measurement report message complying with the standard format of a RRC message format according to said alternative radio access network wherein said RRC message comprises an "Additional Measured Results" information element indicating the AP2 as target access point.

In one embodiment, said multi RAT network is an integrated 3GPP-UTRAN-IEEE 802-WLAN-network, said communication session is a 3GPP PDP context session, said first radio network routing protocol is a 3GPP UTRAN standard protocol, said session identifier is a 3GPP UTRAN standard protocol GTP-U tunnel endpoint identifier, TEID, of a UDP/IP tunnel between RNC1 and the SGSN, said radio bearer according to said first routing protocol is a 3GPP RB ID, said alternative bearer identifier is a WLAN radio bearer identifier, WLAN RB ID, or a mobile IP radio bearer identifier, MIP RB ID, or a secure mobile IP radio bearer identifier, MIP/IPSec RB ID, said alternative access network protocol is an IEEE 802 WLAN protocol or IP/MIP/IPSec-protocol, or combinations thereof, said UT ID is a WLAN MAC address of UT, or a MIP address of UT, or a MIPSec address of UT, said AP2 ID is a WLAN MAC address of AP2, said Node B ID is a 3GPP identifier identifying Node B, said second network address of the UT is a MTP or MIPSec address, said identifier identifying said candidate RNC is an IP address or UTRAN MAC address of the candidate RNC, said first interface connecting said RNC1 with said candidate RNC is a 3GPP Iur interface, said network address of said candidate RNC is the UTRAN MAC address or IP address of the candidate RNC, and wherein said Radio Link Setup Request message complies with a 3GPP Radio Link Setup Request message format, and wherein the network address of radio access points, AP1, UT and AP2 are the WLAN MAC addresses of AP1, UT and AP2, respectively, said Data Packet Support Node is a 3GPP SGSN, and wherein the "RNC Relocation Required" message format complies with the 3GPP "RNC Relocation Required" message format.

According to a second aspect, the invention provides a computer program comprising program code means which, when loaded into a processing means of a RNC1 being installed in a multi RAT network and which RNC1 is being arranged to route a communication session through a first radio access network path via a first port according to a first radio network-routing protocol by binding a session identifier identifying said session to a radio bearer according to said first routing protocol, said RNC1 is further being arranged to route said session through an alternative radio access network path via a second port by binding said session identifier to an alternative bearer identifier being defined according to an alternative access network protocol, make said processing means execute at least one procedure realising the method according to the first aspect of the present invention.

According to a third aspect, the invention provides a computer readable medium having stored program code means which, when loaded into a processing means of a RNC1 being installed in a multi RAT network and which RNC1 being arranged to route said session through a first radio access network path via a first port according to a first radio network routing protocol by binding a session identifier identifying said session to a radio bearer according to said first routing protocol, said RNC1 being further arranged to route said session through an alternative radio access network path via a second port by binding said session identifier to an alternative bearer identifier being defined according to an alternative access network protocol, make said processing means execute at least one procedure realising the method according to the first aspect of the invention.

According to a fourth aspect, the invention provides a method for assisting handover of a user terminal's, UT's, communication session in an integrated multi RAT network, said method to be carried out by a candidate RNC being installed in said network and which candidate RNC constitutes a handover candidate for the session and which candidate RNC is being arranged to route the session through a first radio access network path via a first port according to a first radio network routing protocol by binding a session identifier identifying said session to a radio bearer defined according to said first routing protocol, said candidate RNC being further arranged to route the session through an alternative radio access network path via a second port by binding a session identifier identifying the session to an alternative bearer identifier being defined according to an alternative access network protocol, said method comprising the following steps:

receiving a "Radio Link Setup Request" message from a neighbor RNC1 currently routing the session associated with UT, extracting, from the "Radio Link Setup Request" message, a tunnel port number of an inter RNC tunnel between RNC1 and the candidate RNC, extracting, from the "Radio Link Setup Request" message, a UT identifier identifying the UT, associating said tunnel port number with the UT and with the session associated with the UT, extracting a session handover type identifier of said "Radio Link Setup Request" message, setting up a radio traffic channel for routing the session of said UT according to said handover type identifier.

In one embodiment, the method further comprises the steps of:

receiving a "Handover Candidate" message comprising:

a message type identifier information element identifying said message as being a "Handover Candidate" message, and, an access point identifier, AP2 ID, of a radio access point, AP2, or a Node B identifier, Node B ID of a Node B, the Beacon signal of which is being detected by said UT, wherein said AP2 ID is defined according to said alternative radio access network protocol, or a mobile IP address, MIP, or a secure MIP address, MIPSec, of UT along with an IP address of an access router, AR, being associated with the candidate RNC, wherein the "Handover Candidate" message identifies the UT, and, establishing that said UT has not an ongoing session being routed through the candidate RNC.

In one embodiment, said "I-landover Candidate" message is received over an inter RNC interface from the RNC1 currently routing the session, the method further comprising the steps of:

recognizing that the network source address of said "I-landover Candidate" message is the network address of RNC1 and concluding that the session is currently being routed through RNC1, establishing an inter RNC tunnel between RNC1 and the candidate RNC.

In one embodiment, the method further comprises the steps of:

receiving said "Handover Candidate" message from the UT over the first radio access network path or over the alternative radio access network path, forwarding said "Handover Candidate" message to its neighboring RNCs.

In one embodiment, the access point identifier is a cell identifier of an access node AP2 of said alternative radio access network path, and wherein said session handover type identifier element indicates that the session is to be routed through the AP2, wherein the step of setting up a radio traffic channel for UT further comprises the steps of:

setting up a logical LLC connection, through a port, with the UT via the AP2 (266), wherein the LLC connection is set up by means of the alternative access network protocol, associating the session with the LLC connection.

In one embodiment, the method further comprises the steps of:

receiving downlink packets of the session through the tunnel being identified by said tunnel port number, stripping off tunneling protocol headers from the received downlink packets thus obtaining session packets having a format according to the alternative access network protocol and which packets have a network source address of RNC1 as defined by said alternative access network protocol, forwarding the thus obtained session packets through the port, thus routing the packets to UT via the AP2.

In one embodiment, the method further comprises the steps of:

receiving downlink packets of the session through the tunnel being identified by said tunnel port number, stripping off tunneling protocol headers from the received packets thus obtaining session packets having a format according to the alternative access network protocol and which packets have a network source address of RNC1 as defined by said alternative access network protocol, stripping off encapsulation headers of the thus obtained packets, which encapsulation headers have been added by the RNC1 by means of the alternative access network protocol, thereby transforming the downlink packets into their original transmission format, adding LLC headers to the original transmission format downlink session packets transforming them into LLC format according to said alternative access network protocol with an LLC network source address of the candidate RNC, forwarding the thus formed LLC session packets through the port, thus routing the packets to UT via the AP2.

In one embodiment, the "Handover Candidate" message comprises a mobile IP address, MIP, or a secure MIP address, MIPSec, of UT along with an IP address of an access router, AR, being associated with the candidate RNC, and wherein the UT identifier of the "Radio Link Setup Request" message is a corresponding MIP/MIPSec address of UT, and wherein the inter RNC tunnel is an UDP/IP tunnel, the method further comprising the steps of:

extracting the MIP/MIPSec of UT from said "Radio Link Setup Request" message, associating the tunnel port number with the MIP/MIPSec of UT and with the IP address of AR, receiving identifying the session by means of the MIP/MIPSec address of the UT being linked with the session.

updating the routing table of the session with the IP address of AR, receiving downlink IP encapsulated IP session packets over the inter UDP/IP RNC tunnel, stripping off the tunneling UDP/IP headers from the IP encapsulated downlink IP session packets obtaining downlink IP session packets being encapsulated with IP, wherein the encapsulation IP address of the IP session packets is the IP address of AR2, and forwarding the downlink IP session packets being encapsulated with the IP address of AR to a port associated with AR, thereby routing the downlink IP session packets to the UT through AR and AP2.

In one embodiment, said multi RAT network is an integrated 3GPP-UTRAN-IEEE 802-WLAN-network, said communication session is a 3GPP PDP context session, said first radio network routing protocol is a 3GPP UTRAN standard protocol, said session identifier is a 3GPP UTRAN standard protocol GTP-U tunnel endpoint identifier, TEID, of a UDP/IP tunnel between RNC1 and the candidate RNC, said radio bearer according to said first routing protocol is a 3GPP RB ID, said alternative bearer identifier is a WLAN radio bearer identifier, WLAN RB ID, or a mobile. IP radio bearer identifier, MIP RB ID, or a secure mobile IP radio bearer identifier, MIP/IPSec RB ID, said alternative access network protocol is an IEEE 802 WLAN protocol or IP/MIP/IPSec-protocol, or combinations thereof, said UT ID is a WLAN MAC address of UT, or a MIP address of UT, or a MIPSec address of UT, said AP2 ID is a WLAN MAC address of AP2, said Node B ID is a 3GPP identifier identifying Node B, said second network address of UT is a MIP or MIPSec address, and wherein said Radio Link Setup Request message complies with a 3GPP Radio Link Setup Request message format, and wherein the network address of radio access points, AP1, UT and AP2 are the WLAN MAC addresses of AP1, UT and AP2, respectively.

According to a fifth aspect, the invention provides a computer program comprising program code means which, when loaded into a processing means of a candidate RNC being installed in said network and which candidate RNC constitutes a handover candidate for the session and which candidate RNC is being capable of routing the session through a first radio access network path via a first port according to a first radio network routing protocol by binding a session identifier identifying said session to a radio bearer defined according to said first routing protocol, said candidate RNC being further capable of routing the session through an alternative radio access network path via a second port by binding a session identifier identifying the session to an alternative bearer identifier being defined according to an alternative access network protocol, make said processing means execute at least one procedure realising the method according to the fourth aspect of the invention.

According to a sixth aspect, the invention provides a computer readable medium having stored program code means which, when loaded into a processing means of a candidate RNC being installed in said network and which candidate RNC constitutes a handover candidate for the session and which candidate RNC is being capable of routing the session through a first radio access network path via a first port according to a first radio network routing protocol by binding a session identifier identifying said session to a radio bearer defined according to said first routing protocol, said candidate RNC being further capable of routing the session through an alternative radio access network path via a second port by binding a session identifier identifying the session to an alternative bearer identifier being defined according to an alternative access network protocol, make said processing means execute at least one procedure realising the method according to the fourth aspect of the invention.

According to an eighth aspect, the invention provides a radio network controller. RNC 1, being arranged to route a session through a first radio access network path via a first port according to a first radio network routing protocol by binding a session identifier identifying said session to a radio bearer defined according to said first routing protocol, said RNC1 being further arranged to route said session through an alternative radio access network path via a second port by binding said session identifier to an alternative bearer identifier being defined according to an alternative access network protocol, wherein said RNC comprises means realizing the method according to the first aspect of the invention.

In one embodiment, said means comprises a data memory with stored program code means which, when loaded in a processing means of said RNC1, make said processing means execute at least one procedure realizing the method according to the first aspect of the invention.

According to a ninth aspect, the invention provides a radio network controller. RNC2, being arranged to route a session through a first radio access network path via a first port according to a first radio network routing protocol by binding a session identifier identifying said session to a radio bearer defined according to said first routing protocol, said RNC2 being further arranged to route the session through an alternative radio access network path via a second port by binding a session identifier identifying the session to an alternative bearer identifier being defined according to an alternative access network protocol, wherein said RNC2 comprises means realizing the method according to the fourth aspect of the invention.

In one embodiment, said means comprises a data memory with stored program code means which, when loaded in a processing means of said RNC1, make said processing means execute at least one procedure realizing the method according to the fourth aspect of the invention. Even though the invention has been summarized above, the invention is defined by the accompanying claims 1-38.

BRIEF DESCRIPTION OF THE DRAWINGS

The features and advantages of the present invention will become more apparent from the following detailed description of the preferred embodiments with reference to the accompanying drawings, wherein.

DETAILED DESCRIPTION OF PREFERRED EMBODIMENTS

Figure 1:
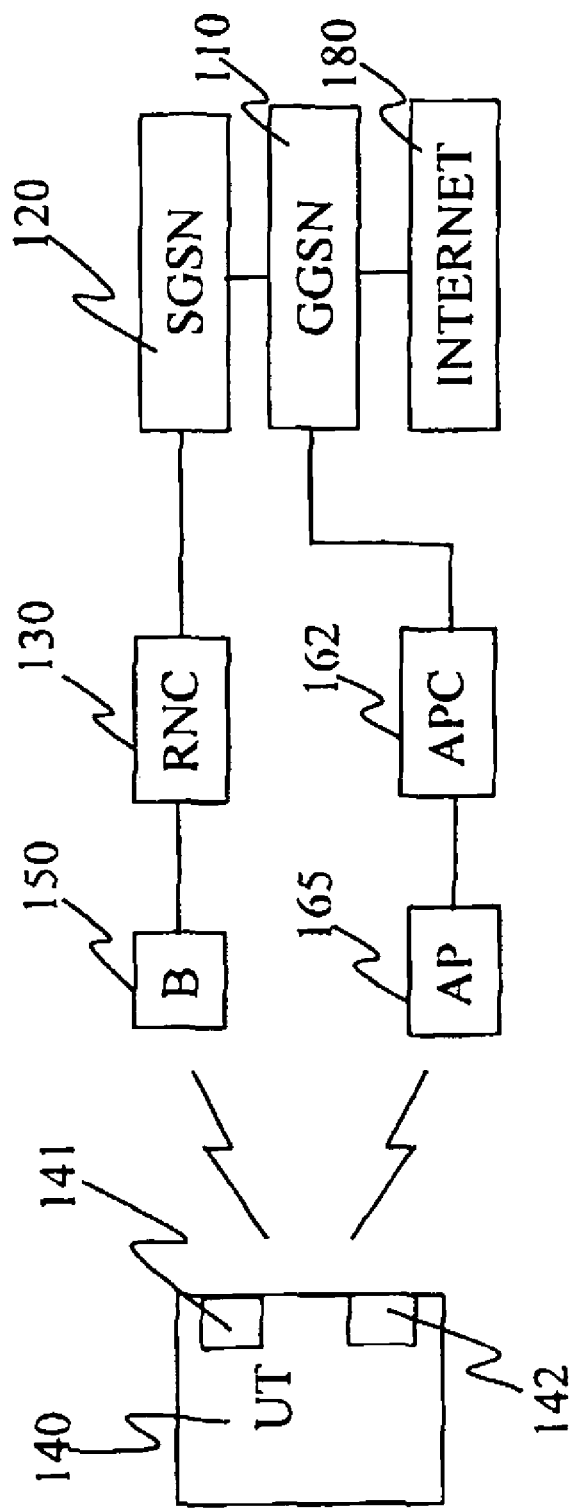
FIG. 1 illustrates a network architecture of a conventional integrated radio access network comprising a UTRAN and a WLAN, connected to the Internet.

Now, with reference to FIG. 2-8, the present invention shall be described in more detail.

As stated, the invention relates to integrated multiple RAT (Radio Access Technology) networks and will be more fully described by examples of embodiments or modes of operations described below for the specific case of a UTRAN-WLAN integrated RAT network. The invention is however applicable for any cellular radio network being integrated with an arbitrary Layer 2 IEEE 802 radio access network and many modifications and/or combinations are possible. For instance, in case of a WMAN, IEEE 802.16, then the AP 265 would transform the IEEE 802.3 MAC frames to 802.16

MAC frames instead of 802.11 MAC frames, as a person skilled in the art realizes. The cellular radio network may be any cellular radio network comprising a radio network controller, RNC, capable of establishing and routing a data (packet) session through different network transmission paths exploiting different routing protocols, the cellular network could e.g. a UTRAN-GPRS network, a CDMA 2000 network, an IS-95 network, a D-AMPS network etc. For instance, in case of a CDMA 2000 network, the RNC functionality described below according to the invention would preferably be realised in the BSCs (Base Station Controllers) of the CDMA 2000 network, as a person skilled in the art realizes. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. The term routing protocol should here be interpreted to comprise all transmission protocols exploited by a specific radio access network transmission path, which path may comprise a plurality of transmission nodes. Thus, an RNC is any node which can route a data session to a first node through a first port and to a second node through a second port wherein the first node exploits a first routing protocol and the second node exploits a second, alternative, routing protocol. Thus, the term "routing protocol" should not be interpreted merely in a conventional manner as a protocol used between different network nodes to exchange reachability information, but instead as a mechanism of routing or transmitting data by means of a specific network technology along a radio access network path, which path normally comprises a plurality of nodes. Thus, the routing protocol is the means of transmitting data packets according to a specific technology and thus normally comprise a set of transmission protocols according to one transmission standard technology which protocols are used by the nodes within the network path. For instance, the 3GPP UTRAN technology specifies a first set of protocols for data transmission and thereby defines a first routing protocol, and the IEEE 802 WLAN technology specifies a second set of protocols for data transmission and thereby defines a second routing protocol. The RNC according to the invention is thus any network node which, when connected to (at least) 2 different networks exploiting different technologies, via (at least) 2 different data ports, which data ports can be directly communicating with a user terminal, or communicating with a user terminal through intermediate network nodes, is capable of mapping a data session through the first and/or the second of the data ports.

Figure 2:
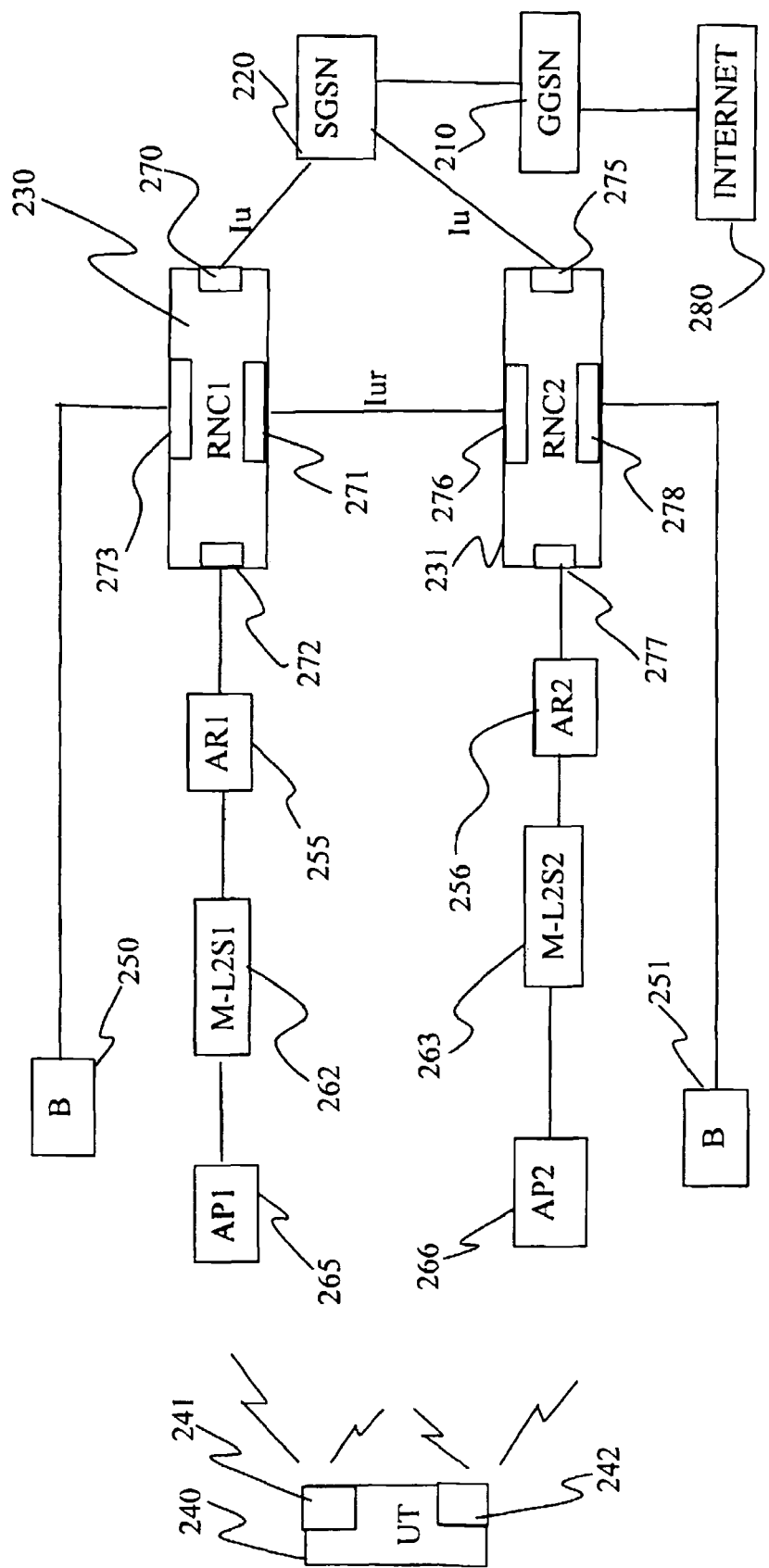
FIG. 2 depicts an illustrative example of an integrated radio access network architecture according to one embodiment of the present invention.

In the FIGS. 1-8, corresponding elements have been given the same reference numbers along with a figure prefix number, e.g. AP 1, 165, in FIG. 1 is referred to as AP 1, 265, in FIG. 2 etc.

FIG. 2 depicts an illustrative example of a multi RAT network architecture according to the present invention in form of a UTRAN-WLAN integrated RAT network. In FIG. 2, node Bs 250 and 251 are connected to RNC 1230 and RNC2 231, respectively, through conventional Iub interfaces and ports 273 and 278, respectively. According to the invention, a WLAN part is connected to RNC 1230 and RNC2 231, respectively. The respective WLAN part comprises access points, AP1 265 and AP2 266, either directly connected to their respective RNC or, as illustrated in FIG. 2, connected via conventional layer 2 switches M-L2S1 262 and M-L2S2 263. In one embodiment, access routers, AR 255 and AR256, are installed between the M-L2S1 262 and the RNC 1 230 and between the M-L2S2 263 and the RNC2 231, as illustrated in FIG. 2, and in another embodiment no access routers are installed in the routing path between AP1 265 and RNC1 230 and between AP2 266 and RNC2 231, but the APs are directly connected to their respective RNC, optionally via M-L2S switch/es. Many possibilities exist, several APs may be connected to the same M-L2S switch, several M-L2S switches may be connected in series or parallel to the same RNC, the ARs may be connected to other data networks (e.g. IP-networks), IP-networks may be installed between the ARs and the RNCs, and FIG. 2 shows a pure illustrative example for understanding the invention. The RNC1 230 and RNC2 231 are connected to the SGSN 220 via conventional Iu interfaces via ports 270 and 275, and are, according to one aspect of the invention, connected to each other via a conventional Iur interface via ports 271 and 276. According to another aspect of the invention, there is no interface connection between RNC1 230 and RNC2 231. They are further connected to their respective AR/M-L2S/AP (i.e. WLAN-part), via ports 272 and 277, respectively, as illustrated in FIG. 2. The UT 240 is arranged to establish radio link connections/sessions with node Bs 250 and 251 through its port 241 and with APs 265 and 266 through its port 242, in a conventional manner, i.e. it has dual radio access network technology (RAT) capability.

Figure 3:
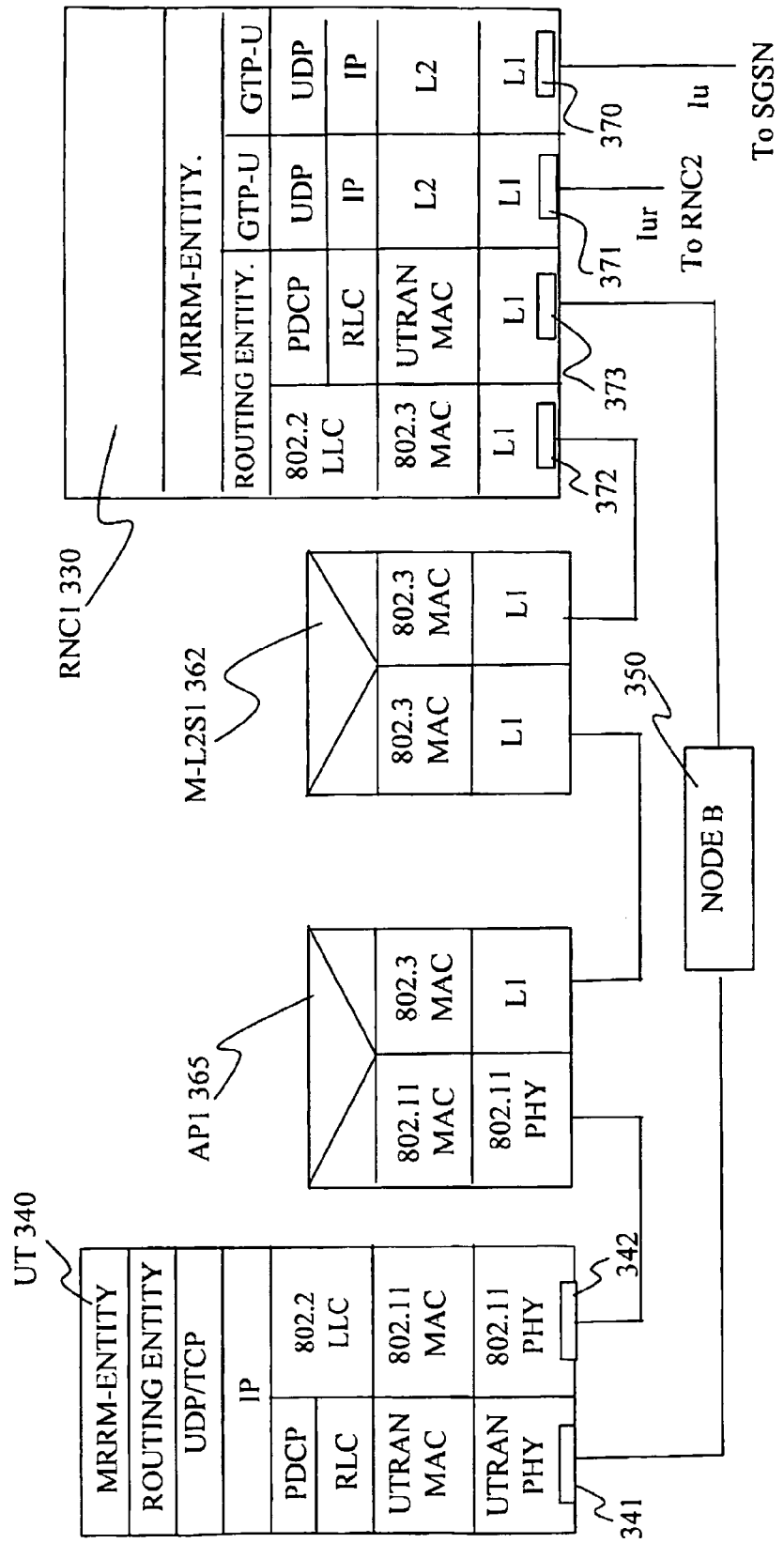
FIG. 3 illustrates the user plane protocol stack for some of the nodes of the network illustrated in FIG. 2, according to one embodiment of the invention.

FIG. 3 illustrates the principal user plane protocol stacks for the RNC1 230, M-L2S1 262, AP1 265 and UT 240 illustrated in FIG. 2, for the case no AR (or IP-network) is installed between the RNC1 230 and AP1 265. FIG. 3 illustrates the case wherein the RNCs are connected to each other via the Iur interface, in accordance with one aspect of the invention. The user plane protocol stacks for RNC2 231, M-L2S2 263, AP2 266 and node B 251 are analogous. In FIG. 3, RNC1 330 has a conventional 3GPP GTP-U (GPRS tunneling protocol—user plane) a conventional UDP (User Datagram Protocol), a conventional IP (Internet protocol), conventional 3GPP L2 (Layer 2) and L1 (Layer 1), for communicating data packets through ports 370 and 371, respectively, and has conventional 3GPP PDCP (Packet Data Convergence Protocol), RLC (Radio Link Control) protocol, UTRAN MAC Layer 2 and Layer 1 for communicating data packets through port 373. According to the invention, the RNC1 330 has further conventional IEEE 802.2 LLC (Link Layer Control) protocol, IEEE 802.3 MAC (Media Access Control) layer and IEEE 802 physical layer 1 (Ethernet physical layer), for communicating data packets through port 372. According to the invention, the RNC 1 330 has a routing entity, for routing sessions through ports 372 and 373, and a multi radio resource management entity (MRRM entity) for managing the UTRAN and WLAN radio resources in an integrated manner, as described further below. The M-L2S1 362 has conventional IEEE 802.3 MAC protocol and physical Layer 1. The AP1 265 has conventional IEEE 802.11 MAC protocol, IEEE 802.11 Physical layer, IEEE 802.3 MAC protocol and IEEE 802.11 Physical layer. The node B 350 has a conventional 3GPP stack (both user- and control plane, not illustrated in FIG. 3). The UT 340 has conventional IEEE 802.11 LLC protocol, IEEE 802.11 MAC protocol, IEEE 802.11 Physical layer, for communicating data packets through port 342, and has a conventional PDCP-, RLC-, UTRAN MAC-, protocol, and a UTRAN physical layer for communicating data packets through port 341. The UT 340 has a UDP/TCP protocol/s and IP protocol installed. In a similar manner as for RNC1 330, the UT 340 330 has a routing entity, for routing sessions through ports 341 and 342, and a multi radio resource management entity (MRRM entity) for managing the UTRAN and WLAN radio resources in an integrated manner, as described further below.

Figure 4:
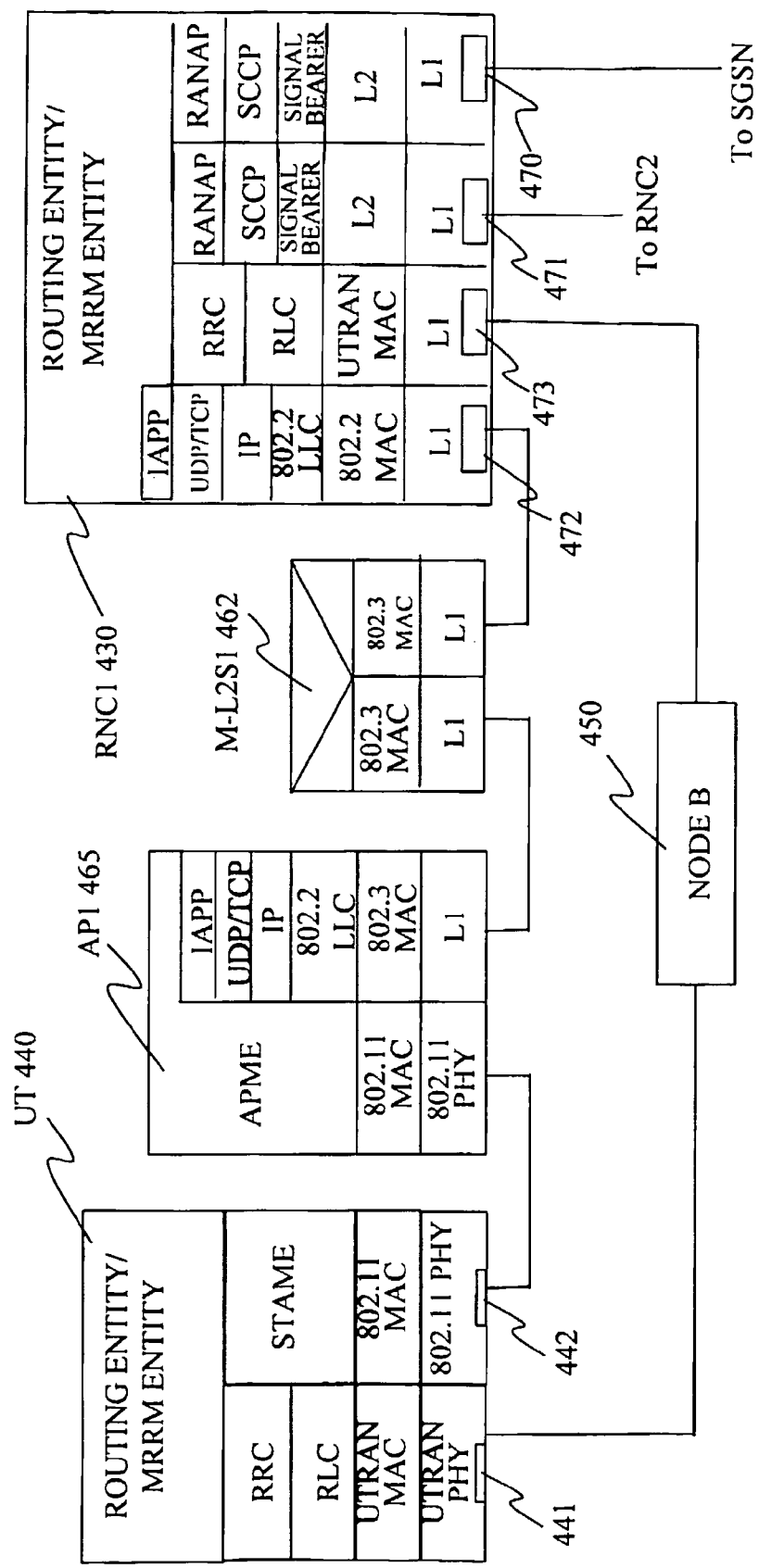
FIG. 4 illustrates the control plane protocol stack for some of the nodes of the network illustrated in FIG. 2, according to one embodiment of the invention.

FIG. 4 illustrates the principal control plane protocol stacks for the network nodes of FIG. 3. Apart from the IEEE 802 layers 1, 2, 3 and the UTRAN layer 1 and 2, and the routing- and MRRM entities of UT 440 and RNC 1430 provided or made possible by means of the invention, described with reference to FIG. 3 above, the UT 440 has a RLC (Radio Link Control) protocol, an RRC (Radio Resource Control) protocol and a STAME (Station Management Entity) installed, the AP1 465 has an APME (Access Point Management Entity), an IAPP (Inter Access Point Protocol, according to IEEE 802.11f standard), UDP/TCP- and IP protocols installed, and the RNC 1430 has an IAPP, UDP/ICP- and IP protocols, an RRC, an RLC, a RANAP (Radio Access Network Application Part), a SCCP (Signalling Connection Control Part) and 3GPP signal bearer protocol installed, as illustrated in FIG. 4.

Figure 5:
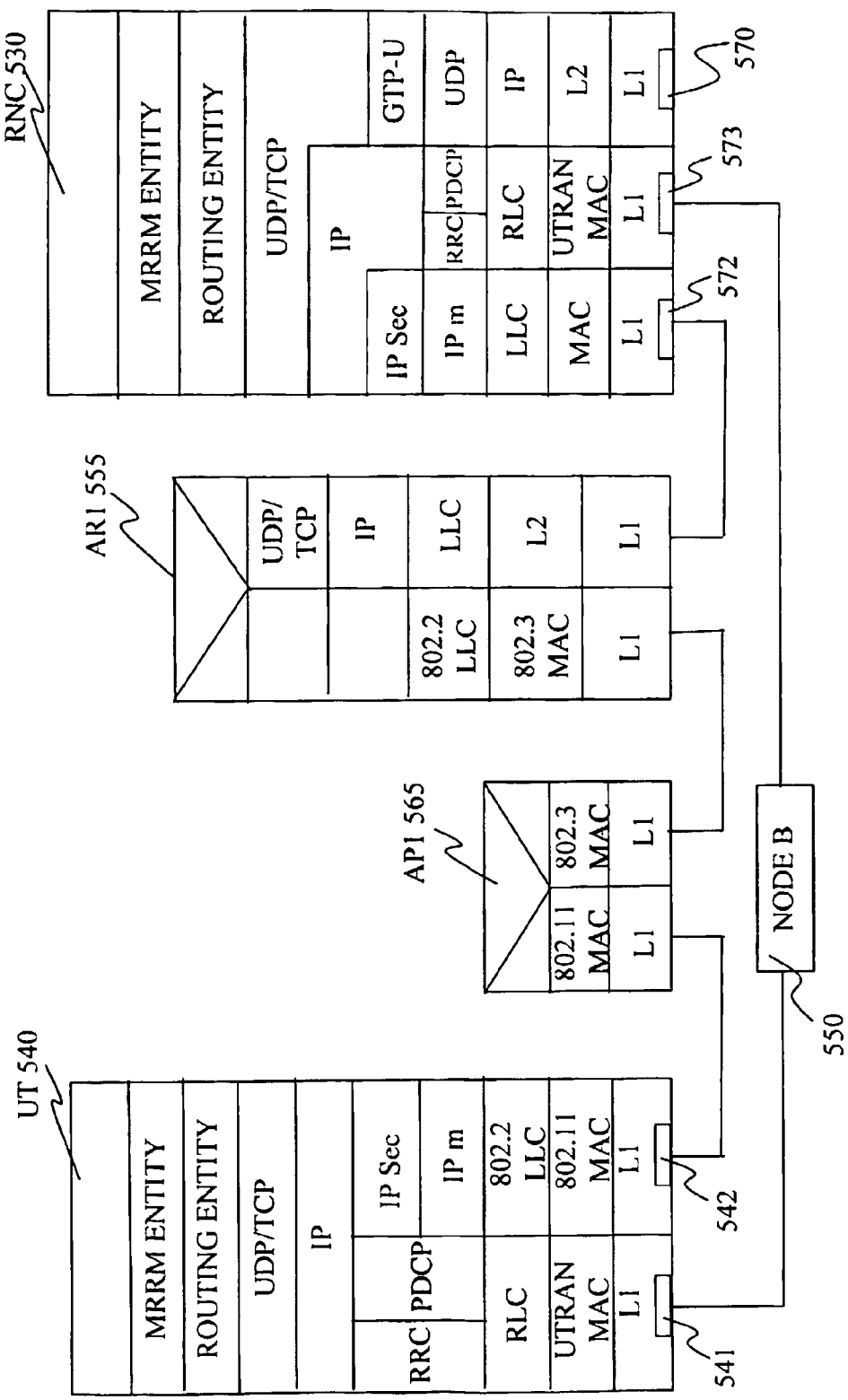
FIG. 5 illustrates the control plane protocol stack for some of the nodes of the network illustrated in FIG. 2, according to one embodiment of the invention.
Figure 6A:
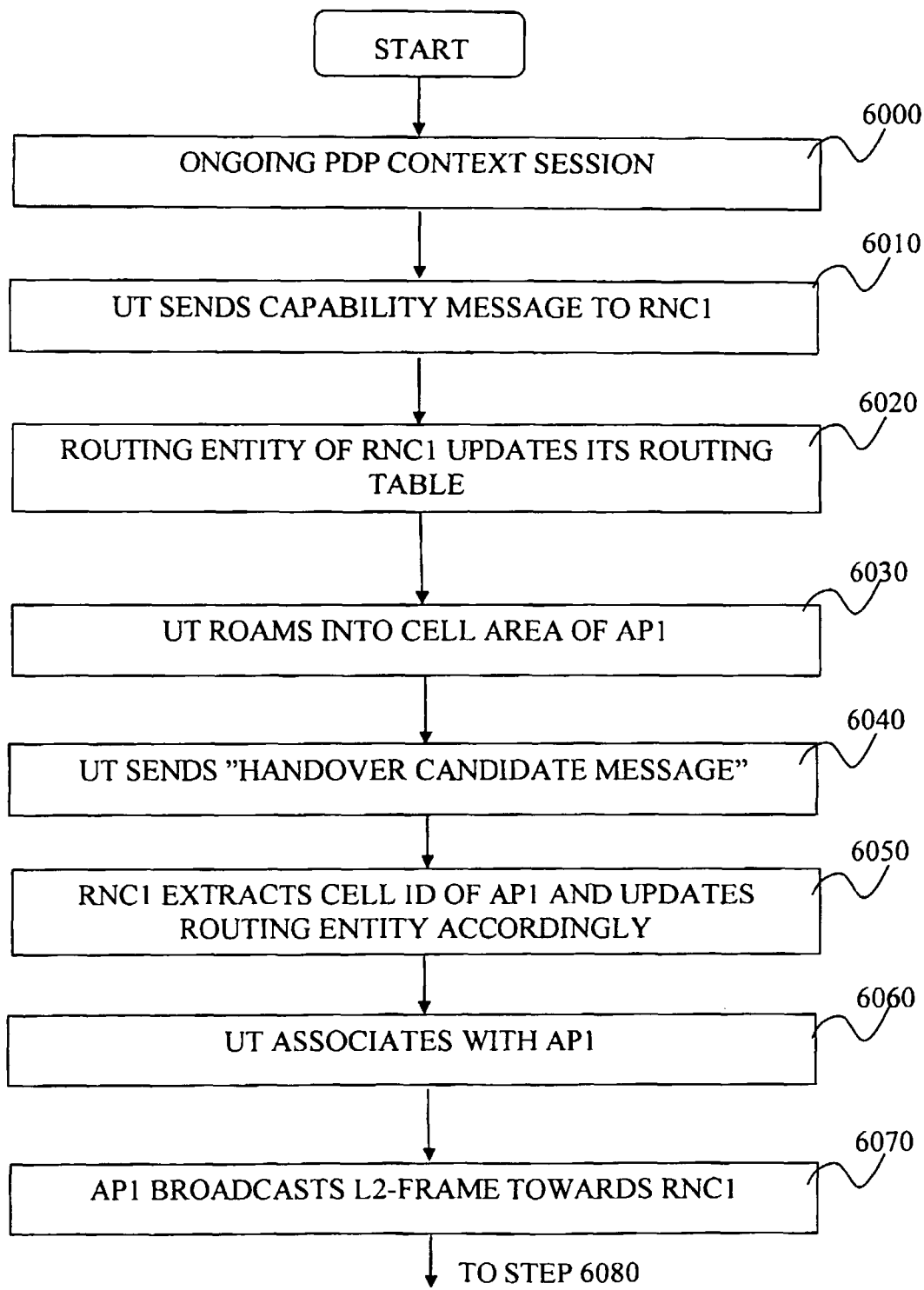
FIG. 6 comprises figure sheets 6A-F and illustrates the method according to the invention, according to one embodiment, in form of a flow chart diagram, FIG. 7 comprises figure sheets 7A-D and illustrates the method according to the invention, according to one embodiment, in form of a flow chart diagram, FIG. 8 comprises figure sheets 8A-C and illustrates the method according to the invention, according to one embodiment, in form of a flow chart diagram.
Figure 6B:
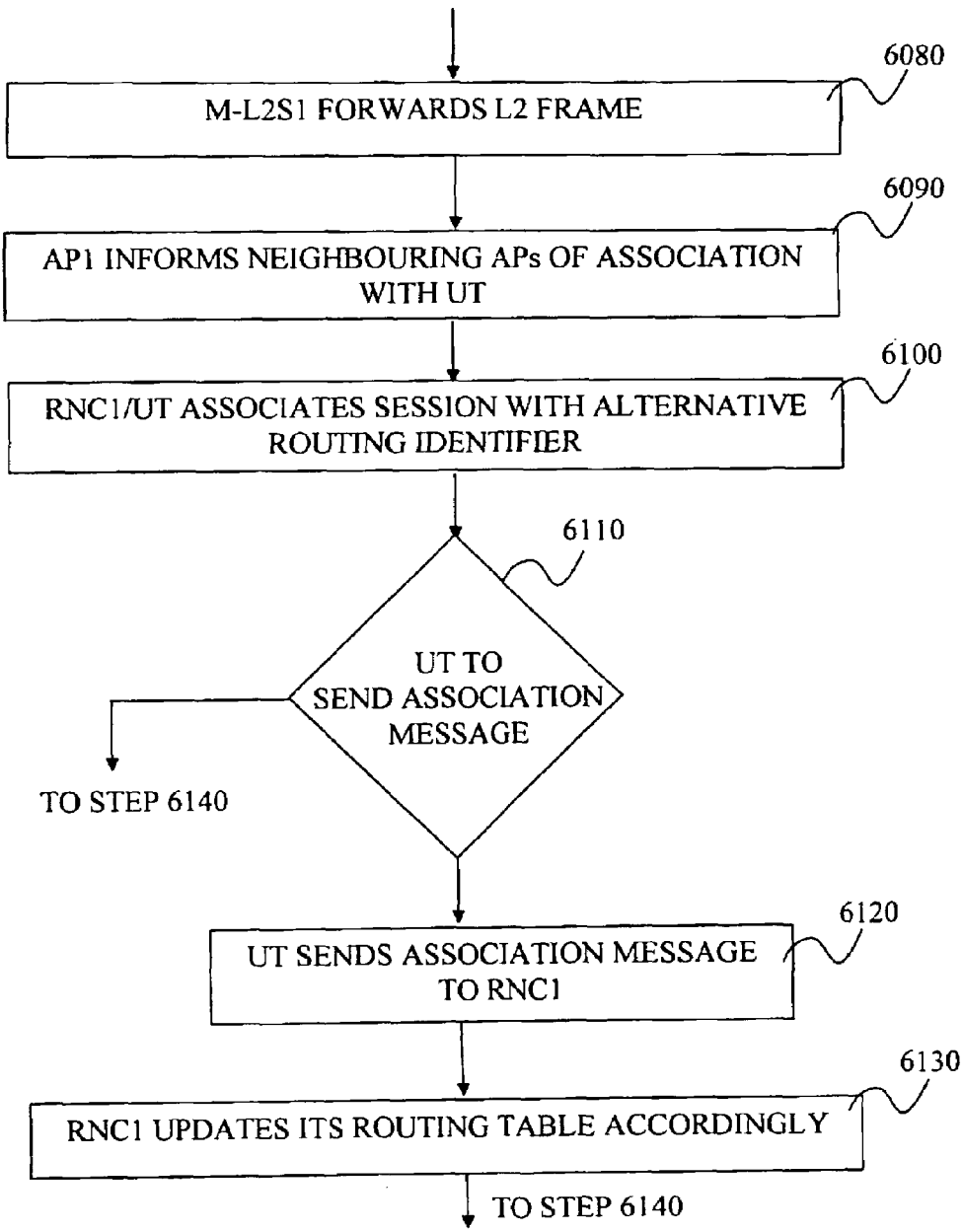
Figure 6C:
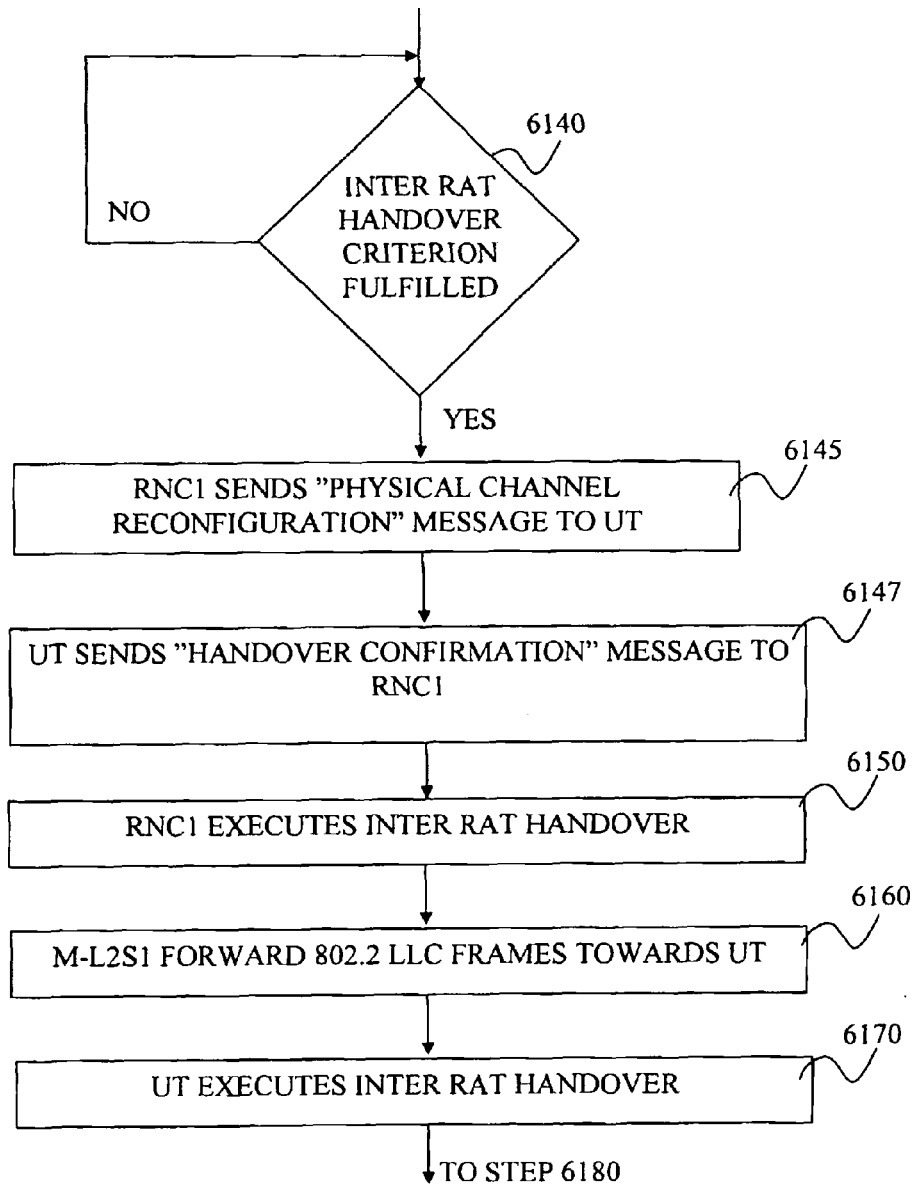
Figure 6D:
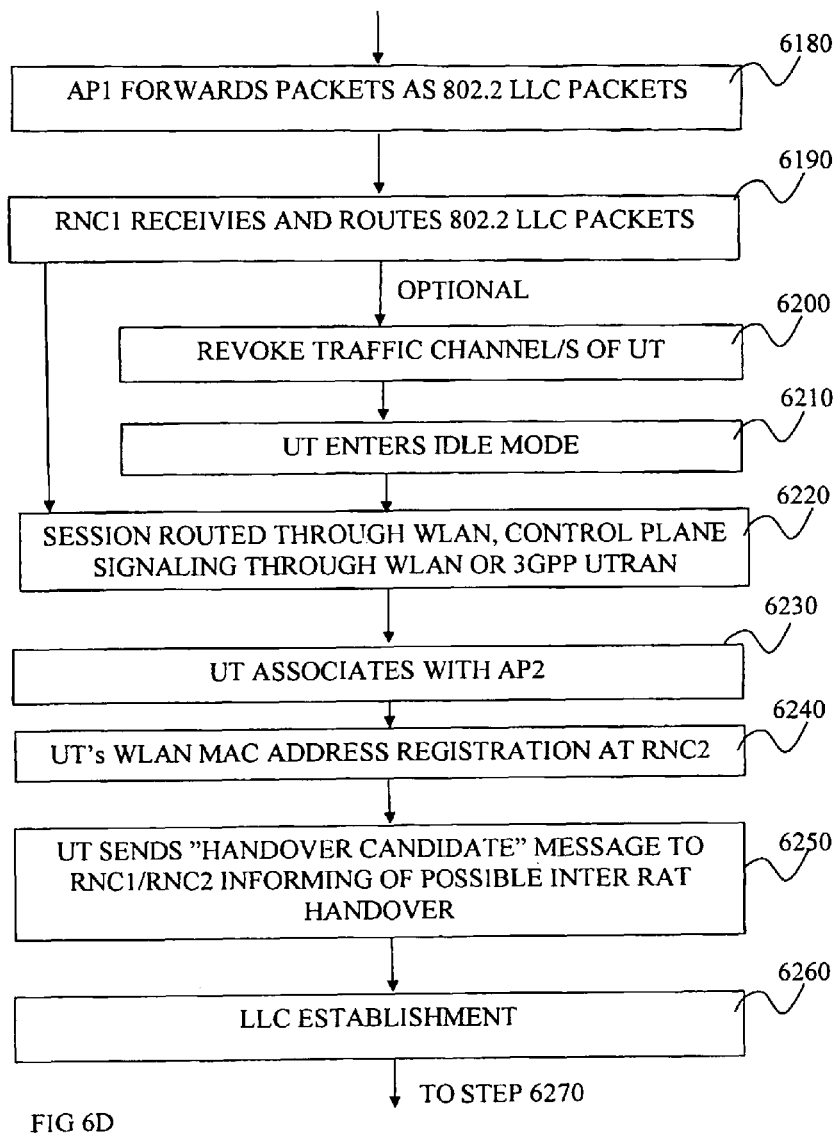
Figure 6E:
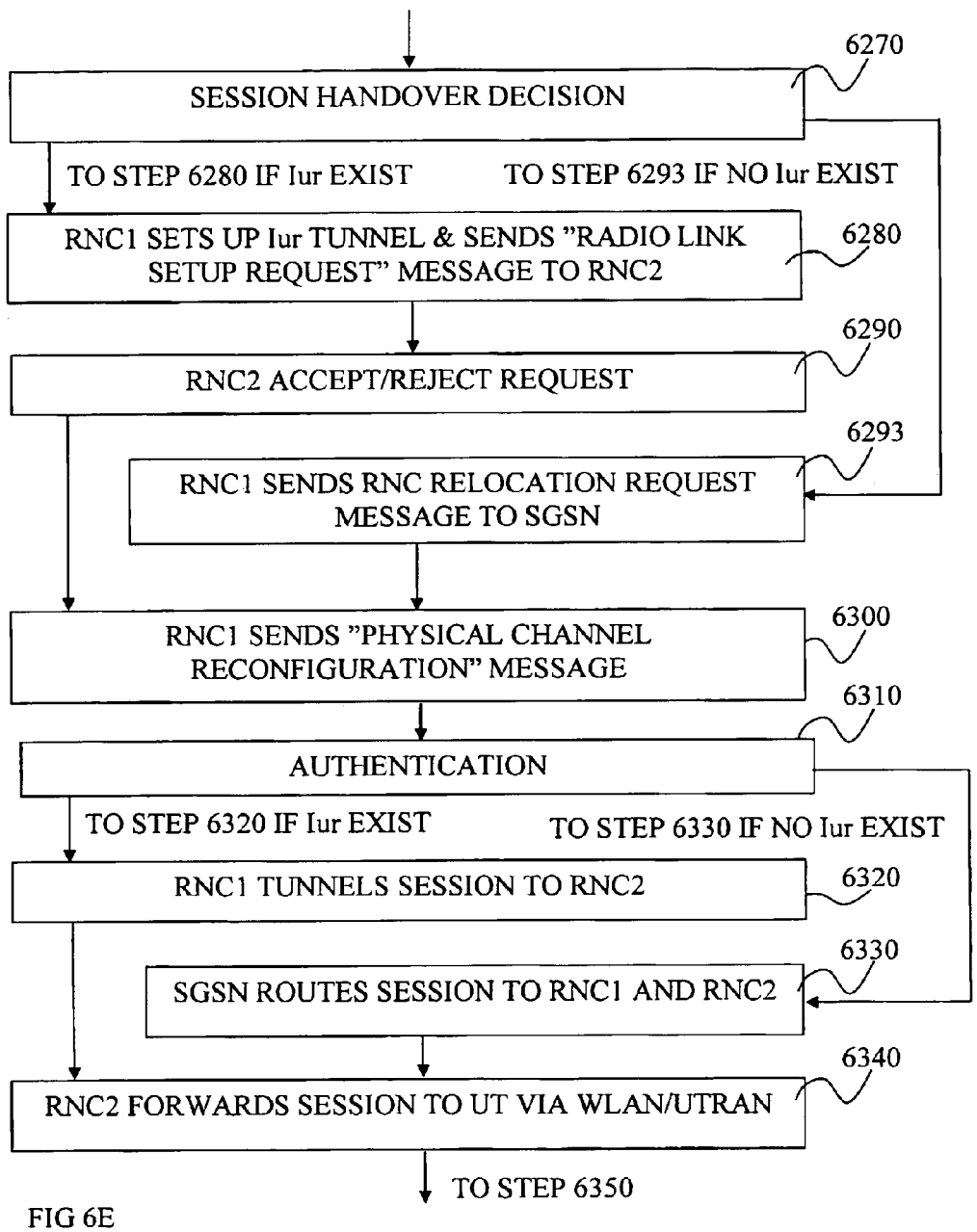
Figure 6F:
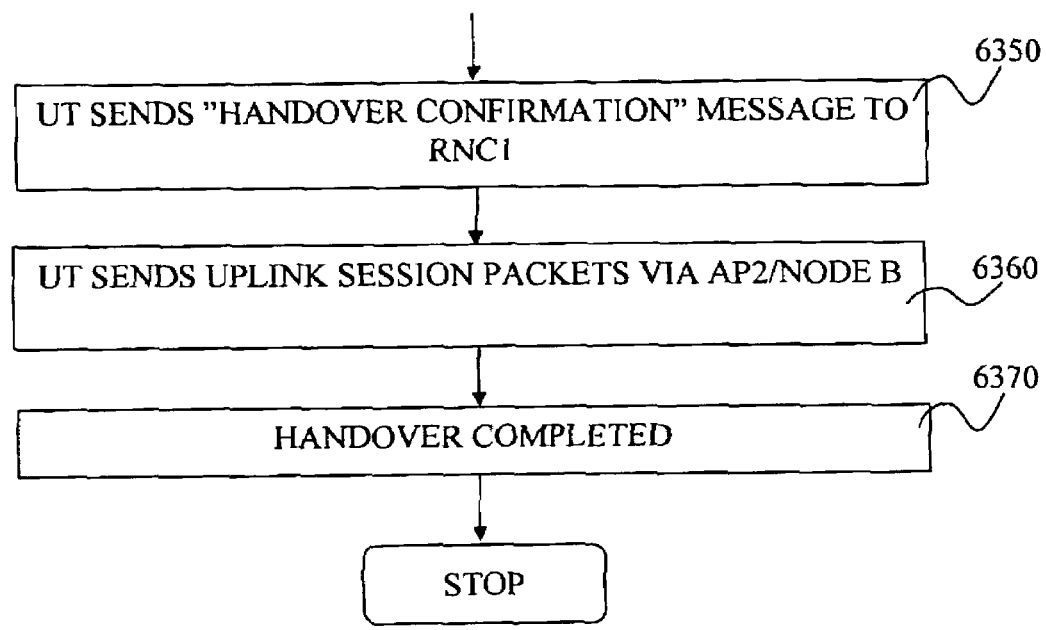

FIG. 5 illustrates the principal control/user plane protocol stacks for the UT 240, AP1 265, AR1 255 and RNC 1230 of FIG. 2, according to one embodiment of the invention wherein AR1/AR2 are installed between AP1/AP2 and RNC1/RNC2 (M-L2S1 262 simply functions as relay switch and has been left out in FIG. 5). In this embodiment, there is an IP network between the ARs and the RNCs. As illustrated in FIG. 5, the RNC 1 530 and UT 540 has further IPm protocol (mobile IP, MIP) and optionally also an IPSec protocol installed, and AR1 555 communicates via TCP/IP with RNC 530 over the intermediate IP-network, and communicates with UT 540 via IEEE 802.2 LLC over the WLAN network. The IPm and IPSec protocols may be integrated. The other protocols illustrated in FIG. 5 have been discussed with reference to FIGS. 3 and 4. The protocol stack for the Iur interface is identical with the stack of the Iu interface and is not illustrated in FIG. 5.

Normally, the UT 240 has further a WLAN authentication entity installed (not illustrated), e.g. according to the 802.1X EAP/TLS/TTLS/PEAP standard, allowing UT 240 to communicate with a corresponding authentication entity of the WLAN, e.g. in form of a RADIUS or DIAMETER server connected to AP1 265 for authentication purposes. The RADIUS or DIAMETER server may e.g. be integrated in AR1 255 or RNC 1230, but many possibilities exist. Many other protocol options exist, as a person skilled in the art realizes. e.g. a LWAPP, (Light Weight Access Point Protocol), could be used instead of the 1APP, or RLC/RNC protocols could be used instead of the LLC/IAPP in case of a UTRAN etc. The RADIUS server normally exploits a conventional RADIUS protocol, e.g. as specified by the documents RFC 3579 (RADIUS support for EAP), RFC 2865, RFC 2869 (RADIUS Extensions), RFC 3576 (Dynamic Authorization Extensions to RADIUS) and RFC 3580 (IEEE 802.1X RADIUS Usage Guidelines) and the DIAMETER server normally exploits a conventional DIAMETER protocol, e.g. as specified by RFC 3588 (DIAMETER Base Protocol), along with a conventional EAP (Extensible Authentication Protocol), e.g. as defined by standard AAA-(Authenticating, Authorization, Accounting) protocols RFC 2284- PPP EAP, RFC 4017 (EAP requirements for WLAN) or RFC 3748 (EAP) or RFC 2716 (PPP EAP TLS) or the EAP-TTLS (EAP Tunneled TLS Authentication Protocol), issued by the IETF standard organisation (Internet Engineering Task Force), and may further exploit the EAP-PEAP (Protected EAP Protocol).

The corresponding stacks for RNC2 231, and its associated WLAN routing path in FIG. 2, are analogous with the stacks of FIGS. 3, 4 and 5.

Now, with reference to FIG. 2-7, the method according to the invention shall be described in more detail for the embodiment wherein no access routers, AR1 255 and AR2 256, are installed in the network illustrated in FIG. 2, i.e. it is a pure WLAN-path between RNC1/RNC2 230/232 and AP1/AP2 265/266. It is assumed that each AP maintains its own up-to-date database containing information about the neighbor APs, whose coverage areas may overlap with its own. This way, each AP is capable to provide associated UTs with a site report according to IEEE 802.11k specification, which contains information about other APs in proximity to which the UT may roam (or handoff). This may only be achieved if all the involved APs are controlled by the same operator or if special inter-operator agreements exist. The method described here is a pure illustrative example for understanding the invention and many modifications are possible, e.g. some steps/actions may be effectuated in a different/reverse order giving the same result, as a person skilled in the art realizes.

In step 6000 in FIG. 6, there is an ongoing conventional packet data session, such as a multimedia session, between UT 240 and e.g. a peer or a host connected to the Internet 280, over the UTRAN routing path through Node B 250 and RNC1 230. A conventional 3GPP PDP (Packet Data Protocol) context session is used between the UT 240 and the SGSN 220 and GGSN 210 for carrying the session. The PDP context session may be set up in a conventional manner e.g. on initiative of the UT 240 wherein, after conventional signaling between UT 240, SGSN 220 and GGSN 210, the SGSN 220 initiates GTP-U tunnel establishment through the Create_P-DP_Context_Request message to the GGSN 210. A GTP tunnel is identified with a tunnel endpoint identifier (TEID), an IP address (i.e., the IP address of the receiving node), and a UDP port number. The TEID is locally assigned by the receiving side of a GTP tunnel, which unambiguously identifies the tunnel endpoint. The TEID values are exchanged between the tunnel endpoints using GTP-C messages. The PDP context session is characterized by its QoS profile and IP-address, and the TEID (normally the UDP-port number) of the respective nodes unambiguously identifies a specific PDP context session being tunneled between the RNC1 230, the SGSN 220 and GGSN 210, in a conventional manner. For routing the PDP packets, which are routed through the GTP-U tunnel to/from the SGSN 220 as UDP/IP packets, the RNC1 identifies the TEID of the PDP-context-GTP-U tunnel and routes these packets over the UTRAN/RLC/MAC as PDCP packets to/from the UT 240 by binding said TEID to the 3GPP RAB ID (Radio Access Bearer Identifier) which is bound to the 3GPP RB ID (Radio Bearer Identifier), which in turn unambiguously defines the "right" 3GPP channels (and settings) for communicating the PDCP packets to/from the UT 240, in a conventional manner. Table 1 illustrates the routing table used by the ROUTING entity of RNC1 230 to route PDP context session packets, in a conventional manner.

TABLE 1

| PDP Session | 3GPP RB ID | 3GPP RAB ID | UT | TEID | GTP-U tunnel |
|---|---|---|---|---|---|
| Session 1 | RB ID 1 | RAB ID 1 | UT 1 | TEID 1 | GTP-U 1 |
| Session 2 | RB ID 2 | RAB ID 2 | UT 1 | TEID 2 | GTP-U 2 |
| Session N | RB ID N | RAB ID N | UT K | TEID N | GTP-U N |

As seen in Table 1, one UT may have a plurality of ongoing PDP sessions. In the following description, it is assumed that the UT 240 has only one ongoing PDP session, namely session 1 of table 1. This PDP context session between UT 240 and the SGSN 220 is illustrated by communication step 1 in FIG. 7A. UT 240 is referred to as UT 1 in the following tables.

The method then proceeds to step 6010, wherein, according to the invention, the UT 240 forms and sends a capability message to RNC1 230 over the UTRAN path (i.e. via Node B 250) which message informs RNC1 230 that UT 240 has dual RAT capability, i.e. is capable of communicating both over the UTRAN path and the WLAN path. This is illustrated by communication step 2 in FIG. 7A. According to the invention, this capability message comprises an "UT multi-mode/multi RAT capability" information element informing the RNC1 230 that the UT 240 has both UTRAN and WLAN capability, in case the alternative network is a WLAN. Many possibilities exist how to define the "UT multi-mode/multi RAT capability" information element, it may e.g. be made up by an "alternative network identifier", unambiguously defining the alternative network, which e.g. may be defined by means of a first, specifically defined, four bit data field in an RRC message allowing the definition of 16 different alternative networks, along with the alternative network address of UT 240 in a second specifically defined data field, i.e. the WLAN MAC address of UT 240 in case the alternative network is a wireless LAN directly connected to the RNC 1 230 (i.e. no intermediate AR 255 is installed between AP1 265 and RNC1 230). In case there is an AR 255 connecting the WLAN part to the RNC 1 230, as illustrated in FIG. 2, e.g. via an IP-network between the AR 255 and RNC1 230 (not illustrated in FIG. 2), the alternative network address of UT 240 may be an IP-address of UT 240, as described further below, but many possibilities exist. The "alternative network identifier" may e.g. be set to 0000 for indicating that the alternative network is a WLAN, and may be set to "0001" for indicating that the alternative network is an IP network, and so on. The capability message may thus e.g. be realized as a RRC-message comprising the UT's WLAN MAC address along with said "UT multi-mode/multi RAT capability" information element and may be sent to the MRRM entity of RNC1 (over the DCCH), which basically is the conventional 3GPP RRM entity of RNC1 being arranged to integrate also WLAN RRM information, as described further below. The capability message may alternatively be realized as a modified conventional "Activate PDP Context Request" message, e.g. by including said "alternative network identifier" along with said alternative network address of UT 240 in said message. Thus, the "Activate PDP Context Request" message is sent by the UT 240 to the SGSN 220 during PDP context activation, comprising above data fields, but many other possibilities exist how to realise the capability message. What is important according to the invention is that the RNC 1230 is informed about the dual RAT capability of UT 240, and the alternative network address (i.e. the WLAN MAC address in this illustrative example wherein the alternative network is a WLAN), of UT 240, and that the RNC 1230 is arranged to associate the alternative network address of UT 1240 (i.e. the WLAN MAC address in this illustrative example wherein the alternative network is a WLAN) with the correct PDP context session (i.e. the session of UT 240), as described further below.

In step 6020, the MRRM entity of RNC 1230 then forwards this WLAN MAC address of UT 240 to the ROUTING entity of RNC 1, which entity updates its routing table accordingly, as illustrated in table 2.

Thus, in step 6020, the ROUTING entity of RNC1 associates the WLAN MAC address of UT 240 with its ongoing PDP session, however, the ROUTING entity continues to route the PDP packets over the UTRAN path (via Node B 250) by binding the TEID 1 to the RAB ID 1 and the RAB ID 1 to the RB ID 1.

In step 6030, the UT 240 roams into the coverage area of AP1 265 and detects a Beacon frame from AP1 265 in a conventional manner, which frame comprises the MAC address of AP1 265, which MAC address is forwarded to the MRRM entity of UT 240. This is illustrated by communication step 3 in FIG. 7A.

In step 6040, the UT 240 forms a "Handover Candidate" message unambiguously identifying the UT 240 and AP1 265, and sends this message to the RNC 1230. Many possibilities exist how to realise this message, what is important is that the "Handover Candidate" message comprises/carries information enabling the RNC1 (230) to establish that the session from now on can be routed through AP1 (265) and, in case the AP1 265 is not connected to RNC1 230 but to another RNC, the "Handover Candidate" message must carry information enabling the RNC1 230 to establish the identity of that RNC. Furthermore, if the session is currently routed through another session, the "Handover Candidate" message must enable RNC 1230 to establish the identity of that RNC. Normally, the "Handover Candidate" message comprises a message type identifier information element informing the RNC1 (230) that said message is a "Handover Candidate" message along with some session identifier, normally the WLAN MAC address of UT (240) since this address identifies the session at RNC 1 (230), along with an access point identifier identifying the AP1 (265), which access point identifier normally is the WLAN MAC address (or another cell id) of AP1 (265). The "Handover Candidate" message may e.g. be realized as a modified RRC-message comprising the WLAN MAC network address (or another cell identifier) of AP1 (265) and be sent to the RNC1 230 over the BCCH via Node B 250, but many possibilities exist. This "Handover Candidate" message transmission is illustrated by communication step 4 in FIG. 7A, constituting an example. For instance, the "Handover Candidate" message may be sent over the WLAN path at a later stage by means of the STAMF/APME/IAPP protocols.

In step 6050, the RNC1 230 extracts the alternative network cell identifier of AP1 265 from this "Handover Candidate" message, i.e. the WLAN MAC address of AP1 265 in our illustrative example wherein the alternative network is a WLAN, and forwards this cell identifier to its MRRM Entity and ROUTING Entity. The MRRM Entity of RNC 1230 then updates relevant MRRM information accordingly e.g. by feeding various RRM algorithms with data indicating that the UTRAN radio channel/s of UT 240 may be handed over to AP1 265, in order to maximize the overall radio network capacity. The exact MRRM algorithms, i.e. exact optimization criteria etc, of the MRRM Entity of RNC1 230 for such an optimization is not subject of the present invention, but an

TABLE 2

| PDP Session | 3GPP RB ID | 3GPP RAB ID | UT | TEID/GTP-U tunnel association | Alternative network address of UT |
|---|---|---|---|---|---|
| Session 1 | RB ID 1 | RAB ID 1 | UT 1 | TEID 1/GTP-U 1 - RNC1 - SGSN | WLAN MAC address of UT 1 | important advantage of the invention is that it opens up the possibility of effective such MRRM functionality. According to the invention, the MRRM Entity of RNC1 230 then establish what RNC said AP1 265 is associated (connected) with, e.g. by searching a look-up table comprising all the cell identifiers (e.g. the WLAN address) of the APs of the entire integrated network, and the network address of their respectively associated RNC (e.g. the IP-address of the respectively UTRAN RNCs). Furthermore, in step 6050, the MRRM Entity of RNC1 forwards said RNC network address to the Routing Entity of RNC 1230 which updates its routing table accordingly, as illustrated in table 3, by associating the PDP context session 1 of UT 240 with the network address (e.g. IP-address) of the RNC being associated with the alternative access point, i.e. AP1 265, i.e. the network address (e.g. IP-address) of RNC1 230 in our illustrative example wherein AP1 265 is connected with (and "reached" through) RNC1 230.

TABLE 3

| PDP Session | 3GPP RB ID | 3GPP RAB ID | UT | TEID/GTP-U tunnel association | Alternative network address of UT | RNC association of AP1 |
|---|---|---|---|---|---|---|
| Session 1 | RB ID 1 | RAB ID 1 | UT 1 | TEID 1/GTP-U - RNC1 - SGSN | WLAN MAC address of UT 1 | IP-address of RNC1 |

Figure 7A:
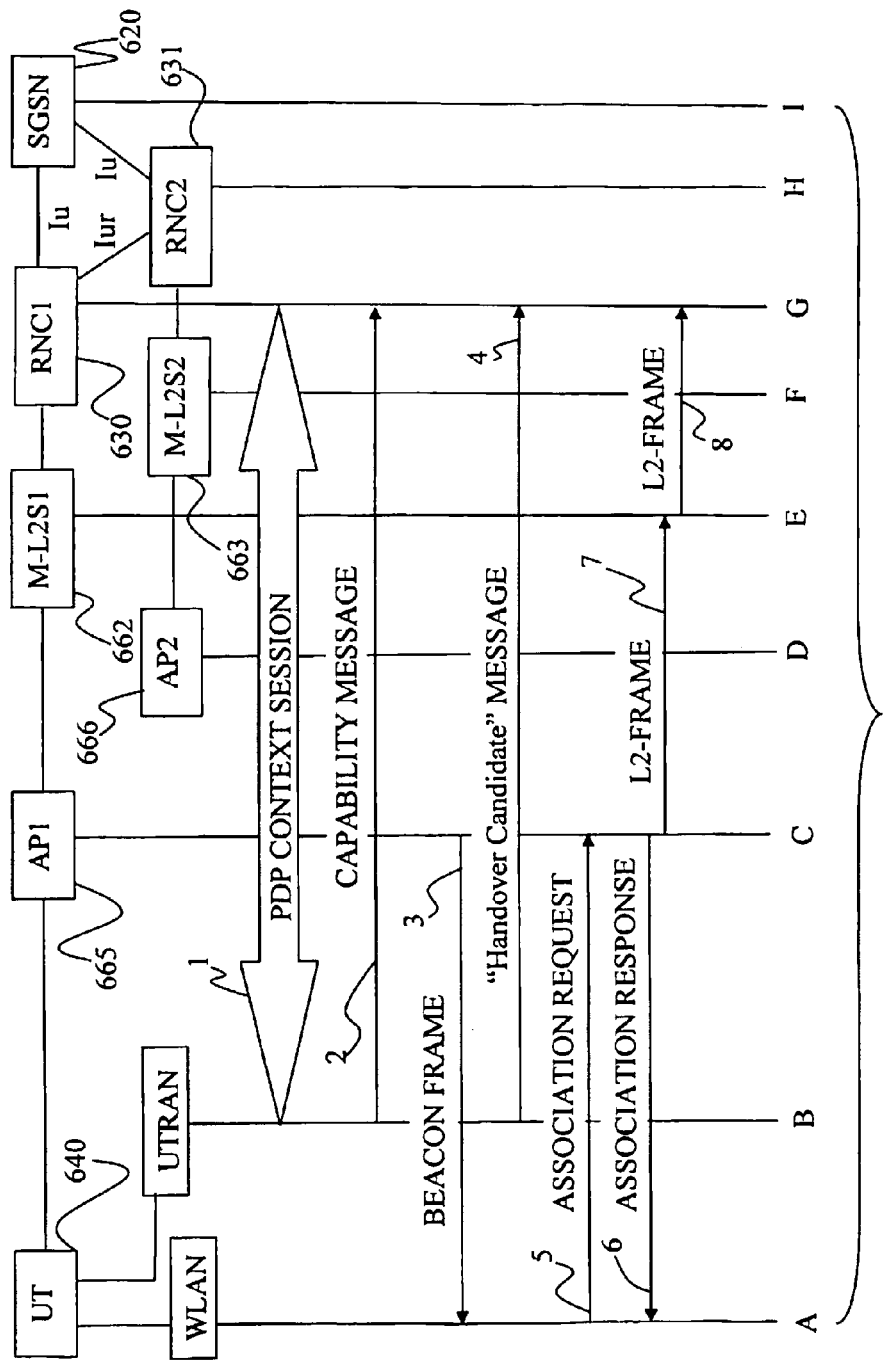

Thereafter, in step 6060, the UT 240 sends an association request message, in accordance with the IEEE 802 standard, to the AP1 265, in order to initiate the WLAN connection set-up, which is illustrated by communication step 5 in FIG. 7A. This message comprises the UT s 240 WLAN MAC address. The AP1 265 updates its bridging table accordingly by associating its relevant port with the UT's 240 WLAN MAC address. Said association request message may also comprise the PDP context session identifier, e.g. the RB ID or RAB ID or the IP-address of the PDP context session or the UT's 240 NSAPI, for the relevant PDP session, the reason for which is explained further below. The AP1 265 responds by sending an Association Response message, as an 802.11 message, to the UT 240, as illustrated by communication step 6 in FIG. 7A. The UT 240 receives this Association Response message and has thus an established radio connection with the WLAN via its second (WLAN) port 242.

In step 6070, the AP1 265 continues according to the IEEE 802 standard by broadcasting a layer 2 update frame towards the WLAN Distribution System (DS), i.e. to the M-L2S1 262 towards the RNC1 230, as illustrated by communication step 7 in FIG. 7A. Said L2 update frame may also comprise a PDP context session identifier for RNC 1230, sent to AP1 265 in step 6060.

In step 6080, the M-L2S1 262 responds by forwarding this layer 2 update frame to the RNC1 230, as illustrated by communication step 8 in FIG. 7A. This layer 2 update frame comprises the WLAN MAC address of the UT 240 as MAC source address and is preferably multicasted. The purpose of this layer 2 frame is to cause the forwarding or bridging tables in any layer 2 devices that receive the frame to be updated accordingly with the UT's 240 MAC address, i.e. to associate the port that received this frame with the UT's 240 MAC address, so that all future traffic destined to the UT 240 is forwarded to the correct port, i.e. to the port which received this frame. Assuming the use of multicast-enabled switches (M-L2Ss), in order to avoid flooding of layer 2 frames and thus too high traffic in operator's network, the layer 2 update frames is preferably multicast to a group, to which neighbouring APs, serving the RNC1 230 and the corresponding M-L2S1 262 belong. In this case, each AP thus knows the Layer 2 network topology to a certain extent. e.g. by having a stored table of MAC-addresses of its neighbouring APs and associated M-L2Ss. The layer 2 update frame may also comprise said PDP context session identifier, e.g. the RB ID or RAB ID or the IP-address of the PDP context session or the NSAPI, for the relevant session, sent by UT 240 to AP1 265 in step 6060.

In step 6090, the AP1 265 decides whether to send an IAPP-ADD.Notify packet or not, depending on how it is pre-configured. As a person skilled in the art realizes, instead of an IAAP-ADD.Notify packet, a corresponding message according to another protocol could be used, e.g. a message according to the LWAPP. This IAPP-ADD.Notify packet is not mandatory for the AP1 265 to send and step 6090 may be omitted, i.e. the method according to the invention may proceed to step 6100 directly after step 6080. In case the AP1 265 is pre-configured to send an IAPP-ADD NOTIFY packet, this packet is normally sent as UDP/IP packet, in accordance with the IAPP protocol and IEEE 802 standard mobility functionality, in order to notify other APs connected to RNC 1 230 about the new association of UT 240 at the (new target) AP1 265. This is illustrated by communication step 9 in FIG. 7B. The IAPP packet normally comprises the UT's 240 WLAN MAC address and a sequence number, which indicates the packet's validity, in a conventional manner. The multicast IP address should preferably be selected so that only the RNC 1 230 and other APs, which are geographically close to the sending AP1 265, receive the IAPP packet. This in order to reduce the signalling within the WLAN domain. The intermediate M-L2S1 262 is therefore preferably pre-configured accordingly, i.e. it has a stored list of IP-addresses for multicasting the received LAPP-ADD.Notify packet. Step 6090 has the main purpose to inform the APs in the Layer 2 Network (i.e. WLAN) which AP actually is selected to communicate with the UT 240, so that a radio communication may be handed over correctly from one AP to another. Step 6090 constitutes part of conventional RRM (Radio Resource Management) of L2-RNs. The IAPP-ADD.Notify packet may, according to the invention, also comprise conventional WLAN Radio Resource Management parameters such as e.g. current cell load, signal strength etc for the established WLAN radio channel between UT 240 and AP1 265. This may be carried out by adding said WLAN RRM parameters in a specific context container in the IAPP-ADD.Notify packet, as a person skilled in the art realizes. Thus, an even more effective/versatile MRRM functionality may be provided for the entire RAT network. The IAPP-ADD.Notify packet may according to the invention also comprise said PDP context session identifier, e.g. the RB ID or RAB ID for the relevant session, sent from UT 240 to AP1 265 in step 6060. Thus, in one alternative embodiment, the method proceeds directly to step 6100 from step 6080 and no IAPP-ADD.NOTIFY Packet is sent.

In step 6100, in case UT 240 is pre-configured not to send a capability message in step 6010, the MRRM entity of UT 240 forms and transmits a capability message either as described above over the UTRAN path or alternatively over the WLAN part, and the MRRM entity of RNC 1230 receives this capability message and extracts the relevant parameters and makes the appropriate associations, as described above. Still another possibility, in case no capability message has been sent at this point, is that the radio link message sent from UT 240 to AP1 265 in step 6060 may also comprise a PDP context session identifier, e.g. the 3GPP RB ID 1 or 3GPP RAB ID 1 for the relevant session, and this session identifier is forwarded to the RNC 1230 e.g. with the layer 2 update frame to the RNC 1230, or with said IAPP-ADD.Notify packet, as described in above steps, 6060, 6070, 6080 and 6090, and hence the MRRM entity of RNC1 230 may interpret this received layer 2 update frame, or the IAPP-ADD-.Notify packet described in step 6090 as a capability message. Still another possibility is that the MRRM entity of UT 240 forms a capability message comprising the UT's alternative network address (Network Address), i.e. the UT's 240 WLAN address in this case, the PDP context session identifier for the specific PDP context session in question, i.e. the 3GPP RAB ID 1 or 3GPP RB ID 1 or the IP-address of the PDP context session or its associated NSAPI, and transmits this capability message to the RNC1 230 via the UTRAN path. e.g. by using the DCCH, or via the WLAN path by transforming said capability message into LLC 802.2 frame format and multicasting said LLC 802.2 frame to the AP1 265. Alternatively, said capability message (LLC frame) is sent to the RNC1 230 as a dedicated message in case the RNC's MAC address is known to the UT 240 (e.g. has been signalled over the UTRAN path). The MRRM entity of RNC1 230 then receives this capability message and associates the alternative network address, i.e. the WLAN address of UT 240 with the specific UT 240, with the specific PDP context session identifier, i.e. the 3GPP TEID 1, in the same manner as in step 6020 above.

Furthermore, in step 6100, the RNC1 230 and UT 240 create an alternative routing identifier, respectively, in form of a specific WLAN radio bearer identity intended for the specific PDP context session, here referred to as a WLAN RB ID 1 as illustrated in Table 4 below, and associate their ROUTING tables accordingly. The RNC 1230 thus associate this WLAN RB ID 1 with the alternative network address, i.e. the WLAN MAC address, of the UT 240 (comprised in the L2-update frame received on port 372), and also associates the WLAN RB ID 1 with port 372. Analogously, the UT 240 associates its WLAN RB ID 1 with the PDP context session and its WLAN port 242. Thus, the Routing entity of RNC 1230 associates the relevant PDP context session (i.e. session 1) with said alternative network address (UT's 240 WLAN MAC address), said alternative routing identifier, i.e. WLAN RB ID 1, and port 372, by updating its routing table as illustrated in Table 4. Thus, the alternative routing identifier is defined according to a standard protocol routing scheme of said alternative access network, i.e. the WLAN in this case. Alternatively, the alternative routing identifier may be signalled to the RNC1 230 from the UT 240. Since the alternative routing identifier is created according to the same criteria, e.g. regarding QoS parameters forming input values to the same "alternative" routing—and session management scheme, i.e. the WLAN scheme, the alternative routing identifier is identical at RNC1 230 and UT 240.

TABLE 4

| PDP Session | 3GPP RB ID | 3GPP RAB ID | UT | TEID/ GTP-U assoc. | WLAN RB ID | Alternative network address | Data Port | RNC assoc. of AP1 |
|---|---|---|---|---|---|---|---|---|
| Session 1 | RB ID 1 | RAB ID 1 | UT 1 | TEID 1/ GTP-U- RNC1 - SGSN | WLAN RB ID 1 | UT's WLAN MAC address | 272 | IP-address of RNC1 |

In step 6100, the RNC1 230 however continues to route user data of the PDP context session through the UTRAN path, i.e. via port 273, by continuing to bind the TEID of the PDP context session to the UTRAN (3GPP) RAB ID and the (3GPP) RAB ID to the (3GPP) RB ID. Thus the TEID binds to the 3GPP RB ID. The method then proceeds to step 6110.

In step 6110, the MRRM entity of UT 240 sends an association message to the RNC1 230 or does not send an association message to RNC1 230, depending on its pre-configuration. The association message informs the RNC1 230 that the UT 240 has established a radio connection with the WLAN and that a handover of the PDP context session from the UTRAN path to the WLAN path now is physically possible. One possibility, e.g. in case a capability message was sent over the WLAN path in step 6100, is that this capability message also functions as an association message and no "further" association message is sent and the method then proceeds directly to step 6140. Alternatively, above described "Handover Candidate" message may also function as an association message, e.g. in case this "Handover Candidate" message is transmitted after that the UT 240 is physically associated with AP1 265 (i.e. after having received the Association Response message from AP1 265). What is important according to the invention is that the MRRM entity of RNC1 230 is informed that the UT 240 has an established radio connection with AP1 265. Many possibilities exist and the "capability message", "Handover Candidate" message and association message are to some extent interchangeable, as a person skilled in the art realizes. In case the MRRM entity of UT 240 is configured to form and send an association message at this stage the method proceeds to step 6120.

In step 6120, the MRRM entity of UT 240 forms an association message comprising the UT's 240 alternative network address, i.e. the WLAN address in this case, and normally also a session identifier for the specific PDP context session, i.e. the 3GPP RAB ID 1 or RB ID 1 in this case, normally also along with some information stating that the UT 240 has established a radio connection with the WLAN, e.g. a "radio establishment identifier", and sends this association message to the RNC 1 230 over the UTRAN path, e.g. as a RRC message exploiting the DCCH, or, over the WLAN as a multicast frame message, or, in case the RNC's MAC address is known to the UT 240, e.g. it has been signalled over the UTRAN path from the RNC1 230 at an earlier stage, the association message may be sent over the WLAN as a dedicated L2 message having the RNC's MAC address as destination address. In case the association message is sent over the WLAN path, normally the association message does not comprise said "radio establishment identifier". Many possibilities exist how to form and combine the capability message, Handover Candidate message and the association message. For instance, in case the association message also comprises the specific session identifier, the association message may also function as a capability message, and the method according to the invention does not require that the UT 240 send any specific capability message to the RNC 1230. Thus, these messages are to some extent interchangeable according to the invention, as already stated. Furthermore, an association message can be sent by the UT 240 over the UTRAN path e.g. immediately after receiving the Association Response message from the AP1 265 in step 6060, but many possibilities exist. As stated above, the association message normally comprises information which uniquely identifies the specific PDP context session. In this way, the UT 240 can control which PDP context session/s, among a set of ongoing PDP context session/s, for which a handover may be desirable.

In step 6130, the RNC1 230 receives said association message, extracts the alternative network address of UT 240, and possibly also the "radio establishment identifier" in case the association message comprises such an identifier, and updates its routing table accordingly by setting the alternative routing identifier, i.e. the WLAN RB ID 1 in this case, to become an actual active binding candidate for the session identifier, i.e. TEID 1, to bind to. This means that the RNC1 230 from this point may route the PDP context session through the UTRAN radio interface, i.e. via port 273, by binding the session identifier, i.e. the TEID, of the PDP context session to the first routing identifier, i.e. the (3GPP) RB ID in this case, or route the PDP context session through the WLAN radio interface, i.e. via port 272, by binding the session identifier, i.e. the TEID 1 in this case, of the PDP context session to the alternative routing identifier, i.e. the WLAN RB ID 1 in this case. In case the association message uniquely identifies a specific session, among a set of active PDP sessions for the UT 240, the RNC 1 230 updates only the specific alternative routing identifier, i.e. the WLAN RB ID 1 in this case, to become an actual active binding candidate for the session identifier to bind to. In case the association message does not identify a specific session, i.e. it comprises only the alternative network address of UT 240 along with some information element stating that the UT 240 has established a radio connection with the WLAN, then the RNC1 230 normally updates all alternative routing identifiers for all PDP sessions, associated with UT 1240, to become actual active binding candidates for all the sessions. In one embodiment, e.g. in case the RNC1 230 has received a capability message uniquely identifying the specific PDP context session, the "radio establishment identifier" may be omitted in the association message and the RNC1 230 automatically interprets the association message accurately, since it is the second time the RNC 1230 receives the alternative network address of UT 240. The method then proceeds to step 6140.

Thus, in step 6140, the RNC1 230 is capable of routing the PDP context session of UT 240 through the UTRAN path, i.e. via port 273, by binding the session identifier, i.e. the TEID, of the PDP context session to the first routing identifier, i.e. the (3GPP) RB ID in this case, or route the PDP context session through the WLAN path, i.e. via port 272, by binding the session identifier, i.e. the TEID 1 in this case, of the PDP context session to the alternative routing identifier, i.e. the WLAN RB ID 1 in this case. In step 6140, a decision is taken to switch the routing of said PDP context session from said cellular radio network path (UTRAN path), via node B 250 and ports 273 and 241, to said alternative data network path (WLAN path), via ports 372 and 242. According to the invention, this decision may be taken by the MRRM entity of UT 240 or the MRRM entity of RNC 1230 based on various RRM information. The exact criterion/criteria for this decision is not subject of the present invention, as already stated. The MRRM entity of RNC1 230 may e.g. receive a RRM (radio resource management) message/s, comprising information regarding e.g. cell load, radio channel quality, BER, FER, from AP1 265 by using a conventional WLAN radio resource management protocol, i.e. the IAPP protocol. The AP1 265 collects this RRM information by means of an installed conventional APME application and a cooperating conventional STAME application installed at UT 240, as illustrated in FIG. 4. The IEEE 802.11k signalling standard may be used in order to report the AP's 265 radio/cell-RRM information, e.g. channel load, traffic load, transmission success statistics, WLAN channel quality etc., for an IEEE 802.11 WLAN, to the RNC 1230. As discussed above with reference to step 6090, the IAPP-ADD.Notify packet may comprise Radio Resource Management parameters such as cell load, signal strength, available data rates etc of the WLAN connection. Alternatively, the UT-MRRM entity of UT 240 performs measurements regarding the radio link quality for both the UTRAN link and the WLAN link, and transmits a measurement report (RRC message) to the MRRM entity of RNC1 230, e.g. on the uplink DCCH, e.g. by exploiting the conventional UTRAN RLC protocol, or over the WLAN path by exploiting the LLC/WLAN-MAC protocol if the RNC1's MAC-address is known to the UT 240, i.e. it has been signalled earlier, or by means of UDP/IP. The measurement report may comprise parameter values regarding the signal strength, QoS, BER, FER, interference level, velocity of UT 240 etc for the UTRAN radio link/s and or WLAN radio link/s. The MRRM entity of RNC1 230 may take the decision in step 6140 to perform a handover from the UTRAN routing path to the WLAN routing path e.g. if the WLAN currently offers a better/higher QoS level than the UTRAN or if the traffic load level of the UTRAN network exceeds a specific threshold value, or may decide to maintain the UTRAN routing path e.g. because the velocity of the UT 240 is too high, but many possibilities exist. Alternatively, the MRRM entity of UT 240 takes the decision to switch the routing of the PDP context session to the WLAN routing path, e.g. based on said measured MRRM parameter values and/or radio resource management information received from AP1 265, signalled using the cooperating STAME-APME applications, illustrated in FIG. 4. The UT 240 then signals this handover decision to the MRRM entity of RNC 1230, e.g. as a RRC message. In one alternative embodiment, the WLAN routing path of the PDP context session is always preferred because of metering parameters, i.e. cost/minute or transferred Kbit. In this way, the invention provides a possibility to develop completely new and more efficient MRRM functionality which takes into account both the UTRAN and other integrated L2-RN, since the MRRM entities of RNC1 230 and/or UT 240 has access to both UTRAN and WLAN RRM information. Alternatively, the invention provides a possibility to provide a MRRM functionality at the AP1 265, or distributed MRRM functionality, i.e. various MRRM tasks are carried out at different nodes in the RAT network. Normally, the MRRM of RNC1 230 takes the handover decisions, which gives specific advantages described above.

According to the method of the invention, the method remains in step 6140 until a decision has been taken to handover the PDP context session to the WLAN routing path by a particular MRRM entity in the network (normally the MRRM of RNC1 230), i.e. until a RAT handover criterion of said MRRM entity is fulfilled, and then proceeds to step 6145.

In step 6145, the MRRM entity that took the handover decision in step 6140 informs the MRRM entity of RNC 1230 of this handover decision, e.g. signalled over the UTRAN or WLAN path. The MRRM entity of RNC1 230 then accepts this handover decision and sends a "Physical Channel Reconfiguration" message to UT 240, illustrated by communication step 9A in FIG. 7B, which informs the UT 240 about the handover decision, and that UT 240 from now on actively shall listen for downlink session packets also from AP1 265. This message is normally realised by means of the RRC/RLC protocol and is sent over the BCCH to UT 240 via Node B 250. For instance, the 3GPP "Physical Channel Reconfiguration" message could be used by adding information elements for identifying radio access node/s defined according to the alternative access network protocol, e.g. could the WLAN MAC address of AP1 265 be used here as such information element, however, this message could also be sent over the WLAN path at this stage, as a person skilled in the art realizes.

Figure 7B:
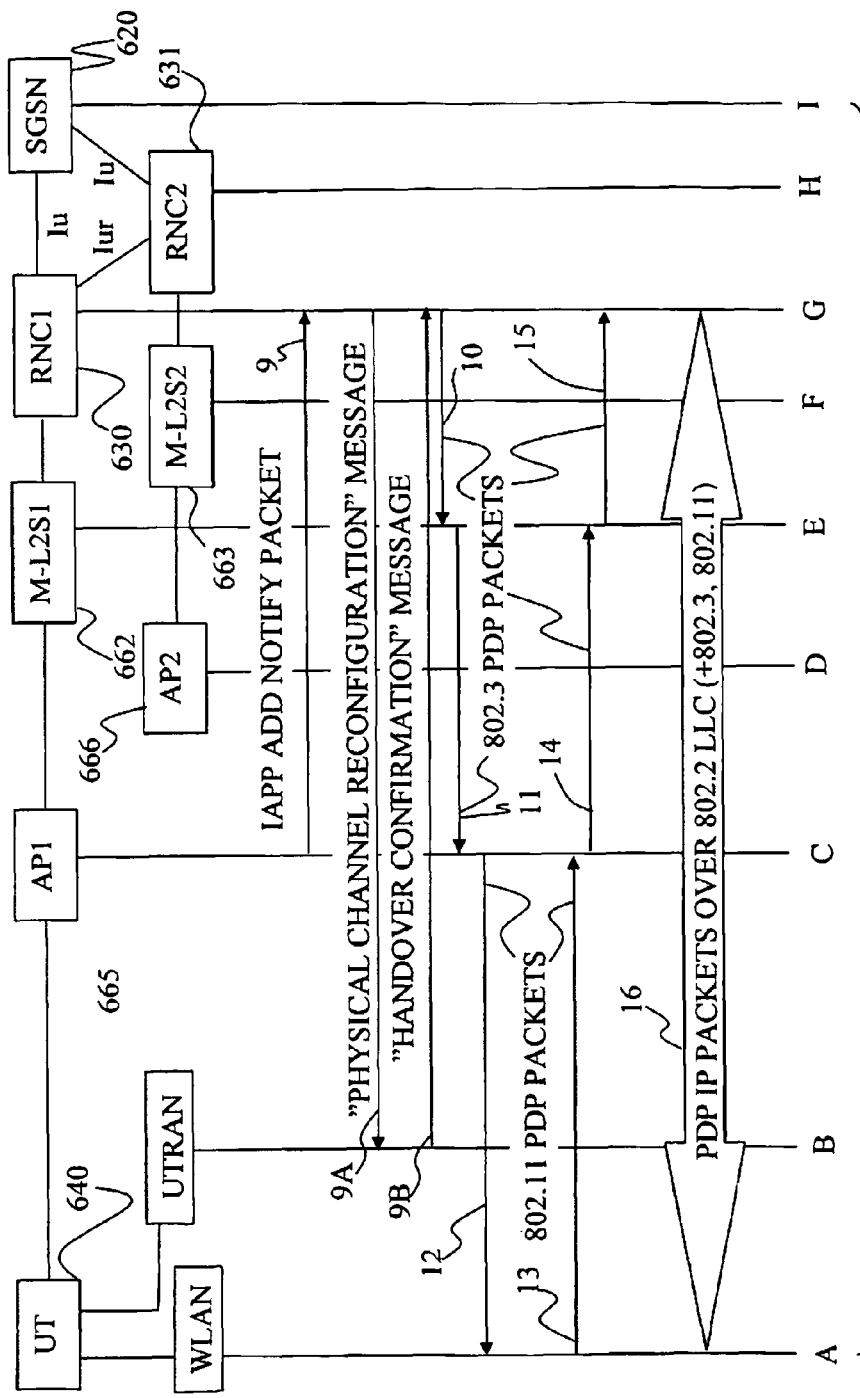

In step 6147, the UT 240 informs the RNC1 230 that the handover decision is accepted by UT 240 and that UT 240 is associated with AP1 265 by sending a "Handover Confirmation" message, illustrated by communication step 9B in FIG. 7B. This message comprises:

a message type identifier identifying said message as being a "Handover Conformation" message, a disassociation information element and the network address of a radio access point, Node B (250) in this case, with which the UT (240) is no longer associated for routing the session, and, a handover confirmation information element along with the network address of a target radio access point, AP1 (265) in this case, with which the UT (240) is currently associated for routing the session. The "Handover Confirmation" message may e.g. be realised by means of the 3GPP RRC "Measurement Report" message wherein the information, which indicates AP1 (265) as new access point, may be contained in the "Additional Measured Results" information element. The purpose of this "Handover Confirmation" message is to inform the RNC1 230 that it from now on shall route downlink packets only via the handover target access node, and it may be advantageous to send this message at a later stage, e.g. after communication step 12 in FIG. 7B, in order to provide "soft handover" capability. The method then proceeds to step 6150.

In step 6150, the MRRM entity of RNC 1 230 then actuates the handover of the PDP context session from said cellular radio network path (UTRAN) to said WLAN routing path, i.e. switches user plane transmission from the UTRAN path to the WLAN path, by instructing the Routing entity of RNC1 230 to from now on bind the PDP context session identifier, TEID 1, to the alternative radio bearer identity, i.e. the WLAN RB ID 1 in this case, instead of to the conventional 3GPP RB ID, in table 4, thereby starting to route downlink IP packets of the PDP session as encapsulated IEEE LLC 802.2 packets through the WLAN routing path via port 272, instead of through the UTRAN path via port 273. The transmission switch is crucial for the downlink IP packets received by RNC 1230 from SGSN 220 through the corresponding GTP-U tunnel. In conventional user plane transmission the RNC decapsulates the IP packets from the GTP-U PDU and encapsulates them with PDCP prior to transmission over UTRAN channels. The invention allows seamless transmission switching without data loss by having the Routing entity of RNC1 230 carrying out the following steps:

1. All downlink IP packets that have already been encapsulated and cached as PDCP packets before the inter-RAT (Radio Access Technology) handover is decided, are transmitted to the UT 240 using the UTRAN path. Such IP packets may be cached at RNC 1230 because they are waiting for their transmission or they have been transmitted to UT 240 but have not yet been confirmed. As long as RNC1 230 receives uplink IP packets from UT 240 through its UTRAN routing path, the RNC's 230 RLC entity acknowledges the packet reception using the UTRAN path (in case that RLC acknowledged mode is used).

2. In case that an acknowledged mode RLC service is configured in the PDP context for user plane transmission, an LLC connection set-up is normally first carried out between the LLC entities at the RNC1 230 and the UT 240 to allow acknowledged transmissions of LLC type 2 frames. This is normally done by letting the RNC 1230 send a LLC set up connection message frame to UT 240, before the first (downlink) PDP-IP packets are transmitted as Ethernet 802.3 frames, using the LLC type 2 connection service (acknowledged mode).

3. All downlink IP packets de-capsulated from the GTP-U PDUs after the inter-RAT handover is decided in step 6140, are encapsulated as LLC/Ethernet frames with the UT's 240 WLAN MAC address as destination address and RNC1's 230 MAC address as source address. These frames are then sent through the RNC1's 230 (Ethernet) port 372 towards the UT 240, normally through one or several M-L2Ss, and through the WLAN AP1 265.

The downlink LLC/Ethernet frames created in the (Routing entity of) RNC 1 230 in step 6150 are then transmitted on RNC1's 230 port 372 to the M-L2S1 262, as illustrated by communication step 10 in FIG. 7B. These are LLC/Ethernet 802.3 frames comprising the downlink PDP IP packets. Since the M-L2S1 262 and AP1 265 have updated their bridging tables at this point, these downlink Ethernet frames are routed accurately through the WLAN towards UT 240 in step 6150, as illustrated by communication steps 11 and 12 in FIG. 7B. The Routing entity of RNC1 230 may add a session identifier for the specific session, e.g. the WLAN RB ID 1 or 3GPP RB ID 1 in this case, in the LLC frames before encapsulating the downlink packets as LLC/Ethernet frames. This provides a possibility for the Routing entity of UT 240 to uniquely identify the specific PDP session to which the downlink LLC PDP IP packet relates, when received via the WLAN routing path via port 242.

In step 6160, the M-L2S1 262 forwards the received downlink LLC/Ethernet 802.3 frames towards the UT 240, i.e. to the AP1 265. The AP 1 265 transforms the downlink IEEE 802.3 frames to conventional IEEE 802.11 frames and transmits these to the UT 240.

In step 6170, the UT 240 switches the routing path of said PDP context session from the UTRAN routing path to the alternative WLAN routing path after receiving the alternative network source address of RNC1 230, NSA, i.e. the WLAN MAC address of RNC1 230 in this case. For instance, the UT 240 may extract said NSA from said LLC set up connection frame or from the first received LLC 802.2 PDP downlink IP packet from RNC 1230. Alternatively, the RNC1's 230 MAC address was signalled to the UT 240 at an earlier stage. The Routing entity of UT 240 then updates its routing table by associating the session identifier/s with the RNC1's NSA, i.e. the WLAN MAC address of RNC1 230 in this case. In case the UT 240 executes said routing path handover after having received the first PDP-IP packets, the UT 240 decapsulates the received downlink IP-PDP packets from the LLC/802.11 frames and identifies that the WLAN transmission path is successfully set up since it can receive PDP user data via its WLAN interface. The UT 240 then updates its routing table accordingly by binding the relevant PDP context session identifier, i.e. 3GPP RAB ID 1 to the WLAN RB ID 1 in the same manner as described for the RNC1 230.

TABLE 5

| PDP Session | 3GPP RB ID | 3 GPP RAB ID | NSAPI | NSA of RNC | WLAN Radio Bearer ID | Application |
| --- | --- | --- | --- | --- | --- | --- |
| Session 1 | RB ID 1 | RAB ID 1 | NSAPI 1 | RNC's MAC address | WLAN RB ID 1 | Web browsing |
| Session 2 | RB ID 2 | RAB ID 2 | NSAPI 2 | | | E-mail |
| Session N | RB ID N | RAB ID N | NSAPI N | | | Multimedia download |

The UT 240 executes said routing path handover after having received the first PDP-IP packets. The UT 240 decapsulates the received downlink IP-PDP packets from the LLC/802.11 frames and identifies that the WLAN transmission path is successfully set up since it can receive PDP user data via its WLAN interface. The UT 240 then updates its routing table, i.e. table 5, accordingly by binding the relevant PDP context session identifier, i.e. 3GPP RAB ID 1 to the WLAN RB ID 1. The UT 240 thus terminates its uplink transmission through its UTRAN transmission port 241 and starts to transmit the subsequent uplink PDP IP packets through its WLAN port 242, as LLC/Ethernet 802.11 frames to AP 265. More specifically, the switch of user plane transmission at the UT 240 normally comprises the following steps, carried out by the Routing application entity of UT 240:

1. As similarly done by RNC 1230 for downlink IP packets, all uplink IP packets that have been encapsulated and cached as PDCP packets at UT 240 before deciding the inter-RAT transmission switch, are transmitted to the RNC1 230 using the UTRAN path, i.e., using the allocated UTRAN radio bearers/channels. Such IP packets might be cached because they are waiting for their transmission or they have been transmitted to RNC1 but are not yet acknowledged. As long as UT 240 receives downlink IP packets from RNC 1230 through its UTRAN transmission path, UT's 240 RLC entity acknowledges the packet reception using the UTRAN path, too (in case that RLC acknowledged mode is used).

2. As indicated in the DSAP (Destination Service Access Point) field of the received LLC frames through its WLAN interface, the extracted payload, i.e., downlink PDP IP packets, shall be forwarded to the overlying IP layer at UT 240.

3. After receiving the first downlink IP packet through its WLAN port 242, the Routing entity of UT 240 binds the data session identifier, i.e. the 3GPP RAB ID 1, to the alternative routing identifier, i.e. the WLAN RB ID 1, which means that it stops encapsulating the uplink PDP IP packets with PDCP and instead encapsulates them as LLC/802.11 frames using the UT's 240 WLAN MAC address as source address and RNC1's 230 WLAN MAC address as destination address. These frames are then sent via the WLAN interface through port 242 to AP1 265, as illustrated by communication step 13 in FIG. 7B.

In step 6180, the AP1 265 transforms the IEEE 802.11 uplink frames from UT 240 to IEEE 802.2 frames and sends these to the M-L2S1 262. The M-L2S1 262 then forwards these IEEE 802.2 frames to the RNC1 230, illustrated by communication steps 14 and 15 in FIG. 7B.

In step 6190, the Routing entity of RNC 1230 extracts the PDP IP packets from the received IEEE 802.2 LLC/Ethernet frames, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's WLAN MAC address (indicated as source address of the uplink Ethernet frames), the WLAN RB ID 1 and the TEID 1 established for the PDP context in question, as described above. Thus, at this point, the handover of the PDP context session in the up- and downlink from the UTRAN routing path via Node B 250 to the WLAN routing path via AP1 265 is now completed, as illustrated by communication step 16 in FIG. 7B.

It should be noted that the encapsulation of IP packets with GTP-U between RNC1 230 and SGSN 220, as well as between SGSN 220 and GGSN 210 remain unchanged during the entire inter RAT handover and afterwards. No change of IP addresses of the PDP IP packets is made either. This is advantageous in order to provide session continuity with the remote Internet host or peer and eliminates the delay caused by DHCP (Dynamic lost Protocol Configuration) for assigning a new IP address.

Thus, at this stage RNC1 230 is arranged to route said session through a first radio access network path via its first port (273) according to the 3GPP UTRAN protocol by binding a session identifier unambiguously identifying said session, i.e. TEID1 in this case, to a radio bearer (i.e. 3GPP RB ID) according to the 3GPP UTRAN protocol, and said RNC 1 230 is further arranged to route said session through the alternative radio access network path (i.e. WLAN path) via a second port (272) by binding said session identifier to an alternative bearer identifier (WLAN RB ID1) being defined according to the IEEE 802.2 standard The method then proceeds to step 6200 or alternatively directly to step 6220 depending on the pre-configurations of UT 240/RNC 1230 and other considerations explained below.

In step 6200, the UTRAN radio traffic channel associated with said session is revoked. This is actuated by the MRRM entity of RNC1 which trigger the channel allocation entity to revoke said traffic channel. This off-loads the UTRAN and provides an advantageous solution wherein control plane information is signalled through the Node B 250, which normally has a larger coverage area than the AP1 265, while user plane data of the session is contemporaneously routed over the (hot spot) AP1 265, which opens up for a more flexible and efficient radio resource allocation for the entire RAT network. The method then proceeds to step 6210.

In step 6210, the dedicated UTRAN control channel/s (DCCH) allocated to UT 240 are revoked and the UT 240 enters the so called idle mode, wherein the UT 240 only listens for new incoming calls and the UTRAN only updates the roaming information associated with UT 240, in a conventional manner. This may be advantageous e.g. in order to further off-load the UTRAN and/or in case there are plenty of high quality radio resources available via the WLAN path (investigated and established e.g. by the MRRM entity of UT 240). This provides a possibility for an even more flexible and effective radio resource allocation for the entire RAT network. The control plane data associated with the PDP session along with other (M)RRC information (measurement reports etc.) is then routed over the WLAN path by means of above described IAPP protocol along with the STAME and APME entities at UT 240 and AP1 265. Above described LWAPP could be used instead of the IAAP protocol.

In step 6220, the session is thus routed through the WLAN path wherein control plane signalling associated with the session and/or RRM messages are signalled through the UTRAN path in a conventional manner and/or the WLAN path, e.g. by means of signalling measurement reports according to the IEEE 802.11k standard between UT 240 and AP1 265 and by means of the IAPP/LWAP protocol between AP1 265 and RNC1 230. This allows for a more flexible multi RRM functionality of the network.

Now, different types of inter RNC handover scenarios shall be described as a consequence of the UT 240 roaming into the "coverage area" of RNC2 231.

In general, four principal handover types are now possible in case the UT 240 is roaming into the "coverage area" of RNC2 231 depending on the coverage areas of AP1 (265) and Node B associated with RNC 1 (230), and AP2 (266) and Node B (251) associated with RNC2 (231):

1. Both the session and the control plane information are currently routed/signalled through the AP1 (265) associated with the RNC1 (230) and, at a certain point, the Beacon signal of UTRAN Node B (251) associated with RNC2 (231), becomes stronger than the Beacon signal of AP1 (265), and a session handover and control plane handover from the WLAN path associated with AP1 (265) to the UTRAN path associated with the Node B (251) of RNC2 (231) may be desirable, here referred to as handover type 1.
2. The session is currently routed through the AP1 (265) and control plane information associated with the session is currently signalled through the Node B (250) associated with the RNC 1 (230), and, at a certain point, the Beacon signal of Node B (251) associated with RNC2 (231), becomes stronger than the Beacon signal of Node B (250) associated with RNC1 (230), and a control plane handover from the UTRAN path associated with Node B (250) of RNC 1 (230) to the UTRAN path associated with the Node B (251) of RNC2 (231) may be desirable, referred to as handover type 2.
3. The session is currently routed through the AP1 (265) and control plane information associated with the session is currently signalled through the Node B (250) associated with the RNC1 (230), and, at a certain point, the Beacon signal of AP2 (266) associated with RNC2 (231), becomes stronger than the Beacon signal of AP1 (265) associated with RNC1 (230), and a session handover from the WLAN path associated with AP1 (265) and RNC1 (230) to the WLAN path associated with AP2 (266) and the RNC2 (231) may be desirable, referred to as handover type 3. Normally, the control plane signalling continues to be routed through Node B 250, but other possibilities exist.
4. Both the session and the control plane information are currently routed/signalled through the AP1 (265) associated with the RNC1 (230) and, at a certain point, the Beacon signal of AP2 (266) associated with RNC2 (231), becomes stronger than the Beacon signal of AP1 (265) associated with RNC1 (230), and a session and control plane handover from the WLAN path associated with AP1 (265) and RNC1 (230) to the WLAN path associated with AP2 (266) and the RNC2 (231) may be desirable, here referred to as handover type 4.

The method then proceeds to step 6230 from step 6220. In step 6230, the UT 240 roams into the coverage area of AP2 266, and associates with the AP2 266. The association with AP2 (266) is analogous with the association with AP1 (265) described above in step 6060, and is illustrated by communication step 17 in FIG. 7C. The method proceeds to step 6240.

Figure 7C:
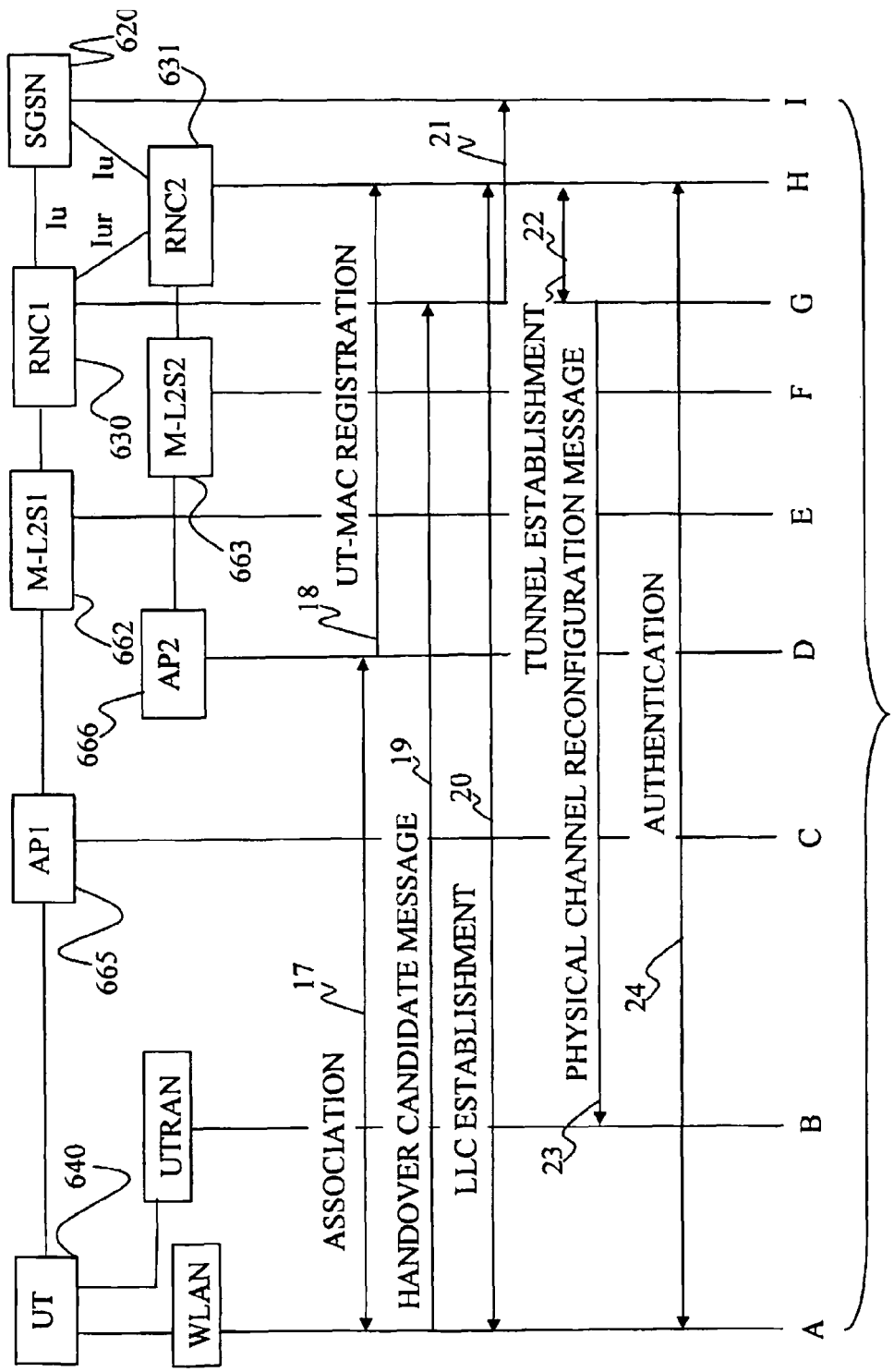
Figure 7D:
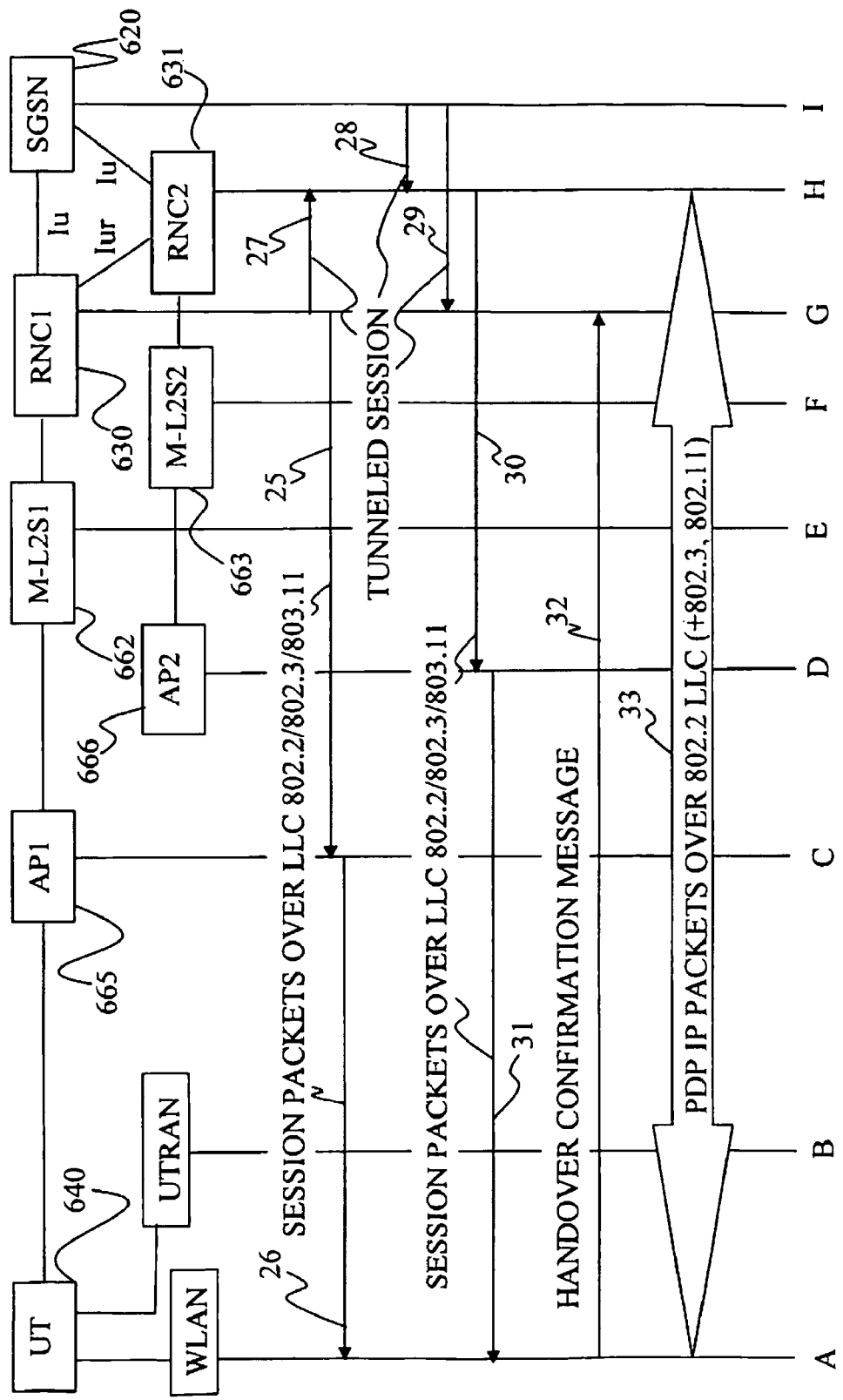
Figure 8A:
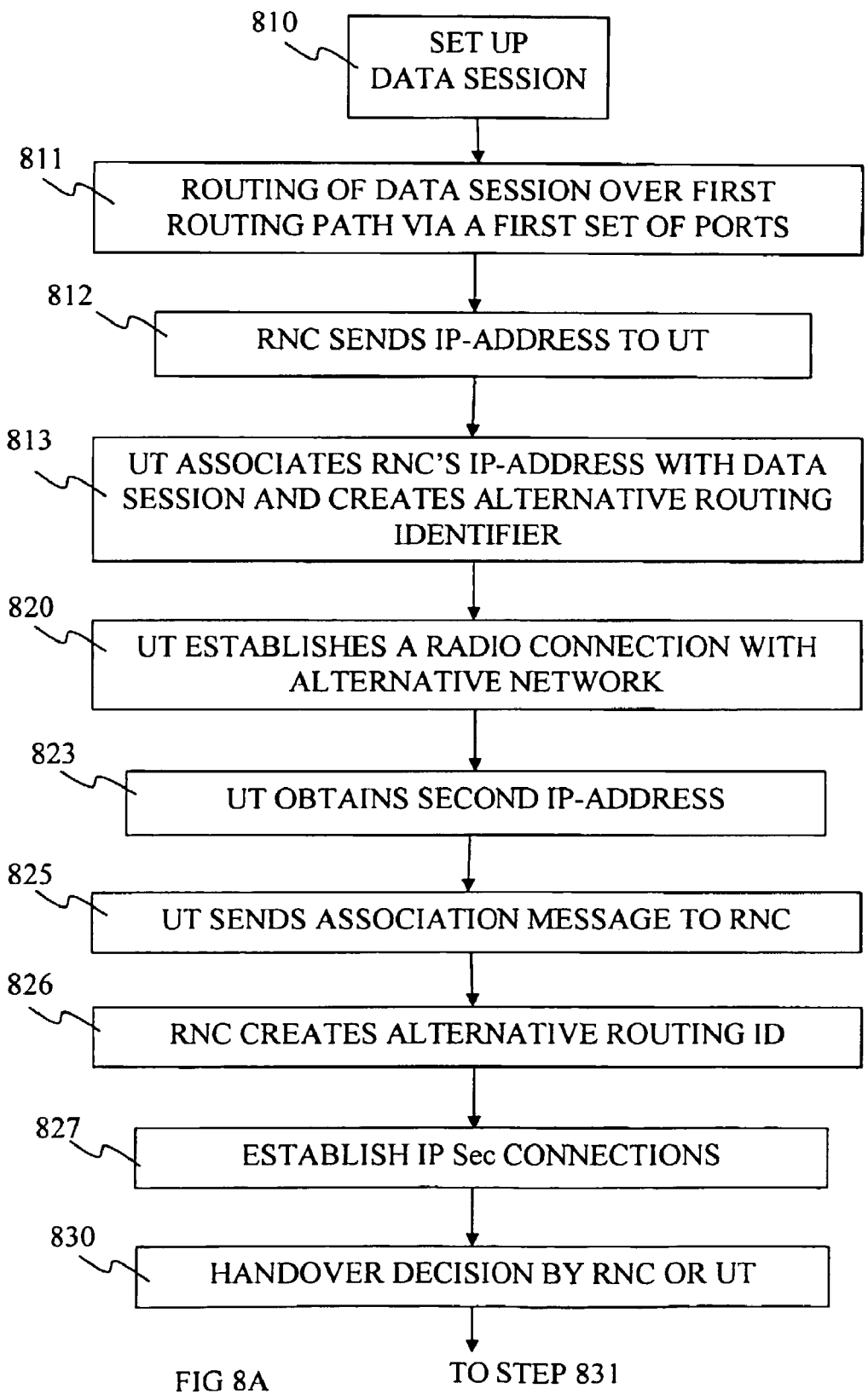
Figure 8B:
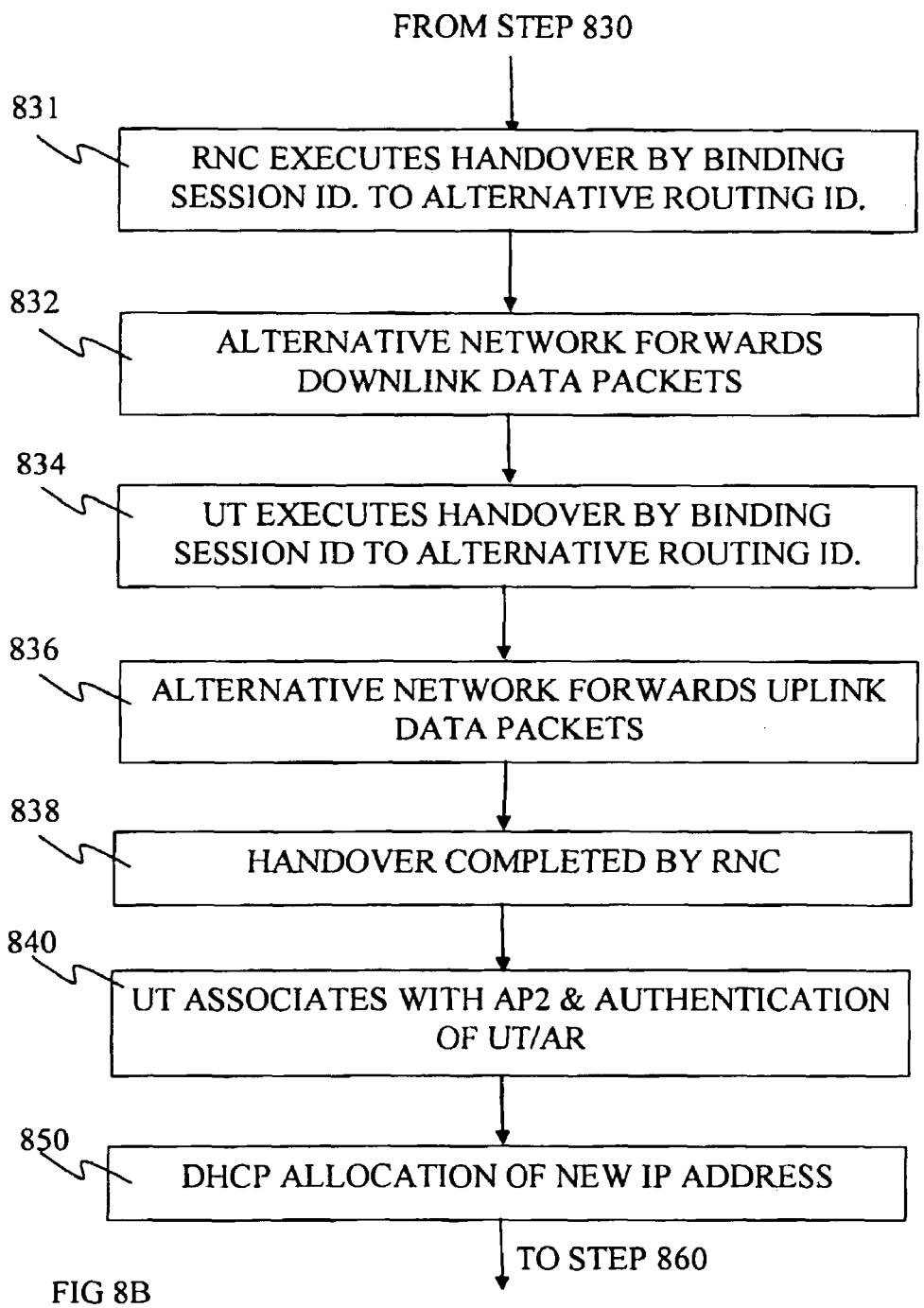
Figure 8C:
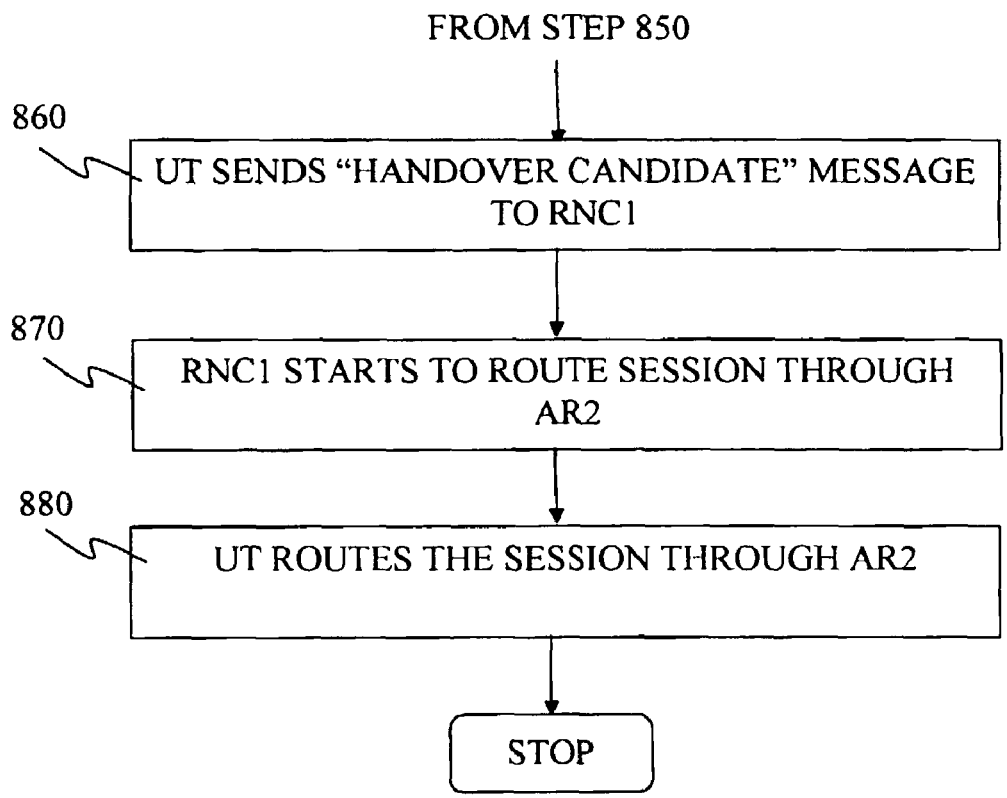

In step 6240, the UT's 240 WLAN MAC address is registered at RNC2, in the same way as it was registered at RNC 230, as described above in steps 6070, 6080 and 6090, illustrated by communication step 18 in FIG. 7C. The method then proceeds to step 6250.

In step 6250, the UT 240 sends a "I-landover Candidate" message to RNC1 230 or to RNC2 231, which RNC2 may forward it to RNC 1230. As described above, the main purpose of this message is to inform RNC1 230 about the identity of RNC2 231 for the coming inter RNC handover of the session. However, when sent to RNC2 231, it also has the purpose to inform the RNC2 231 that the UT 240 has a session being routed through another RNC, and possibly the identity of this RNC, making it possible for the RNC2 230 to "trigger" the handover (e.g. by requesting a handover, based on various MRRM information and setting up an inter RNC Iur tunnel with RNC1 231 at a later stage). This provides flexibility of the network's MRRM functionality. The RNC2 231 may simply forward this "Handover Candidate" message to RNC 1230, in which case the RNC1 230 normally will set up an inter RNC tunnel over the Iur interface for routing the session at a later stage, or alternatively, in case the "Handover Candidate" message comprises an identifier identifying RNC1 230, the RNC2 may set up such an inter RNC tunnel over the Iur interface as already stated. This "Handover Candidate" message advantageously comprises the following:

- a message type identifier information element identifying said message as being a "Handover Candidate"
- a user terminal identifier, UT ID, identifying said UT (240),
- an access point identifier, AP2 ID, of the handover candidate radio access point AP2 (266) in case of a handover type 4, or a Node B identifier, Node B ID, of a handover candidate Node B (251) in case of a handover type 2, or a mobile IP address, MIP, or a secure MIP address, MIPSec, of UT (240) along with an IP address of an access router, AR (256), being associated with the candidate RNC (231) and the reasons for which is described further below,
- the network address of said candidate RNC, RNC2 231, as source address of said message, thereby identifying the candidate RNC (231), in case this message is sent from RNC2 231 to RNC1 230,
- a network address of said candidate RNC (231) identifying the candidate RNC (231), in case the UT 240 sends this message to RNC1 230 over the UTRAN path via Node B 250 or over the WLAN path via AP1 265, wherein the network address of RNC2 231 may have been signalled to UT 240 by AP2 265, and,
- an access point identifier, AP1 ID, of a radio access point, AP1 (265), or a Node B identifier, Node B ID of a Node B (250), identifying the access point or Node B through which the session is currently being routed.

The "Handover Candidate" message may e.g. be realised as a 3GPP RRC message and sent from the UT 240 to the (MRRM entity of) RNC1 230 via Node B 250 or as an IAPP message sent from the UT 240 to the (MRRM entity of) RNC1 230/RNC2 231 via AP1 265/AP2 266, or as a higher layer UDP/IP message, depending on the type of inter RNC handover.

Now, in case the "Handover Candidate" message is sent to the MRRM entity of RNC1 230, illustrated by communication step 19 in FIG. 7C, the extracts the identifier identifying AP2 266, normally the WLAN MAC address of AP2 266, or the 3GPP cell identifier identifying the Node B 251 connected with RNC2 231. The MRRM entity of RNC1 230 then checks a look-up table linking the identifier of AP2 266 or Node B 251 with the identity of RNC2 231, and then updates its routing table accordingly by storing the identity of RNC2 231, normally the IP address or UTRAN MAC address of RNC2, in said routing table and associating it with the session. The MRRM entity of RNC1 230 further establish if there is an Iur interface between RNC1 230 and RNC2 231 or not by checking said look-up table.

Now, in case the "Handover Candidate" message is sent to the MRRM entity of RNC2 231, i.e. over the WLAN path e.g. by means of an IEEE 802.11 message from UT 240 to AP2 266 and by means of the IAPP/LWAP protocol or as a UDP/IP message from AP2 266 to RNC2 230, the RNC2 230 normally simply transform this message into a suitable 3GPP RRC format and forward it to all its neighboring RNCs over its Iur interfaces, e.g. by means of the RNSAP protocol (Radio Network Subsystem Application Part). The RNC1 230 would then recognize that this session is currently routed through RNC1 230 (since this message identifies the session e.g. by comprising the WLAN MAC address of UT 240), and would respond to RNC2 230 by sending a "Radio Link Setup Request" message as described further below. Alternatively, the RNC2 231 may extract the identifier identifying AP1 265, normally the WLAN MAC address of AP1 265, or the 3GPP cell identifier identifying the Node B 250 connected with RNC1 230. The MRRM entity of RNC2 231 then checks a look-up table linking the identifier of AP1 265 or Node B 250 with the identity of RNC1 230, and thus concludes that the UT 240 has an ongoing session being routed through RNC1 230. In this case the RNC2 230 sends a "Handover Candidate" message to RNC1 230 comprising the cell identifier of the handover candidate node, e.g. the WLAN MAC address of the AP2 266. Many possibilities exist. The method then proceeds to step 6260.

In step 6260, a logical connection between the U' 240 and the RNC2 230 via Node B 251 or via AP 266 is set up, depending on the type of handover. The establishment of a logical connection via Node B 251 is conventional and will not be described further here. In case of establishing a logical IEEE WLAN LLC connection via AP2 266, illustrated by communication step 20 in FIG. 7C, the RNC2 231 acts as an access router and sets up this connection with the UT 240, the WLAN address of which was received in step 6240. The IEEE WLAN LLC establishment is analogous with the above described IEEE LLC establishment and comprises transmission of L2-update frames and IAPP ADD Notify packet transmission from AP2 266 to RNC2 230 (as described with reference to communication steps 7, 8 and 9 above). The established logical LLC connection with the UT (240) via the AP2 (266) then has a specific port (277) associated with it. In one embodiment, the RNC2 231 uses the WLAN MAC address of RNC1 230 as source address for this WLAN LLC connection, and thus the U 240 will re-utilize this WLAN MAC address of RNC1 230 also for sending uplink packets through RNC2 231. In another embodiment, the RNC2 231 uses its own WLAN MAC address as source address for this WLAN LLC connection, and thus the UT 240 will utilizes this WLAN MAC address of RNC2 231 for sending uplink packets through RNC2 231. The method then proceeds to step 6270.

In step 6270, a decision is taken to handover the session from AP1 265 to AP2 266 or Node B 251. The decision may be taken by means of a distributed MRRM functionality of the network, however normally the MRRM entity of RNC1 (230) takes this decision. The relevant MRRM network entities collect MRRM formation, by means of above signaling paths/protocols, and takes an adequate handover decision accordingly, i.e. a handover decision to perform a handover type 1, 2, 3 or 4, as described above. This decision, in case of a distributed MRRM functionality in the network, is then signaled to the MRRM entity of RNC1 (230), by means of any suitable protocol/network paths described above. The criteria for this decision is normally that the AP2 (266)/Node B (251) associated with RNC2 (231) can offer a better QoS than the AP1 (265)/Node B (250) associated with RNC1 (230), e.g. it may offer traffic channel/s with a higher quality (improved SNR, decreased BER, or a higher throughput etc), for routing the session, but the exact criteria for the handover decision is not subject of the present invention. This decision, in case of a distributed MRRM functionality in the network wherein the decision is not taken directly in RNC1 (230), is then signaled to the MRRM entity of RNC1 (230), by means of any suitable protocol/network paths described above. This opens up for a flexible and effective MRRM functionality of the multi RAT network, as a person skilled in the art realizes. The method then proceeds to step 6280, in case of the embodiment wherein an Iur interface exist between RNC1 230 and RNC2 231, and proceeds to step 6293 in case of the embodiment wherein no such Iur interface exist (established by RNC1 230 as described in step 6250 above).

In step 6280, an inter RNC tunnel over the Iur interface connecting the RNC 1230 with RNC2 231 is established. Normally, the MRRM entity of RNC1 230 establish such a connection (it takes the handover decision and knows the identity of RNC2 231) but the Iur tunnel could be established on initiative on RNC2 231, as discussed above. Thus, MRRM entity of RNC1 230 sets up a conventional 3GPP Iur tunnel, i.e. a GTP-U/C UDP/IP tunnel, for tunneling session packets to the RNC2 231, illustrated by communication step 22 in FIG. 7C. In order to associate this inter RNC tunnel with the right session, the RNC1 230 sends a "Radio Link Setup Request" message to RNC2 231 informing the RNC2 231 about the correct Binding association between the inter RNC tunnel identifier (normally the UDP port number) and the identity of UT 240 (normally the WLAN MAC address of UT 240). This "Radio Link Setup Request" message comprises:
- a message type identifier identifying said message as being a "Radio Link Setup Request" message,
- a Radio Link Setup Request information element,
- a tunnel port number of the established inter RNC tunnel between RNC1 (230) and the candidate RNC (231).
- a UT identifier identifying the UT (240), which is normally the WLAN MAC address of UT 240 or a 3GPP identifier identifying UT 240,
- a session handover type identifier specifying one of the 4 different handover types described above.

This "Radio Link Setup Request" message may be realized as a 3GPP RNSAP "Radio Link Setup Request" message comprising an information element stating this relationship between binding ID (UDP port number) and WLAN MAC address of UT (240). In this way, the session is unambiguously identified at RNC2 231. The Radio Link Setup Request information element is an element specifying exactly what radio bearers should be set up by RNC2 (231), i.e. the candidate RNC, in order to carry out the handover. Normally, this information element comprises either a session handover type identifier and/or a control signalling handover type identifier associated with the session and/or an identifier identifying the session, which identifier/s specify one of the handover types 1-4 described above. For instance, the session handover type identifier and control signalling handover type identifier may be realised as a dedicated N bit field in a suitable data field of a 3GPP RNSAP "Radio Link Setup Request" message. The session identifier may be the alternative network address of UT 240, i.e. its WLAN or MIP address, but other possibilities exist. What is important according to the invention is that these identifiers, alone or in combination, specify/ies to the RNC2 (231) one of the 4 handover types described above. In this way, the RNC2 231 can check for and set up the necessary radio resources, e.g. a 3GPP radio traffic bearer and/or a (separate) 3GPP RRC control radio bearer. In case the session is to be routed through the AR 256 as described further below, the UT identifier may be a MIP/MIPSec address of UT 240. The MIP address is a mobile IP address used for mobile applications and the MIPSec address is a MIP address used in the context of the IPSec protocol, i.e. the MIPSec is a MIP address normally combined with a (IPSec) security association identifier. This "Radio Link Setup Request" message advantageously also comprises an information element specifying the requested QoS level for the requested radio link/s/bearers. This opens up for a dynamic QoS negotiation/optimization between RNC1 230, RNC2 231 and the UT 240, providing a possibility to further optimize the MRRM functionality of the multi RAT network. The method then proceeds to step 6290.

In step 6290, the RNC2 231 accepts/rejects the requested inter RNC session handover, and in case the RNC2 231 rejects (e.g. because it has no free radio resources) the request (i.e. the requested radio link setup request), the method stops in step 6290, and in case the RNC2 231 accepts the radio link setup request the RNC2 231 confirms this to RNC1 230 in a conventional manner, and the method then proceeds to step 6300.

In step 6293, the MRRM entity of RNC1 forms a "RNC Relocation Request" message and sends this message to the SGSN, illustrated by communication step 21 in FIG. 7C, requesting the SGSN to switch the routing of the session from RNC1 230 to RNC2 231, possibly with a "double routing" to both RNC1 230 and RNC2 231 during a time period, which may be a pre-established fix time period or dynamically controlled by RNC1 230. This provides a possibility to provide soft handover capability for the multi RAT network, which is an important advantage. According to the invention, the "RNC Relocation Required" message comprises:
- a message type identifier information element identifying said message as being an "RNC Relocation Required" message,
- an identifier identifying the candidate RNC (231),
- the network address of the UT (240) as defined by the alternative access network protocol,
- a tunnel identifier of the tunnel between the RNC (230) and the Data Packet Support Node (220) through which the session is currently being tunneled.

The identity of SGSN 220 is normally associated with the session, e.g. is stored in the routing table of the session in RNC1 230. The method then proceeds to step 6300.

In step 6300, the RNC1 230 sends a "Physical Channel Reconfiguration" message to the UT 240, over the UTRAN- or WLAN path via Node B 250 or AP1 265, in a similar manner as described above in step 6145. Communication step 23 in FIG. 7C illustrates the case wherein the "Physical Channel Reconfiguration" message is sent over the UTRAN path. The purpose with this message is to instruct the UT 240 to start to listen for downlink session packets from AP2 266/Node B 251. As already stated, this message is normally realized by means of the RRC/RLC protocol and is sent over the BCCH to UT 240 via Node B 250. For instance, the 3GPP "Physical Channel Reconfiguration" message could be used by adding information elements for identifying radio access node/s AP1 265 and AP2 266 as defined according to the alternative access network protocol, e.g. could the WLAN MAC address of AP2 266 be used here as such information element (communicated to RNC1 230 by the "Handover Candidate" message). This message may also comprise the WLAN MAC address of RNC2 230 (if known to RNC1, and in case the UT 240 will not re-utilize the WLAN MAC address of RNC 1230 for sending uplink packets through AP2 265). However, this "Physical Channel Reconfiguration" message could also be sent over the WLAN path at this stage, by means of the STAMF/APME protocols between UT 240 and AP1 265 and by means of the IAPP/LWAP protocol between AP1 265 and RNC 1230, or as a dedicated UDP/IP packet between UT 240 and RNC1 230, and many possibilities exist. The method then proceeds to step 6310.

In step 6310, a security association is established between the UT 240 and AP2 266, illustrated by communication step 24 in FIG. 7C, e.g. by applying a conventional standard EAP (Extensible Authentication Protocol) authentication in accordance with the IEEE 802.11i security specification. The method then proceeds to step 6320 in case of the embodiment wherein a Iur interface exist between RNC1 230 and RNC2 231, and proceeds to step 6330 in case of the embodiment wherein there is no such interface.

In step 6320, the RNC1 230, acting as SRNC, starts to route the downlink packets to RNC2 231, acting as DRNC, through the established inter RNC tunnel. In one embodiment, the routing entity of RNC1 routs the session packets to RNC2 231 by carrying out the steps of:
- stripping off protocol headers from incoming downlink IP session user data packets thereby transforming them into their original transmission format,
- adding LLC headers to the original transmission format downlink IP session user data packets transforming them into LLC format according to said alternative access network protocol with an LLC network source address of the RNC1 (230),
- binding said session identifier, TEID1, to the tunnel identifier of the inter RNC GTP-U tunnel, i.e. the UDP port number, thereby tunneling said LLC session packets to the candidate RNC (231).

In one embodiment, the routing entity of RNC1 routs the session packets to RNC2 231 by carrying out the steps of:
- stripping off protocol headers from incoming downlink IP session user data thereby transforming them into their original transmission format,
- binding said session identifier, TEID1, to the UDP port number identifying the inter RNC tunnel bearer, thereby tunneling said original transmission format session user data to the candidate RNC (231).

In one embodiment, further described below, wherein an IP-network- and AR 256 is installed between the RNC2 231 and AP2 265, the "Handover Candidate" message comprises a mobile IP address, MIP, or a secure MIP address, MIPSec, of UT (240) along with an IP address of an access router, AR (256), being associated with the candidate RNC (231), the routing entity of RNC1 routs the session packets to RNC2 231 by carrying out the steps of:

identifying the session by means of the MIP/MIPSec address of the UT (240) being linked with the session, (i.e. stored in the routing table of the session), updating the routing table of the session with the IP address of AR (256), stripping off tunneling protocol headers from incoming downlink IP session user data packets thereby transforming them into their original transmission format, encapsulating the original transmission format IP session packets by means of UDP/IP or TCP/IP with the IP address of AR (265) as destination address, encapsulating the thus obtained UDP/IP or TCP/IP session packets with UDP/IP forming tunneling packets, wherein the UDP port number of the tunneling packets identifies an inter RNC tunnel to the candidate RNC (231), binding said session identifier. TEIDI, to the UDP port number of the inter RNC tunnel, thereby tunneling the encapsulated downlink session packets to the candidate RNC (231).

Advantageously, the session packets are routed through the alternative radio access network path via the second port (272) in parallel with routing the session over the inter RNC tunnel to the candidate RNC, thus providing a possibility of a soft handover solution which is advantageous, especially in case of time consuming authentication procedures between the UT 240 and the alternative network. This is illustrated by communication steps 25, 26 and 27 in FIG. 7C. The method then proceeds to step 6340.

In step 6330, the SGSN 220 establish new GTP-U tunnel for the session over the Iu interface between RNC2 231 and the SGSN 220, and sets up a RAB ID for this GTP-U tunnel which is communicated to the RNC2 231 in a conventional manner for PDP context inter RNC handover. The SGSN then starts to route the session in parallel to RNC2 231 and RNC1 231, illustrated by communication steps 28 and 29 in FIG. 7D, through their GTP-U tunnels, respectively, distinguished by their respective TEID. Thus, also this embodiment provides a possibility of a soft handover solution which is advantageous, especially in case of time consuming authentication procedures between the UT 240 and the alternative network. The method then proceeds to step 6340.

In step 6340, the RNC2 231, acting as a DRNC in case it receives the session packets over the Iur interface tunnel from RNC1 230, and acting as a SRNC in case it receives the session packets over the Iu interface tunnel from the SGSN 220, forwards these downlink session packets to the UT 240 through AP2 266 or Node B 251, in accordance with the handover type indicated by the session handover type identifier in the "Radio Link Setup Request" message received from RNC1 230 (or the SGSN 220). More specifically, in case the session packets are to be routed through the AP2 266, the routing entity of RNC2 231 carries out the step of:

associating the established logical LLC connection, which was established in step 6260, with the session, i.e. by updating its routing table for the session with this LLC port (277).

In one embodiment, the routing entity of RNC2 231 carries out the steps of:

receiving downlink packets of the session through the tunnel being identified by said tunnel port number, stripping off tunneling protocol headers from the received downlink packets thus obtaining session packets having a format according to the alternative access network protocol and which packets have a network source address of RNC1 (230) as defined by said alternative access network protocol, forwarding the thus obtained session packets through the port (277), thus routing the packets to UT (240) via the AP2 (266).

In one embodiment, the routing entity of RNC2 231 carries out the steps of:

receiving downlink packets of the session through the tunnel being identified by said tunnel port number, stripping off tunneling protocol headers from the received packets thus obtaining session packets having a format according to the alternative access network protocol and which packets have a network source address of RNC1 (230) as defined by said alternative access network protocol, stripping off encapsulation headers of the thus obtained packets, which encapsulation headers have been added by the RNC1 (230) by means of the alternative access network protocol, thereby transforming the downlink packets into their original transmission format, adding LLC headers to the original transmission format downlink session packets transforming them into LLC format according to said alternative access network protocol with an LLC network source address of the candidate RNC (231), forwarding the thus formed LLC session packets through the port (277), thus routing the packets to UT (240) via the AP2 (266).

In one embodiment, wherein the multi RAT network comprises an AR 256 and an IP network installed between the RNC2 231 and the AP2 266, and wherein the "Handover Candidate" message comprises a mobile IP address, MIP, or a secure MIP address, MIPSec, of UT (240) along with an IP address of the access router, AR (256), being associated with the candidate RNC (231), and wherein the UT identifier of the "Radio Link Setup Request" message is a corresponding MIP/MIPSec address of UT (240), and wherein the inter RNC tunnel is an UDP/IP tunnel, the routing entity of RNC2 231 carries out the steps of:

extracting the MIP/MIPSec of UT (240) from said "Radio Link Setup Request" message, associating the tunnel port number with the MIP/MIPSec of UT (240) and with the IP address of AR (256).

receiving identifying the session by means of the MIP/MIPSec address of the UT (240) being linked with the session, updating the routing table of the session with the IP address of AR (256), receiving downlink IP encapsulated LP session packets over the inter UDP/IP RNC tunnel.

stripping off the tunneling UDP/IP headers from the IP encapsulated downlink IP session packets obtaining downlink IP session packets being encapsulated with IP, wherein the encapsulation IP address of the IP session packets is the IP address of AR2 (256), and forwarding the downlink IP session packets being encapsulated with the IP address of AR (256) to a port (277) associated with AR (256), thereby routing the downlink IP session packets to the UT (240) through AR (256) and AP2 (266).

In step 6350, the UT 240 receives these downlink session packets from RNC2 231 through AP2 266/Node B 251, through its port 242/241, depending on the type of handover. The MRRM entity of the UT 240 then sends a "Handover Confirmation" message to the RNC1 230, as a response on receiving these downlink session packets from RNC2 231. The purpose of this message is to inform the RNC1 230 that the UT 240 from now on is actively associated with AP2 266/Node B 251 instead of AP1 265/Node B 250, depending on the type of handover. As stated, this message comprises:

a message type identifier identifying said message as being a "Handover Confirmation" message, a disassociation information element and the network address of a radio access point, e.g. AP1 265 in case of a handover of type 4 or 3, with which the UT (240) is no longer associated for routing the session, and, a handover confirmation information element along with the network address of a target radio access point, e.g. AP2 (266) in case of a handover of type 4 or 3, with which the UT (240) is currently associated for routing the session. The "Handover Confirmation" message may e.g. be realised by means of the 3GPP RRC "Measurement Report" message wherein the information, which indicates AP1 (265) as disassociated access point and AP2 (266) as new associated access point, may be contained in the "Additional Measured Results" information element, and be sent over the UTRAN path (on BCCH) by means of the RLC/RRC protocols via e.g. Node B 250 The purpose of this "Handover Confirmation" message is to inform the RNC1 230 that it from now on shall route downlink packets only via the RNC2 231, i.e. there is no need for soft handover to continue. This "Handover Confirmation" message could also be sent over the WLAN path at this stage, via AP1 265 or AP2 266, by means of the STAME/APME protocols between UT 240 and AP1/AP2 265/266 and by means of the IAPP/LWAP protocol between AP1/AP2 265/266 and RNC1 230/RNC2 231, or as a dedicated UDP/IP packet between UT 240 and the RNCs, and many possibilities exist. In case this message is sent to the RNC2 231, the RNC2 231 then normally forwards it to the RNC1 230, which may be an advantageous way of minimising the overall radio interference, and thus increase the overall network capacity/throughput. More specifically, an IAPP-LEAVE.Notify packet sent from AP1 265 to RNC1, comprising the above information, could advantageously function as this "Handover Confirmation" message. The AP1 265 then sends this LAPP-LEAVE.Notify packet to the RNC1 231 as soon as the UT 240 is disassociated from AP1 265. Communication step 32 in FIG. 7C illustrates the case wherein this "Handover Confirmation" message is sent over the WLAN path to RNC1 230. In this way, the overall network signalling/interference is minimised and the capacity increased. According to the invention, the RNC1 230 then blocks the routing of the session through the AP1 265, as a response on receiving said "Handover Confirmation" message. The method then proceeds to step 6360.

In step 6360, the UT 240 starts to send uplink session packets via the access node associated with the RNC2 231, i.e. AP2/Node B 266/251, as a response on receiving these downlink packets from RNC2 231, by binding the session identifier at UT 240, e.g. the 3GPP RB ID of the session, with e.g. an established WLAN RB ID associated with AP2 266, in case of a handover of type 4 or 3. The method then proceeds to step 6370.

Thus, in step 6370, both up-link and downlink session packets are routed via the RNC2 231, e.g. via the AP2 266, illustrated by communication step 33 in FIG. 7C, and the inter RNC handover is completed.

Even though the handover of a PDP context session from a UTRAN routing path to a WLAN routing path has been described above, the invention is applicable also for the handover of a PDP context session, or data session, from a WLAN routing path to a UTRAN routing path, with minor modifications obvious for a person skilled in the art. For instance, in case of a handover from the WLAN routing path to the UTRAN routing path, e.g. if the data session is first established via the WLAN routing path, then the capability message may be sent over the WLAN routing path and may comprise e.g. a WLAN RB ID uniquely identifying said data session and further comprising the IMSI of UT 240, allowing the RNC1 230 to set up alternative 3GPP RAB ID and 3GPP RB ID corresponding with the WLAN RB ID QoS requirements and defining a corresponding data session with the UT 240 over the UTRAN path, etc. Furthermore, the invention may be used to simultaneously route PDP packets, or session data, over both the WLAN routing path and the UTRAN routing path, not only to form a soft handover but to enhance the throughput/traffic channel quality for any reason.

The RNC1 230 initiates the handover, and the UT 240 switches its routing path after having received the first PDP-packets as described in above, but many other possibilities exist. For instance, the UT 240, or another MRRM entity in the network, could initiate the handover and the RNC1/RNC2 230/231 may switch the routing path after receiving the first up-link PDP packets from UT 240. The UT/RNC 240/230 may take a handover decision independently of RNC/UT 230/240, and perform a handover independently, and/or may signal a handover decision to the RNC/UT 230/240, e.g. by means of a RRC-message, in order to "synchronise" the handover with the RNC1/RNC2/UT 230/231/240.

Now, referring back to FIG. 2, the embodiment wherein the network comprises AR 256 and AR 255, illustrated in FIG. 2, shall now be described in more detail, with reference to FIGS. 2, 5 and 7. In this embodiment, the WLAN-parts, comprising the AP1/AP2 265/266 and the M-L2S1/M-L2S2 262/263, are connected to an IP-network (not illustrated in FIG. 2), via Access Routers AR1/AR2 255/256, i.e. there is an intermediate UDP/IP-network between the RNC1/RNC2 230/231 and AR1/AR2 255/256. The Access Routers are connected to a DHCP (Dynamic Host Configuration Protocol) server (not illustrated), which may be integrated e.g in the RNC1 230 or be a stand alone server. Since the 3GPP UTRAN RNC1 230 and RNC2 231 have their own IP-addresses, and communicate by means of UDP/IP, the AR2 256 may be considered to be connected to RNC1 230 wherein the RNC2 231 merely acts as a UDP/IP relay node.

First, with reference to steps 710-738 in FIG. 7, a PDP session handover will be described wherein the session is first routed through RNC1 230 over the UTRAN path via Node B 250 and handed over to the AR/WLAN part and routed through AP1, 265.

Referring to FIG. 7A-C, the method according to the invention starts in step 810, wherein a PDP context data session is set up between the UT 240 and the GGSN 210 enabling a data communication session between the UT 240 and e.g. an Internet host or a peer connected to the Internet 280. The PDP context session is set up in a conventional manner, e.g. as described above.

In step 811, data of said PDP context session are routed over the first routing path, i.e. the UTRAN routing path via Node B 250, in a conventional manner as described above.

In step 812, the MRRM entity of RNC1 230 sends its alternative network source address, NSA, i.e. the IP address of RNC1 230, to the MRRM entity of UT 240, e.g. over the downlink UTRAN-DCCH. Alternatively, the RNC does not send its NSA in step 812, instead the RNC1's 230 IP-address is known by the DHCP server (pre-stored) and the RNC1's 230 IP-address is instead included e.g. in the DHCP Acknowledge message described below in step 823.

In step 813, the MRRM entity of UT 240 updates the routing table of the UT Routing entity by associating the PDP context session/s with the received NSA, i.e. the IP address of RNC1 230 in this case, as illustrated in table 6 and creates an alternative routing identifier for the relevant data session, i.e. a IP RB ID, and associates it with port 242. The IP RB ID is associated with the IP address of RNC1 230.

TABLE 6

| PDP Session | 3GPP RB ID | 3GPP RAB ID | NSA | IP RB ID | Application |
|---|---|---|---|---|---|
| Session 1 | RB ID 1 | RAB ID 1 | IP-address of RNC | IP RB ID 1 | Web browsing |
| Session 2 | RB ID 2 | RAB ID 2 | IP-address of RNC | | E-mail |
| Session N | RB ID N | RAB ID N | IP-address of RNC | | Multimedia download |

In step 820, the MRRM entity of UT 240 detects the WLAN (broadcast) beacon signal from AP 665, and the UT 240 establishes a radio connection with the WLAN via said second port (242). The WLAN forwards update frames to the Access Router AR1 255, and the bridging tables of the WLAN and the AR1 255 are updated accordingly, in a conventional manner.

In step 823, the UT 240 obtains a second IP address from the DHCP server, in addition to its already assigned PDP context session IP address. This requires that the UT 240 has a DHCP client installed. The assignment of a second IP-address to the UT 240 is normally carried out in the following way:

1. The UT 240 broadcasts a DHCP Discover message as a DHCP/UDP/IP message.
2. The DHCP Server responds the UT 240 by sending a DHCP Offer message, which comprises a second IP address for the UT 240 as a DHCP/UDP/IP message. In case the broadcasted Discover message reaches several DHCP Servers, there may be multiple DHCP Offers sent by different DHCP Servers. The second IP address is normally an IP-address dedicated for mobile applications, i.e. an IPm address.
3. The UT 240 broadcasts a DHCP Request message (i.e. a request for one of the offered IP addresses from one DHCP server) as a DHCP/UDP/IP message.
4. The DHCP Server sends a DHCP Acknowledge message (i.e. acknowledges a reserved IP address and configuration for the UT 240) as a DHCP/UDP/IP message to the UT 240 which observes this acknowledgment and stores the reserved (second) IP address for future use. This second IP address is forwarded to the UT RRC application, which associates this second IP address with the relevant PDP context session/s. Optionally, the DHCP Acknowledge message may also comprise the RNC1's 230 IP-address, if known to the DHCP server.

In step 825, the MRRM entity of UT 240 forms and sends an association message to the MRRM entity of RNC1 230. The association message comprises the alternative network address of UT 240, i.e. the second IP-address in this case, and also functions as a capability message as described above. In one embodiment, the association message further comprises a session identifier uniquely identifying the data session, e.g. the 3GPP RB ID 1 or the 3GPP RAB ID 1, uniquely identifying the specific PDP data context session established in step 810. In this way, the UT 240 can control which PDP context session/s, among a set of ongoing PDP context session/s, for which a handover may be desirable. This may be accomplished by letting the UT 240 send said association message over the UTRAN path exploiting said 3GPP RB ID and 3GPP RAB ID, so that the RNC1 230 can extract said 3GPP RB ID and 3GPP RAB ID, which uniquely identify the specific PDP context session. Alternatively, the association message may be sent over the WLAN-IP-Network path as a TCP/IP packet addressed to the RNC1's 230 MRRM entity. The DHCP server sends an association message to the RNC1 230 comprising the UT's 240 WLAN MAC address and second IP-address. I-his message may be a dedicated message if the RNC1's 230 IP-address is known (pre-stored) to the DHCP-server, or may be multicasted.

In step 826, the RNC 230 receives said association message sent in step 825 and creates an alternative routing identifier, in form of a specific IP network radio bearer identity for the specific PDP context session in this case, i.e. a IPN RB ID 1 as illustrated in Table 7 below, and associates this IPN RB ID 1 with the NA (Network Address), i.e. the second IP address of the UT 240, and also associates the IPN RB ID 1 with port 272. The RNC1 230 associates said PDP context session (i.e. the relevant session in question) with said NA (UT's 240 second IP address), said alternative routing identifier, i.e. IPN RB ID 1, and port 272, e.g. by updating its routing table as illustrated in Table 7. In a similar manner as for the 3GPP RB ID and WLAN RB ID, the IPN RB ID defines a connection over the IP-network-WLAN-network path, and comprises e.g. the identical QoS requirements, i.e. bandwidth requirements, max packet delay requirement, requirements regarding BER, FER etc, as the corresponding 3GPP RB ID, in order for the lower layers to realise a data connection between the Routing entities of RNC 1230 and the UT 240.

TABLE 7

| PDP Session | 3 GPP RB ID | 3 GPP RAB ID | UT | TEID | IPN RB ID | NA | Data Port | GTP-U |
|---|---|---|---|---|---|---|---|---|
| Session 1 | RB ID 1 | RAB ID 1 | UT 1 | TEID 1 | IPN RB ID 1 | UT's second IP-address | 272 | GTP-U 1 |
| Session 2 | RB ID 2 | RAB ID 2 | UT 1 | TEID 2 | | | | GTP-U 2 |
| Session N | RB ID N | RAB ID N | UT K | TEID N | | | | GTP-U N |

The Routing entity of RNC 1230 continues to route user data of the PDP context session through the UTRAN radio interface, i.e. via port 273, by continuing to bind the TEID of the PDP context session to the UTRAN (3GPP) RAB ID and the UTRAN (3GPP) RB ID. In one embodiment, the method then proceeds to step 827. In another embodiment, the method skips step 827 and proceeds directly to step 830.

In step 827, the RNC1 230 and UT 240 establish a conventional bi-directional IPSec (IP Secure) connection according to one embodiment, enabling the secure encryption and authentication/integrity protection for the packets to be communicated over the WLAN-IP-network path. This requires that the RNC1 230 and the UT 240 has further a respective IPSec application installed, and is normally carried out by setting up a conventional so called IPSec Security Association (SA) in each direction between the UT 240 and the RNC1 230. PDP context packets may thereafter be communicated safely over these IPSec connections. The security association credentials may be exchanged between UT 240 and RNC1 230 over a secure (encrypted) established UTRAN (WCDMA) connection. The method then proceeds to step 830.

In step 830, a decision is taken to switch the routing of said PDP context session from said cellular radio network path (UTRAN path), via node B 650 and ports 273 and 641, to said alternative data network path (WLAN-IP-network path), via ports 272 and 642. According to the invention, this decision may be taken by the UT 240 or the RNC1 230 based on various RRM information. In one embodiment, the MRRM entity of RNC1 230 receives a RRM message, comprising information regarding e.g. signal strength, QoS, BER, FER, interference level, velocity of UT 240, cell load, radio channel quality, etc. regarding the UTRAN network and/or the WLAN-IP network, from the MRRM entity of UT 240. This message may be sent over the UTRAN routing path, e.g. on DCCH, or over the WLAN-IP-network as a TCP/IP message. The MRRM entity of UT 240 performs measurements regarding the radio link quality for both the UTRAN link and the WLAN link, so as to form such RRM message/s or measurement reports. Alternatively, RRM-information could be collected by the AP 665 or Access Router 6010 and transmitted to the RNC1 230 as a dedicated message (e.g. in form of a modified LAPP message) in case that the dedicated control connection for this purpose exist between the AP and AR and RNC1 230, alternatively the AP sends the RRM messages into the alternative wireless data network (e.g. the 802 Layer 2 WLAN network), which forwards them into the IP-network via the AR 6010, which in turn forwards them to the RNC1 230. The AR can directly send the RRM messages into the IP-network. The RNC1 230 may continuously listen for RRM messages (e.g. listening to specific IAPP distribution address for modified IAPP RRM messages), extract and filter out RRM message related to specific cells (i.e. comprising specific WLAN cell ID) and/or related to specific users (e.g. comprising UT's MAC address or UT's IP address), associated with the RNC1 230. The RNC-MRRM entity of RNC1 230 may take the decision in step 830 to perform a handover from the UTRAN routing path to the WLAN-IP network routing path e.g. if the WLAN-IP network currently offers a better/higher QoS level than the UTRAN or if the traffic load level of the UTRAN network exceeds a specific threshold value, or may decide to maintain the UTRAN routing path e.g. because the velocity of the UT 240 is too high, but many possibilities exist. In an alternative embodiment, the UT MRRM entity of UT 240 takes the decision to switch the routing of the PDP context session to the WLAN routing path, e.g. based on said measured MRRM parameter values. What is important is that the invention provides a possibility to provide MRRM functionality in the RNC1 230 and/or the UT 240 enabling e.g. handover decisions taking into account the exploitation of the radio resources of both said UTRAN and the WLAN-IP network. In this way, the invention provides a possibility to develop completely new and more efficient MRRM functionality since the RNC1 230 and/or UT 240 has access to both UTRAN and WLAN RRM information. In a preferred embodiment, the MRRM entity of RNC1 230 takes the handover decisions. It should be noted that the invention gives the possible advantage of collecting all the MRRM information in the "right" node, i.e. in the radio network control node, RNC1 230, in which the conventional UTRAN RRM-functions are realised.

According to the method of the invention, the method remains in step 830 until a decision has been taken to handover the PDP context session to the WLAN-IP NETWORK routing path, and then proceeds to step 831.

In step 831, in one embodiment, the RNC1 230 executes the handover of the PDP context session from the first, i.e. said cellular radio network path, to said alternative, i.e. WLAN-IP network routing path, i.e. switches user plane transmission from the UTRAN path to the WLAN-IP Network path. The handover is executed by the Routing entity of RNC 1230 which binds the PDP context session identifier, i.e. TEID 1 in this case, to the alternative radio bearer identity, i.e. the IPN RB ID 1 in this case, instead of to the conventional 3GPP RB ID, in table 7, thereby starting to route downlink IP packets of the PDP session through the WLAN-IP Network routing path via port 272, instead of through the UTRAN path via port 273. The transmission switch is crucial for the downlink IP packets received by RNC1 230 from SGSN 220 through the corresponding GTP-U tunnel. In conventional user plane transmission the RNC decapsulates the IP packets from the GTP-U PDU and encapsulates them with PDCP prior to transmission over UTRAN channels. The invention allow seamless transmission switch without data loss by having the Routing entity of RNC1 230 carrying out the following steps:

1. All downlink IP packets that have already been encapsulated and cached as PDCP packets before the inter-RAT (Radio Access Technology) handover is decided, are transmitted to the UT 240 using the UTRAN path. Such IP packets may be cached at RNC1 230 because they are waiting for their transmission or they have been transmitted to UT 240 but have not yet been confirmed. As long as RNC receives uplink IP packets from UT 1240 through its UTRAN routing path, the RNC1's 230 RLC entity acknowledges the packet reception using the UTRAN path (in case that RLC acknowledged mode is used), according to the invention.

2. In case that an acknowledged mode RLC service is configured in the PDP context for user plane transmission over the UTRAN path, then a conventional acknowledged TCP/IP mode transmission is used between the Routing entities of UT 240 and RNC1 230.

3. All downlink IP packets de-capsulated from the GTP-U PDUs after the inter-RAT handover is decided in step 530, are encapsulated as Routing entity TCP/IP packets with the UT's 240 second IP address as destination address and RNC1's 230 IP address as source address. These frames are then sent through the RNC1's 230 port 272.

The created don link TCP/IP packets are then transmitted on RNC1's 230 port 272. These are TCP/IP Routing entity packets, i.e. the TCP header defines them to be Routing entity packets destined for the Routing entity of UT 240, comprising the embedded downlink PDP IP packets.

In step 832, the IP-Network and WLAN routes these downlink IP-packets to the UT 240, since their bridging tables are updated accordingly and transmits these to the UT 240.

In step 834, the UT 240 switches the routing path of said PDP context session from the UTRAN routing path to the alternative WLAN-IP NETWORK routing path after receiving the alternative network source address of RNC1 230, NSA, i.e. the IP address of RNC1 230 in this case. The Routing entity of UT 240 updates its routing table by associating the session identifier/s with the RNC's NSA, i.e. the IP address of RNC1 230 in this case, as illustrated in table 8 below.

r240 receives downlink IP packets from RNC 1 230 through its UTRAN transmission path, UT's RLC entity acknowledges the packet reception using the UTRAN path, too (in case that RLC acknowledged mode is used).

2. As indicated in the DSAP (Destination Service Access Point) field of the received TCP/IP packets, the extracted payload, i.e., downlink PDP IP packets, shall be forwarded to the overlying IP layer at UT.

3. After receiving the first downlink IP packet through its port 642, the Routing entity of UT 240 stops encapsulating the uplink PDP IP packets with PDCP and instead encapsulates them as TCP/IP frames using the UT's 240 second IP address as source address and RNC1's 230 IP address as destination address. These frames are then sent through port 642.

In step 836, the WLAN-IP-Network forwards these packets to the RNC1 230.

In step 838, the Routing entity of RNC1 230 extracts the PDP IP packets from the received TCP/IP packets, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's second IP address (indicated as source address of the TCP/IP packets), and the TEID established for the PDP context in question, e.g. as illustrated in Table 7. Thus, the handover of the PDP context session in the up- and downlink from the UTRAN routing path to the WLAN routing path is completed by the RNC1 230 in step 838.

Thus, at this stage, the PDP session is routed through the AR1 255 and control plane data associated with the session

TABLE 8

| PDP Session | 3GPP RB ID | 3GPP RAB ID | NSAPI | NSA of RNC | IPN Radio Bearer ID | Application |
|---|---|---|---|---|---|---|
| Session 1 | 3GPP RB ID 1 | 3GPP RAB ID 1 | NSAPI 1 | RNC's IP address | IPN RB ID 1 | Web browsing |
| Session 2 | 3GPP RB ID 2 | 3GPP RAB ID 2 | NSAPI 2 | | | E-mail |
| Session N | 3GPP RB ID N | 3GPP RAB ID N | NSAPI N | | | Multimedia download |

The Routing entity of UT 240 decapsulates the received downlink IP-PDP packets from the TCP/IP packets The UT 240 then updates its routing table, i.e. table 8, accordingly by binding the relevant PDP context session identifier, i.e. UTRAN RAB ID 1 to the IPN RB ID 1 for uplink IP packet transmission via port 642 instead of UTRAN port 641. The UT 240 thus terminates its uplink transmission through its UTRAN transmission port 641 and starts to transmit the subsequent uplink PDP IP packets through port 642, as TCP/IP frames to the RNC1's 230 Routing entity. More specifically, in one embodiment, the switch of user plane transmission at the u r240 comprises the following steps, carried out by the Routing entity of UT 240:

1. As similarly done by RNC1 230 for downlink IP packets, all uplink IP packets that have been encapsulated and cached as PDCP packets at UT 240 before deciding the inter-RAT transmission switch, are transmitted to the RNC1 230 using the UTRAN path, i.e. using the allocated UTRAN radio bearers/channels. Such IP packets might be cached because they are waiting for their transmission or that they have been transmitted to RNC but not yet acknowledged. As long as u and/or (M)RRM information is communicated between the UT 240 and RNC1 230 over the UTRAN path via Node B 250 by means of 3GPP RRC/RLC protocols/messages and/or over the WLAN/IP-network path via AR1 255 by means of the IAPP protocol/messages or by means of the IEEE 802.11 protocol between UT 240 and AP1 265 and the IAPP protocol between the AP1 265 and RNC1 230.

In step 840, the UT 240 roams into the coverage area of AP2 266, associated with AR2 256 and RNC2 231, and associates with the AP2 266, as described above. The AP2 266 registers the UT's 240 WLAN MAC address at the AR2 256, by sending Layer 2 update frames and/or LAPP-ADD.Notify packet to AR2 256, as described above for registering the UT's WLAN MAC address at RNC2 231. The AR 256 and UT 240 then preferably establish a security association e.g. by applying a conventional standard EAP (Extensible Authentication Protocol) authentication procedure in accordance with the IEEE 802.1 1 1 security specification. The AR2 256 normally communicates its IP address to UT 240 during this procedure. The method then proceeds to step 850 in case the UT 240 is assigned a new MIPSec address when it "associates" with the AR2 256 and proceeds to step 860 in case the UT 240 is not assigned a new MIPSec address when it "associates" with the AR2 256. This depends on network/UT pre-configurations, and the invention provides an advantageous flexible solution functioning with both "fix" and "dynamic" MIPSec allocation.

In step 850, the UT 240 carries out a new DHCP allocation procedure, as described above in step 823, and thus obtains a new MIPSec address (or MIP address). During this procedure, AR2 256 also communicates its IP-address to the UT 240, if not communicated earlier.

In step 860, the AR2 256 communicates its IP-address to the UT 240, e.g. by means of the IAPP protocol, if not communicated earlier. The UT 240 then sends a "Handover Candidate" message to the RNC1 230 or AR 256. According to the invention, this message comprises the (updated) MIP/MIPSec address of the UT 240, which identifies the session at RNC1 230, along with the IP-address of AR2 256. This message may be sent over the established MIP/MIPSec connection from UT 240 to RNC1 230 via AP1 265 and AR1 255, or as a RRC message by means of RLC over the UTRAN path via Node B 250, via the AR2 256 by means of the IAPP protocol and UDP/IP between AR2 256 and RNC1 230. In case it is sent to AR2 256, this message normally also comprises the IP address of RNC1 230. The AR2 256 then updates its binding associations accordingly. The Routing entity updates its routing table accordingly, by associating the session with the update MIP/MIPSec address of UT 240 and the IP address of AR2 256.

In step 870, the MRRM entity decides to perform the inter-AR-RNC session handover, as described above, and sends a Radio Link Setup Request message, as described above, to RNC2 231. The RNC1 230 then sends a "Physical Channel Reconfiguration" message to UT 240, e.g. over the UTRAN path via node B 250, as described above. After having received a handover confirmation/acceptance from AR 256, the RNC1 230 then binds the session identifier, TEID1, to a IP RB ID associated with a UDP/IP port associated with AR2 256, thereby starting to route the downlink session packets to AR2 256, instead of to AR1 255. More specifically, the RNC1 230 carries out the following steps:
  stripping off tunneling protocol headers from incoming downlink IP session user data packets thereby transforming them into their original transmission format,
  encapsulating the original transmission format IP session packets by means of UDP/IP or TCP/IP with the IP address of AR2(256) as destination address,
  encapsulating the thus obtained UDP/IP or TCP/IP session packets with UDP/IP forming tunneling packets, wherein the UDP port number of the tunneling packets identifies an inter RNC tunnel to the candidate RNC (231), established as described above, and
  binding said session identifier to the UDP inter RNC tunnel port number, thereby tunneling the encapsulated downlink session packets to the candidate RNC (231), and routing the packets through AR2 256 instead of AR 255.

In step 880, the UT 240 receives the downlink session packets and starts to send uplink packets to via AP2 266 instead of to AP1 265. The UT 240 then normally sends a "Handover Confirmation" message to RNC1 230, e.g. via Node B 250, as described above.

Thus, in case of dynamic MIP address allocation, the (S)RNC1 230 acts as Home Agent, while the UT 240 acts as Foreign Agent, while in case of a fix MIP address allocation (i.e. the UT keeps its MIP address during the entire session), the AR2 256 acts as Home Agent and UT 240 as Foreign Agent.

Note that the encapsulation of IP packets with GTP-U between RNC1 230 and SGSN 220, as well as between SGSN 220 and GGSN 210 remain unchanged at any point in time. This is advantageous in order to provide session continuity with the remote Internet host or peer.

Thus, the UTRAN radio bearer between UT 240 and RNC1 230 may not necessarily be released even though no user plane traffic is transmitted over the UTRAN path. This is advantageous since the UTRAN path then can be used for sending MRRM messages regarding the UTRAN and/or the alternative access network, e.g. WLAN or WLAN-IP-Network, throughout the data session. Furthermore, this facilitates a seamless session handover from the alternative routing path back to the UTRAN routing path at a later stage and enables an efficient, flexible, mobility management, e.g. in case of location area update for the UTRAN etc.

Of course, the handover may first be executed by the UT 240 or the RNC1 230, independently, or synchronously, in a similar manner as described above. The PDP-packets may also simultaneously be routed over both the routing paths, for any reason. Many possibilities exist, as a person skilled in the art realizes.

The above described method according to the invention and the protocol stack/s described above, are normally realised by software, i.e. computer programs, stored in memories of UT (240), RNC1 (230) and RNC2 231 etc, which software realize the method/protocol/s when loaded/running in/on processing means, e.g. CPU's, in UT (240) and RNC1(230), RNC2 231 etc.

The software (computer program) according to the invention may be stored on a wide range of computer readable mediums such as e.g. CD-ROM's, flash memories etc, or stored on a client server, allowing an efficient distribution and installation.

The principles of the present invention have been described in the foregoing by examples of embodiments or modes of operations, i.e. in the case that the L2-RN is a WLAN. However, as already stated, the invention is applicable for any integrated cellular radio network and alternative Layer 2 radio access network and many modifications and/or combinations are possible. For instance, in case the L2-network comprises a WMAN, IEEE 802.16, then the AP1 265 would transform the IEEE 802.3 frames to 802.16 MAC frames instead of 802.11 frames. The cellular radio network may be any cellular radio network capable of establishing a data session, e.g. a UTRAN, UMTS-network, a CDMA 2000 network, an IS-95 network, a GPRS network, a D-AMPS network etc. Many modifications and/or combinations are possible. The various steps described above need not necessarily be carried out in the order as described above. Therefore, the invention should not be construed as being limited to the particular embodiments discussed above, and it should be appreciated that variations may be made in those embodiments by persons skilled in the art, without departing from the scope of the present invention as defined by the appended claims.

The invention claimed is:

1. A method for assisting handover of a user terminal's, UT's, communication session in an integrated multi RAT network, said method to be carried out by an RNC1 being installed in said network and which RNC1 is being arranged to route said session through a first radio access network path via a first port according to a first radio network routing protocol by binding a session identifier identifying said session to a radio bearer defined according to said first routing protocol, said RNC1 being further arranged to route said session through an alternative radio access network path via a second port by binding said session identifier to an alternative bearer identifier being defined according to an alternative access network protocol, said method comprising the following steps:

receiving a "Handover Candidate" message comprising a message type identifier information element identifying said message as being a "Handover Candidate" message and which message identifies said session and which message further identifies a candidate RNC of said network, wherein said candidate RNC constitutes an RNC handover candidate for said session, establishing the identity of said RNC by investigating said message, associating said communication session with said candidate RNC identified in the previous step.

2. The method according to claim 1 wherein said "Handover Candidate" message comprises a user terminal identifier, UT ID, identifying said UT, an access point identifier, AP2 ID, of a radio access point, AP2, or a Node B identifier, Node B ID of a Node B, the Beacon signal of which is being detected by said UT, wherein said AP2 ID is defined according to said alternative radio access network protocol, or a mobile IP address, MIP, or a secure MIP address, MIPSec, of UT along with an IP address of an access router, AR, being associated with the candidate RNC, and wherein the step of establishing the identity of said candidate RNC comprises the step of:

checking stored information linking said AP2 ID/Node B OD/IP address of AR to the identity of said candidate RNC, and wherein the step of associating said communication session with said candidate RNC comprises the step of:

updating a routing table for said session, which session is being identified by said UT ID being linked to said session identifier, by storing an identifier identifying said candidate RNC in said routing table.)

3. The method according to claim 2 wherein said "Handover Candidate" message comprises the network address of said candidate RNC as source address of said message, thereby identifying the candidate RNC, and wherein said "Handover Candidate" message is received over an inter RNC interface connecting said RNC1 with said candidate RNC.

4. The method according to claim 2 wherein said "Handover Candidate" message comprises a network address of said candidate RNC identifying the candidate RNC, and wherein the UT ID is the alternative network address of said UT and wherein the AP2 ID is the alternative network address of said AP2, said method further comprising the step of:

receiving said "Handover Candidate" message over the first radio access network path or over the alternative radio access network path.

5. The method according to claim 4 wherein the first network routing protocol is a 3GPP protocol and the alternative access network protocol is an IEEE 802 standard protocol, or a mobile IP protocol, MIP, or a Secure mobile IP protocol, MIPSec, and wherein:

said "Handover Candidate" message is a RRC message complying with the 3GPP standard in case said "Handover Candidate" message is received over the first radio access network path, and wherein, said "Handover Candidate" message is a UDPIIP message complying with the IAPP protocol or LWAP protocol in case said "Handover Candidate" message is received over the alternative radio access network path.

6. The method according to claim 1 further comprising the steps of:

routing said session through said alternative radio access network path via said second port; and, signaling control plane data, and/or RRM information, associated with said session to/from said UT through said first radio access network path by means of said first radio network routing protocol, or signaling control plane data, and/or RRM information, associated with said session to/from said UT through said alternative radio access network path by means of said alternative access network routing protocol.

7. The method according to claim 6 further comprising the step of:

revoking a radio traffic channel allocation being carried out by means of said first radio network protocol, said allocation associated with said session.

8. The method according to claim 1 further comprising the steps of:

routing said session through said alternative radio access network path via said second port, and, signaling control plane data, and/or RRM-information, associated with said session to/from said UT through said alternative radio access network path.

9. The method according to claim 8 further comprising the steps of:

revoking a radio traffic channel allocation carried out by means of said first radio network protocol, said allocation being associated with said session, revoking a channel allocation being carried out by means of said first radio network protocol, said channel allocation being associated with said session, thereby setting said UT into an idle mode state as defined by said first radio network routing protocol.

10. The method according to claim 1 further comprising the steps of:

establishing that said candidate RNC is not RNC I, deciding to route said communication session through said candidate RNC, setting up an inter RNC tunnel bearer over an inter RNC interface connecting the RNC I with said candidate RNC.

11. The method according to claim 10 further comprising the steps of:

forming a "Radio Link Setup Request" message comprising:

a message type identifier identifying said message as being a "Radio Link Setup Request" message, a Radio Link Setup Request information element;

the alternative network address of the UT, a tunnel port number of said inter RNC tunnel bearer, and;

sending said Radio Link Setup Request message to said candidate RNC over the inter RNC interface connecting the RNC1 with the candidate RNC.

12. The method according to claim 11 wherein said Radio Link Setup Request information clement further comprises a session handover type identifier and/or an identifier identifying the control signalling associated with said session and/or an identifier identifying the session, said identifier/s specifying one of the following types of handover:

(1) a session handover and control plane handover from the WLAN path associated with API to the UTRAN path associated with the Node B of RNC2, or, (2) a control plane signaling handover from a radio access Node B associated with the RNC1 to a candidate radio access Node B associated with the candidate RNC, wherein only control plane signaling, and/or RRM information, associated with the session and signaled through said Node B is to be handed over to said candidate Node B, and wherein said signaling is carried out by means of said first radio network routing protocol, or, (3) a user plane handover of said session from a radio access point, AP1, associated with the RNC1, to a candidate radio access point, AP2, associated with the candidate RNC, wherein the session is currently being routed through the RNC1 and through said access point AP1, and is to be routed through the candidate RNC and through said candidate access point AP2, and wherein the routing of the session through said access points, API and AP2 is carried out by means of said alternative access network routing protocol, or, (4) a user plane and control plane handover of said session from a radio access point, API, associated with the RNC1, to a candidate radio access point, AP2, associated with the candidate RNC, wherein control plane data, and/or RRM information, associated with the session along with the session itself are currently being routed through the RNC1 and through said access point API, and are to be routed through the candidate RNC and through said candidate access point AP2, and wherein the routing through said access points, API and AP2 is carried out by means of said alternative access network routing protocol.

13. The method according to claim 12 wherein said Radio Link Setup Request message further comprises:
an information element specifying a requested QoS level for the requested radio link.

14. The method according to claim 10 further comprising the steps of:
stripping off protocol headers from incoming downlink IP session user data packets thereby transforming them into their original transmission format,
adding LLC headers to the original transmission format downlink IP session user data packets transforming them into LLC format according to said alternative access network protocol with an LLC network source address of the RNC1,
binding said session identifier to a tunnel identifier identifying the inter RNC tunnel bearer, thereby tunneling said LLC session packets to the candidate RNC.

15. The method according to claim 10 further comprising the steps of:
stripping off protocol headers from incoming downlink IP session user data thereby transforming them into their original transmission format,
binding said session identifier to a tunnel identifier identifying the inter RNC tunnel bearer, thereby tunneling said original transmission format session user data to the candidate RNC.

16. The method according to claim 2 wherein the UT ID of the "Handover Candidate" message is a mobile IP address, MIP, or a secure MIP address, MIPSec, of UT, and wherein the "Handover Candidate" message comprises an IP address of an access router, AR, being associated with the candidate RNC, the method further comprising the steps of:
identifying the session by means of the MIP/MIPSec address of the UT being linked with the session,
updating the routing table of the session with the IP address of AR,
stripping off tunneling protocol headers from incoming downlink IP session user data packets thereby transforming them into their original transmission format,
encapsulating the original transmission format IP session packets by means of UDP/IP or TCP/IP with the IP address of AR as destination address,
encapsulating the thus obtained UDP/IP or TCP/IP session packets with UDPIIP forming tunneling packets, wherein the UDP port number of the tunneling packets identifies an inter RNC tunnel to the candidate RNC, established as described above, and
binding said session identifier to the UDP inter RNC tunnel port number, thereby tunneling the encapsulated downlink session packets to the candidate RNC, and routing the packets through AR2 instead of AR.

17. The method according to claim 14 wherein the RNC1 routes the communication session to the candidate RNC over the inter RNC tunnel, said method further comprising the step of:
routing the session through the alternative radio access network path via the second port in parallel with routing the session over the inter RNC tunnel to the candidate RNC.

18. The method according to claim 17 further comprising the steps of:
receiving a "Handover Confirmation" message from the UT which message comprises:
a message type identifier identifying said message as being a "Handover Confirmation" message,
a disassociation information element and the network address of a radio access point, AP1, with which AP1 the UT is no longer associated, and,
a handover confirmation information element along with the network address of a radio access point, AP2, with which the UT is currently associated, wherein the network addresses of said AP1 and AP2 are defined according to said alternative access network protocol, and wherein the method further comprises the step of:
blocking the routing of the session through the alternative radio access network path via the second port as a response on receiving said "Handover Confirmation" message.

19. The method according to claim 1 further comprising the steps of:
deciding to route the session through said candidate RNC, establishing that the session can not be routed in serial through the RNC1 and the candidate RNC,
identifying a Data Packet Support Node being connected to both the RNCI and the candidate RNC, and through which Data Packet Support Node the session is currently routed,
forming an "RNC Relocation Required" message comprising:
a message type identifier information element identifying said message as being an "RNC Relocation Required" message, - an identifier identifying the candidate RNC,
the network address of the UT as defined by the alternative access network protocol,
a tunnel identifier of the tunnel between the RNC and the Data Packet Support Node through which the session is currently being tunneled, and
sending said "Session Relocation Required" message to said Data Packet Support Node, thereby requesting a Serving RNC relocation from said RNC1 to said candidate RNC, for the session.

20. The method according to step 19 wherein the step of deciding to route the session through said candidate RNC comprises the following steps:
receiving a "Handover Confirmation" message from the UT which message comprises:

a message type identifier information element identifying said message as being a "Handover Confirmation" message, a disassociation information element and the network address of the radio access point, AP1, with which AP1 the UT is no longer associated, and, a handover confirmation information element along with the network address of a radio access point, AP2, with which the UT is currently associated, wherein the network addresses of said AP1 and AP2 are defined according to said alternative access network protocol, and wherein the method further comprises the step of:

revoking the alternative bearer identifier being defined according to the alternative access network protocol thereby revoking the radio channel allocation associated with the transmission of the session through the alternative radio access network path, thereby blocking the routing of the session through the alternative radio access network path as a response on receiving said "Handover Confirmation" message.

21. The method according to claim 19 wherein the step of deciding to route the session through said candidate RNC further comprises the following steps:

collecting RRM information concerning at least the radio access points AP1 and AP2 whose beacon signals are currently being detected by UT, wherein said RRM information is being signaled over the first radio access network path or over the alternative radio access network path, taking a preliminary handover decision based on said collected RRM information, and sending a "Physical Channel Reconfiguration" message to the UT comprising a handover instruction identifier and the alternative network address of AP2, which message instructs the UT to route the session through AP2 instead of AP1.

22. The method according to claim 20 wherein the step of collecting RRM information concerning at least the radio access points AP1 and AP2 whose beacon signals are currently being detected by UT further comprises the step of:

receiving a radio resource control, RRC, measurement report message over the first radio access network path or over the inter RNC interface, which message complies with a 3GPP RRC standard format and comprises an "Additional Measured Results" information element indicating the AP2 as target access point, or, receiving a RRC measurement report message complying with the standard format of a RRC message format according to said alternative radio access network wherein said RRC message comprises an "Additional Measured Results" information element indicating the AP2 as target access point.

23. The method according to claim 1 wherein said multi RAT network is an integrated 3GPP-UTRAN-IEEE 802-WLAN-network, said communication session is a 3GPP PDP context session, said first radio network routing protocol is a 3GPP UTRAN standard protocol, said session identifier is a 3GPP UTRAN standard protocol GTP-U tunnel endpoint identifier, TEID of a UDP/IP tunnel between RNC1 and the SGSN, said radio bearer according to said first routing protocol is a 3GPP RB ID, said alternative bearer identifier is a WLAN radio bearer identifier, WLAN RB ID, or a mobile IP radio bearer identifier, MIP RB ID, or a secure mobile IP radio bearer identifier, MIP/IPSec RB ID, said alternative access network protocol is an IEEE 802 WLAN protocol or IP/MIP/IPSec- protocol, or combinations thereof, said UT is a WLAN MAC address of UT, or a MIP address of UT, or a MIPSec address of UT, said AP2 ID is a WLAN MAC address of AP2, said Node B is a 3GPP identifier identifying Node B, said second network address of UT is a MIP or MIPSec address, said identifier identifying said candidate RNC is an IP address or UTRAN MAC address of the candidate RNC, said first interface connecting said RNC I with said candidate RNC is a 3GPP Iur interface, said network address of said candidate RNC is the UTRAN MAC address or IP address of the candidate RNC, and wherein said Radio Link Setup Request message complies with a 3GPP Radio Link Setup Request message format, and wherein the network address of radio access points, AP1, UT and AP2 are the WLAN MAC addresses of API, UT and AP2, respectively, said Data Packet Support Node is a 3GPP SGSN, and wherein the "RNC Relocation Required" message format complies with the 3GPP "RNC Relocation Required" message format.

24. A non-transitory computer readable medium having stored program code means which, when loaded into a processing means of a RNC1 being installed in a multi RAT network and which RNC1 being arranged to route said session through a first radio access network path via a first port according to a first radio network routing protocol by binding a session identifier identifying said session to a radio bearer according to said first routing protocol, said RNC1 being further arranged to route said session through an alternative radio access network path via a second port by binding said session identifier to an alternative bearer identifier being defined according to an alternative access network protocol, make said processing means execute at least one procedure realising the method according to claim 1.

25. A method for assisting handover of a user terminal's, UT's, communication session in an integrated multi RAT network, said method to be carried out by a candidate RNC being installed in said network and which candidate RNC constitutes a handover candidate for the session and which candidate RNC is being arranged to route the session through a first radio access network path via a first port according to a first radio network routing protocol by binding a session identifier identifying said session to a radio bearer defined according to said first routing protocol, said candidate RNC being further arranged to route the session through an alternative radio access network path via a second port by binding a session identifier identifying the session to an alternative bearer identifier being defined according to an alternative access network protocol, said method comprising the following steps:

receiving a "Radio Link Setup Request" message from a neighbor RNC1 currently routing the session associated with UT, extracting; from the "Radio Link Setup Request" message, a tunnel port number of an inter RNC tunnel between RNC1 and the candidate RNC, extracting. from the "Radio Link Setup Request" message, a UT identifier identifying the UT, associating said tunnel port number with the UT and with the session associated with the UT, extracting a session handover type identifier of said "Radio Link Setup Request" message, setting up a radio traffic channel for routing the session of said UT according to said handover type identifier.

26. The method according to claim 25 further comprising the steps of:

receiving a "Handover Candidate" message comprising:

a message type identifier information element identifying said message as being a "Handover Candidate" message, and, an access point identifier, AP2 ID, of a radio access point, AP2 or a Node B identifier, Node B ID of a Node B, the Beacon signal of which is being detected by said UT, wherein said AP2 is defined according to said alternative radio access network protocol, or a mobile IP address, MIP, or a secure MIP address, MIPSec, of UT along with an IP address of an access router, AR, being associated with the candidate RNC, wherein the "Handover Candidate" message identifies the UT, and, establishing that said UT has not an ongoing session being routed through the candidate RNC.

27. The method according to claim 26 wherein said "Handover Candidate" message is received over an inter RNC interface from the RNC1 currently routing the session, the method further comprising the steps of:

recognizing that the network source address of said "Handover Candidate" message is the network address of RNC1 and concluding that the session is currently being routed through RNC1, establishing an inter RNC tunnel between RNC1 and the candidate RNC.

28. The method according to claim 26 further comprising the steps of:

receiving said "Handover Candidate" message from the UT over the first radio access network path or over the alternative radio access network path, forwarding said "Handover Candidate" message to its neighboring RNCs.

29. The method according to claim 26 wherein the access point identifier is a cell identifier of an access node AP2 of said alternative radio access network path, and wherein said session handover type identifier element indicates that said the session is to be routed through the AP2, wherein the step of setting up a radio traffic channel for UT further comprises the steps of:

setting up a logical LLC connection, through a port, with the UT via the AP2, wherein the LLC connection is set up by means of the alternative access network protocol, associating the session with the LLC connection.

30. The method according to claim 29 further comprising the steps of:

receiving downlink packets of the session through the tunnel being identified by said tunnel port number, stripping off tunneling protocol headers from the received downlink packets thus obtaining session packets having a format according to the alternative access network protocol and which packets have a network source address of RNC1 as defined by said alternative access network protocol, forwarding the thus obtained session packets through the port, thus routing the packets to UT via the AP2.

31. The method according to claim 29 further comprising the steps of:

receiving downlink packets of the session through the tunnel being identified by said tunnel port number, stripping off tunneling protocol headers from the received packets thus obtaining session packets having a format according to the alternative access network protocol and which packets have a network source address of RNC1 as defined by said alternative access network protocol, stripping off encapsulation headers of the thus obtained packets, which encapsulation headers have been added by the RNC1 by means of the alternative access network protocol, thereby transforming the downlink packets into their original transmission format, adding LLC headers to the original transmission format downlink session packets transforming them into LLC format according to said alternative access network protocol with an LLC network source address of the candidate RNC, forwarding the thus formed LLC session packets through the port, thus routing the packets to UT via the AP2.

32. The method according to claim 26 wherein the "Handover Candidate" message comprises a mobile IP address, MIP, or a secure MIP address, MIPSec, of UT along with an IP address of an access router AR, being associated with the candidate RNC, and wherein the UT identifier of the "Radio Link Setup Request" message is a corresponding MIP/MIPSec address of UT, and wherein the inter RNC tunnel is an UDPIIP tunnel, the method further comprising the steps of:

extracting the MIP/MIPSec of UT from said "Radio Link Setup Request" message, associating the tunnel port number with the MIP/MIPSec of UT and with the IP address of AR, receiving identifying the session by means of the MIP/MIPSec address of the UT being linked with the session, updating the routing table of the session with the IP address of AR, receiving downlink IP encapsulated IP session packets over the inter UDPIIP RNC tunnel, stripping off the tunneling UDPIIP headers from the IP encapsulated downlink IP session packets obtaining downlink IP session packets being encapsulated with IP, wherein the encapsulation IP address of the IP session packets is the IP address of AR2, and forwarding the downlink IP session packets being encapsulated with the IP address of AR to a port associated with AR, thereby routing the downlink IP session packets to the UT through AR and AP2.

33. The method according to claim 25 wherein said multi RAT network is an integrated 3GPP-UTRAN-IEEE 802-WLAN-network, said communication session is a 3GPP POP context session, said first radio network routing protocol is a 3GPP UTRAN standard protocol, said session identifier is a 3GPP UTRAN standard protocol GTP-U tunnel endpoint identifier, TEID, of a UDP/IP tunnel between RNC1 and the candidate RNC, said radio bearer according to said first routing protocol is a 3GPP RB ID, said alternative bearer identifier is a WLAN radio bearer identifier, WLAN RB ID, or a mobile IP radio bearer identifier, MIP RB ID, or a secure mobile IP radio bearer identifier, MIP/IPSec RB ID, said alternative access network protocol is an IEEE 802 WLAN protocol or IP/MIP/IPSec- protocol or combinations thereof, said UT ID is a WLAN MAC address of UT, or a MIP address of UT, or a MIPSec address of UT, said AP2 10 is a WLAN MAC address of AP2, said Node B 10 is a 3GPP identifier identifying Node B, said second network address of UT is a MIP or MIPSec address, and wherein said Radio Link Setup Request message complies with a 3GPP Radio Link Setup Request message format, and wherein the network address of radio access points, API, UT and AP2 are the WLAN MAC addresses of AP I, UT and AP2, respectively.

34. A non-transitory computer readable medium having stored program code means which, when loaded into a processing means of a candidate RNC being installed in said network and which candidate RNC constitutes a handover candidate for the session and which candidate RNC is being capable of routing the session through a first radio access network path via a first port according to a first radio network routing protocol by binding a session identifier identifying said session to a radio bearer defined according to said first routing protocol, said candidate RNC being further capable of routing the session through an alternative radio access network path via a second port by binding a session identifier identifying the session to an alternative bearer identifier being defined according to an alternative access network protocol, make said processing means execute at least one procedure realising the method according to claim 25.

35. A radio network controller, RNC1, being arranged to route a session through a first radio access network path via a first port according to a first radio network routing protocol by binding a session identifier identifying said session to a radio bearer defined according to said first routing protocol, said RNC1 being further arranged to route said session through an alternative radio access network path via a second port by binding said session identifier to an alternative bearer identifier being defined according to an alternative access network protocol, wherein said RNC comprises means realizing the method according to claim 1.

36. The RNC1 according to claim 35 wherein said means comprises a data memory with stored program code means which, when loaded in a processing means of said RNC1, make said processing means execute at least one procedure.

37. A radio network controller, RNC2, being arranged to route a session through a first radio access network path via a first port according to a first radio network routing protocol by binding a session identifier identifying said session to a radio bearer defined according to said first routing protocol, said RNC2 being further arranged to route the session through an alternative radio access network path via a second port by binding a session identifier identifying the session to an alternative bearer identifier being defined according to an alternative access network protocol, wherein said RNC2 comprises means realizing the method according to claim 25.

38. The RNC2 according to claim 37 wherein said means comprises a data memory with stored program code means which, when loaded in a processing means of said RNC1, make said processing means execute at least one procedure.

\* \* \* \* \*

UNITED STATES PATENT AND TRADEMARK OFFICE
CERTIFICATE OF CORRECTION

| | | |
|---|---|---|
| PATENT NO. | : 8,019,346 B2 | |
| APPLICATION NO. | : 12/088782 | |
| DATED | : September 13, 2011 | |
| INVENTOR(S) | : Sachs et al. | |

It is certified that error appears in the above-identified patent and that said Letters Patent is hereby corrected as shown below:

On the Title Page, item (57), under "ABSTACT", in Column 2, Line 4, delete "RNCI" and insert -- RNC1 --, therefor.

In Column 1, Line 59, delete "node." and insert -- node, --, therefor.

In Column 3, Line 33, delete "1D" and insert -- ID --, therefor.

In Column 3, Line 54, delete ""landover" and insert -- "Handover --, therefor.

In Column 4, Line 2, delete "11P" and insert -- IP --, therefor.

In Column 5, Line 34, delete "AP 17" and insert -- AP1, --, therefor.

In Column 6, Line 12, delete "1P" and insert -- IP --, therefor.

In Column 6, Line 49, delete ""I-landover" and insert -- "Handover --, therefor.

In Column 9, Line 35, delete "router." and insert -- router, --, therefor.

In Column 9, Line 40, delete ""I-landover" and insert -- "Handover --, therefor.

In Column 9, Line 45, delete ""I-landover" and insert -- "Handover --, therefor.

In Column 11, Line 3, delete "mobile. IP" and insert -- mobile IP --, therefor.

In Column 11, Line 52, delete "controller." and insert -- controller, --, therefor.

In Column 12, Line 2, delete "controller." and insert -- controller, --, therefor.

Signed and Sealed this
Tenth Day of January, 2012

David J. Kappos
*Director of the United States Patent and Trademark Office*

CERTIFICATE OF CORRECTION (continued)
U.S. Pat. No. 8,019,346 B2

In Column 13, Line 57, delete "RNC 1230" and insert -- RNC1 230 --, therefor.

In Column 13, Line 60, delete "RNC 1230" and insert -- RNC1 230 --, therefor.

In Column 14, Line 8, delete "bc" and insert -- be --, therefor.

In Column 14, Line 28, delete "1ur" and insert -- Iur --, therefor.

In Column 15, Line 2, delete "RNC 1430" and insert -- RNC1 430 --, therefor.

In Column 15, Line 10, delete "RNC 1430" and insert -- RNC1 430 --, therefor.

In Column 15, Line 10, delete "ICP-" and insert -- TCP- --, therefor.

In Column 15, Line 15, delete "RNC 1230" and insert -- RNC1 230 --, therefor.

In Column 15, Line 28, delete "1ur" and insert -- Iur --, therefor.

In Column 15, Line 38, delete "RNC 1230" and insert -- RNC1 230 --, therefor.

In Column 15, Line 40, delete "realizes." and insert -- realizes, --, therefor.

In Column 15, Line 41, delete "1APP," and insert -- IAPP, --, therefor.

In Column 17, Line 44, delete "RNC 1230" and insert -- RNC1 230 --, therefor.

In Column 17, Line 48, delete "RNC 1230" and insert -- RNC1 230 --, therefor.

In Column 17, Line 49, delete "UT 1240" and insert -- UT 240 --, therefor.

In Column 17, Line 53, delete "RNC 1230" and insert -- RNC1 230 --, therefor.

In Column 18, Line 15, delete "RNC 1230." and insert -- RNC1 230. --, therefor.

In Column 18, Line 25, delete "RNC 1230" and insert -- RNC1 230 --, therefor.

In Column 18, Line 42, delete "STAMF" and insert -- STAME --, therefor.

In Column 18, Line 49, delete "RNC 1230" and insert -- RNC1 230 --, therefor.

In Column 19, Line 11, delete "RNC 1230" and insert -- RNC1 230 --, therefor.

In Column 19, Line 34, delete "UT s" and insert -- UT's --, therefor.

In Column 19, Line 52, delete "RNC 1230," and insert -- RNC1 230, --, therefor.

In Column 20, Line 4, delete "extent." and insert -- extent, --, therefor.

In Column 20, Line 46, delete "LAPP" and insert -- IAPP --, therefor.

In Column 21, Line 5, delete "RNC 1230" and insert -- RNC1 230 --, therefor.

In Column 21, Line 25, delete "RNC 1230" and insert -- RNC1 230 --, therefor.

In Column 21, Line 26, delete "RNC 1230," and insert -- RNC1 230, --, therefor.

In Column 21, Line 39, delete "path." and insert -- path, --, therefor.

In Column 21, Line 56, delete "RNC 1230" and insert -- RNC1 230 --, therefor.

In Column 21, Lines 62-63, delete "RNC 1230" and insert -- RNC1 230 --, therefor.

In Column 23, Lines 10-11, delete "RNC 1230." and insert -- RNC1 230. --, therefor.

In Column 23, Line 49, delete "UT 1240" and insert -- UT 240 --, therefor.

In Column 23, Line 56, delete "RNC 1230" and insert -- RNC1 230 --, therefor.

In Column 23, Line 58, delete "RNC 1230" and insert -- RNC1 230 --, therefor.

In Column 24, Line 5, delete "RNC 1230" and insert -- RNC1 230 --, therefor.

In Column 24, Lines 19-20, delete "RNC 1230." and insert -- RNC1 230. --, therefor.

In Column 24, Line 50, delete "RNC 1230," and insert -- RNC1 230, --, therefor.

In Column 25, Line 5, delete "RNC 1230" and insert -- RNC1 230 --, therefor.

In Column 25, Line 21, delete "element, however" and insert -- element. However --, therefor.

In Column 25, Line 29, delete "Conformation" and insert -- Confirmation --, therefor.

In Column 25, Lines 62-63, delete "RNC 1230" and insert -- RNC1 230 --, therefor.

In Column 26, Line 7, delete "RNC 1230" and insert -- RNC1 230 --, therefor.

In Column 26, Line 19, delete "RNC 1230" and insert -- RNC1 230 --, therefor.

In Column 26, Line 61, delete "RNC 1230." and insert -- RNC1 230. --, therefor.

CERTIFICATE OF CORRECTION (continued)

In Column 27, Line 37, delete "RNC 1230" and insert -- RNC1 230 --, therefor.

In Column 27, Line 46, delete "RNC 1230" and insert -- RNC1 230 --, therefor.

In Column 28, Line 3, delete "RNC 1230" and insert -- RNC1 230 --, therefor.

In Column 28, Line 41, delete "lost" and insert -- Host --, therefor.

In Column 28, Line 55, delete "RNC 1230" and insert -- RNC1 230 --, therefor.

In Column 30, Line 23, delete ""I-landover" and insert -- "Handover --, therefor.

In Column 30, Line 25, delete "RNC 1230." and insert -- RNC1 230. --, therefor.

In Column 31, Line 50, delete "U'" and insert -- UT- --, therefor.

In Column 32, Line 1, delete "U 240" and insert -- UT 240 --, therefor.

In Column 32, Line 40, delete "RNC 1230" and insert -- RNC1 230 --, therefor.

In Column 32, Line 59, delete "RNC (231)." and insert -- RNC (231), --, therefor.

In Column 34, Line 30, delete "RNC 1230," and insert -- RNC1 230, --, therefor.

In Column 35, Line 26, delete "TEIDI," and insert -- TEID1, --, therefor.

In Column 40, Line 46, delete "I-his" and insert -- This --, therefor.

In Column 41, Line 12, delete "RNC 1230" and insert -- RNC1 230 --, therefor.

In Column 42, Line 47, delete "RNC 1230" and insert -- RNC1 230 --, therefor.

In Column 43, Line 2, delete "UT 1240" and insert -- UT 240 --, therefor.

In Column 43, Line 17, delete "don link" and insert -- downlink --, therefor.

In Column 43, Line 58, delete "u r240" and insert -- UT 240 --, therefor.

In Columns 43 & 44, Lines 67 & 1, delete "u r240" and insert -- UT 240 --, therefor.

In Column 44, Line 64, delete "802.111" and insert -- 802.11i --, therefor.

In Column 47, Line 38, in Claim 2, delete "table.)" and insert -- table. --, therefor.

CERTIFICATE OF CORRECTION (continued)
U.S. Pat. No. 8,019,346 B2

In Column 47, Line 64, in Claim 5, delete "UDPIIP" and insert -- UDP/IP --, therefor.

In Column 48, Line 56, in Claim 12, delete "clement" and insert -- element --, therefor.

In Column 50, Line 5, in Claim 16, delete "UDPIIP" and insert -- UDP/IP --, therefor.

In Column 50, Line 46, in Claim 19, delete "RNCI" and insert -- RNC1 --, therefor.

In Column 51, Line 5, in Claim 20, delete "AP1 ," and insert -- AP1, --, therefor.

In Column 52, Line 54, in Claim 25, delete "extracting." and insert -- extracting, --, therefor.

In Column 54, Line 13, in Claim 32, delete "UDPIIP" and insert -- UDP/IP --, therefor.

In Column 54, Line 23, in Claim 32, delete "UDPIIP" and insert -- UDP/IP --, therefor.

In Column 54, Line 24, in Claim 32, delete "UDPIIP" and insert -- UDP/IP --, therefor.

UNITED STATES PATENT AND TRADEMARK OFFICE
CERTIFICATE OF CORRECTION

| | |
|---|---|
| PATENT NO. | : 8,019,346 B2 |
| APPLICATION NO. | : 12/088782 |
| DATED | : September 13, 2011 |
| INVENTOR(S) | : Sachs et al. |

It is certified that error appears in the above-identified patent and that said Letters Patent is hereby corrected as shown below:

On the Title Page, item (57), under "Abstract", in Column 2, Line 4, delete "RNCI" and insert -- RNC1 --, therefor.

In Column 1, Line 59, delete "node." and insert -- node, --, therefor.

In Column 3, Line 33, delete "1D" and insert -- ID --, therefor.

In Column 3, Line 54, delete ""landover" and insert -- "Handover --, therefor.

In Column 4, Line 2, delete "11P" and insert -- IP --, therefor.

In Column 5, Line 34, delete "AP 17" and insert -- AP1, --, therefor.

In Column 6, Line 12, delete "1P" and insert -- IP --, therefor.

In Column 6, Line 49, delete ""I-landover" and insert -- "Handover --, therefor.

In Column 9, Line 35, delete "router." and insert -- router, --, therefor.

In Column 9, Line 40, delete ""I-landover" and insert -- "Handover --, therefor.

In Column 9, Line 45, delete ""I-landover" and insert -- "Handover --, therefor.

In Column 11, Line 3, delete "mobile. IP" and insert -- mobile IP --, therefor.

In Column 11, Line 52, delete "controller." and insert -- controller, --, therefor.

In Column 12, Line 2, delete "controller." and insert -- controller, --, therefor.

This certificate supersedes the Certificate of Correction issued January 10, 2012.

In Column 1, Line 57, delete "RNC 1230" and insert -- RNC1 230 --, therefor.

Signed and Sealed this
Fourteenth Day of February, 2012

David J. Kappos
*Director of the United States Patent and Trademark Office*

CERTIFICATE OF CORRECTION (continued)
U.S. Pat. No. 8,019,346 B2

In Column 13, Line 60, delete "RNC 1230" and insert -- RNC1 230 --, therefor.

In Column 14, Line 8, delete "be" and insert -- be --, therefor.

In Column 14, Line 28, delete "1ur" and insert -- Iur --, therefor.

In Column 15, Line 2, delete "RNC 1430" and insert -- RNC1 430 --, therefor.

In Column 15, Line 10, delete "RNC 1430" and insert -- RNC1 430 --, therefor.

In Column 15, Line 10, delete "ICP-" and insert -- TCP- --, therefor.

In Column 15, Line 15, delete "RNC 1230" and insert -- RNC1 230 --, therefor.

In Column 15, Line 28, delete "1ur" and insert -- Iur --, therefor.

In Column 15, Line 38, delete "RNC 1230" and insert -- RNC1 230 --, therefor.

In Column 15, Line 40, delete "realizes." and insert -- realizes, --, therefor.

In Column 15, Line 41, delete "1APP," and insert -- IAPP, --, therefor.

In Column 17, Line 44, delete "RNC 1230" and insert -- RNC1 230 --, therefor.

In Column 17, Line 48, delete "RNC 1230" and insert -- RNC1 230 --, therefor.

In Column 17, Line 49, delete "UT 1240" and insert -- UT 240 --, therefor.

In Column 17, Line 53, delete "RNC 1230" and insert -- RNC1 230 --, therefor.

In Column 18, Line 15, delete "RNC 1230." and insert -- RNC1 230. --, therefor.

In Column 18, Line 25, delete "RNC 1230" and insert -- RNC1 230 --, therefor.

In Column 18, Line 42, delete "STAMF" and insert -- STAME --, therefor.

In Column 18, Line 49, delete "RNC 1230" and insert -- RNC1 230 --, therefor.

In Column 19, Line 11, delete "RNC 1230" and insert -- RNC1 230 --, therefor.

In Column 19, Line 34, delete "UT s" and insert -- UT's --, therefor.

In Column 2, Line 52, delete "RNC 1230," and insert -- RNC1 230, --, therefor.

In Column 20, Line 4, delete "extent." and insert -- extent, --, therefor.

In Column 20, Line 46, delete "LAPP" and insert -- IAPP --, therefor.

In Column 21, Line 5, delete "RNC 1230" and insert -- RNC1 230 --, therefor.

In Column 21, Line 25, delete "RNC 1230" and insert -- RNC1 230 --, therefor.

In Column 21, Line 26, delete "RNC 1230," and insert -- RNC1 230, --, therefor.

In Column 21, Line 39, delete "path." and insert -- path, --, therefor.

In Column 21, Line 56, delete "RNC 1230" and insert -- RNC1 230 --, therefor.

In Column 21, Lines 62-63, delete "RNC 1230" and insert -- RNC1 230 --, therefor.

In Column 23, Lines 10-11, delete "RNC 1230." and insert -- RNC1 230. --, therefor.

In Column 23, Line 49, delete "UT 1240" and insert -- UT 240 --, therefor.

In Column 23, Line 56, delete "RNC 1230" and insert -- RNC1 230 --, therefor.

In Column 23, Line 58, delete "RNC 1230" and insert -- RNC1 230 --, therefor.

In Column 24, Line 5, delete "RNC 1230" and insert -- RNC1 230 --, therefor.

In Column 24, Lines 19-20, delete "RNC 1230." and insert -- RNC1 230. --, therefor.

In Column 24, Line 50, delete "RNC 1230," and insert -- RNC1 230, --, therefor.

In Column 25, Line 5, delete "RNC 1230" and insert -- RNC1 230 --, therefor.

In Column 25, Line 21, delete "element, however" and insert -- element. However --, therefor.

In Column 25, Line 29, delete "Conformation" and insert -- Confirmation --, therefor.

In Column 25, Lines 62-63, delete "RNC 1230" and insert -- RNC1 230 --, therefor.

In Column 26, Line 7, delete "RNC 1230" and insert -- RNC1 230 --, therefor.

In Column 26, Line 19, delete "RNC 1230" and insert -- RNC1 230 --, therefor.

In Column 26, Line 61, delete "RNC 1230." and insert -- RNC1 230. --, therefor.

In Column 2, Line 37, delete "RNC 1230" and insert -- RNC1 230 --, therefor.

In Column 27, Line 46, delete "RNC 1230" and insert -- RNC1 230 --, therefor.

In Column 28, Line 3, delete "RNC 1230" and insert -- RNC1 230 --, therefor.

In Column 28, Line 41, delete "lost" and insert -- Host --, therefor.

In Column 28, Line 55, delete "RNC 1230" and insert -- RNC1 230 --, therefor.

In Column 30, Line 23, delete ""I-landover" and insert -- "Handover --, therefor.

In Column 30, Line 25, delete "RNC 1230." and insert -- RNC1 230. --, therefor.

In Column 31, Line 50, delete "U'" and insert -- UT- --, therefor.

In Column 32, Line 1, delete "U 240" and insert -- UT 240 --, therefor.

In Column 32, Line 40, delete "RNC 1230" and insert -- RNC1 230 --, therefor.

In Column 32, Line 59, delete "RNC (231)." and insert -- RNC (231), --, therefor.

In Column 34, Line 30, delete "RNC 1230," and insert -- RNC1 230, --, therefor.

In Column 35, Line 26, delete "TEIDI," and insert -- TEID1, --, therefor.

In Column 40, Line 46, delete "I-his" and insert -- This --, therefor.

In Column 41, Line 12, delete "RNC 1230" and insert -- RNC1 230 --, therefor.

In Column 42, Line 47, delete "RNC 1230" and insert -- RNC1 230 --, therefor.

In Column 43, Line 2, delete "UT 1240" and insert -- UT 240 --, therefor.

In Column 43, Line 17, delete "don link" and insert -- downlink --, therefor.

In Column 43, Line 58, delete "u r240" and insert -- UT 240 --, therefor.

In Columns 43 & 44, Lines 67 & 1, delete "u r240" and insert -- UT 240 --, therefor.

In Column 44, Line 64, delete "802.111" and insert -- 802.11i --, therefor.

In Column 47, Line 38, in Claim 2, delete "table.)" and insert -- table. --, therefor.

In Column 47, Line 64, in Claim 5, delete "UDPIIP" and insert -- UDP/IP --, therefor.

In Column 48, Line 56, in Claim 12, delete "clement" and insert -- element --, therefor.

In Column 50, Line 5, in Claim 16, delete "UDPIIP" and insert -- UDP/IP --, therefor.

In Column 50, Line 46, in Claim 19, delete "RNCI" and insert -- RNC1 --, therefor.

In Column 51, Line 5, in Claim 20, delete "AP1 ," and insert -- AP1, --, therefor.

In Column 52, Line 54, in Claim 25, delete "extracting." and insert -- extracting, --, therefor.

In Column 54, Line 13, in Claim 32, delete "UDPIIP" and insert -- UDP/IP --, therefor.

In Column 54, Line 23, in Claim 32, delete "UDPIIP" and insert -- UDP/IP --, therefor.

In Column 54, Line 24, in Claim 32, delete "UDPIIP" and insert -- UDP/IP --, therefor.